United States Patent
Hong et al.

(10) Patent No.: US 10,944,291 B2
(45) Date of Patent: Mar. 9, 2021

(54) WIRELESS POWER TRANSMITTER

(71) Applicant: WITS Co., Ltd., Yongin-si (KR)

(72) Inventors: Yun Ki Hong, Suwon-si (KR); Joung Ho Son, Suwon-si (KR); Keun Soo Ha, Suwon-si (KR); Dae Sik Kim, Suwon-si (KR); Eun Young Shin, Suwon-si (KR); Seung Won Park, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 693 days.

(21) Appl. No.: 15/692,638

(22) Filed: Aug. 31, 2017

(65) Prior Publication Data
US 2018/0102668 A1    Apr. 12, 2018

(30) Foreign Application Priority Data

Oct. 12, 2016  (KR) .................. 10-2016-0131880
Nov. 17, 2016  (KR) .................. 10-2016-0153568

(51) Int. Cl.
*H02J 50/12* (2016.01)
*H02J 7/02* (2016.01)
(Continued)

(52) U.S. Cl.
CPC ............. *H02J 50/12* (2016.02); *H02J 7/025* (2013.01); *H02J 50/80* (2016.02); *H02J 50/40* (2016.02);
(Continued)

(58) Field of Classification Search
CPC .. H02J 50/60; H02J 50/12; H02J 50/80; H02J 7/025; H02J 2207/20; H02J 50/40; H02J 7/00712; H04B 5/0037
See application file for complete search history.

(56) References Cited

U.S. PATENT DOCUMENTS 6,058,035 A     5/2000 Madenokouji et al.
2015/0137748 A1  5/2015 Kim et al.
(Continued)

FOREIGN PATENT DOCUMENTS

KR     10-0614570 B1     10/2006
KR     10-0820461 B1      4/2008
(Continued)

OTHER PUBLICATIONS

Korean Office Action dated Dec. 6, 2017 in corresponding Korean patent application No. 10-2016-0153568 (8 pages in English and 6 pages in Korean).

*Primary Examiner* — Daniel J Cavallari
(74) *Attorney, Agent, or Firm* — Harness, Dickey & Pierce, P.L.C.

(57) ABSTRACT

A wireless power transmitter includes a converter comprising at least one switching element, and configured to generate boosted input power; a resonator and a controller. The resonator is configured to receive the boosted input power as an alternating current (AC) power, and transmit a ping signal in a detection mode for determining whether any one or both of an external object approaching and a type of the external object. The controller is configured to control the switching element, and gradually increase a duty cycle of a gate signal provided to the switching element, in the detection mode.

16 Claims, 46 Drawing Sheets

(51) Int. Cl.
*H02J 50/80* (2016.01)
*H02J 50/40* (2016.01)
*H04B 5/00* (2006.01)

(52) U.S. Cl.
CPC ......... *H02J 2207/20* (2020.01); *H04B 5/0037* (2013.01)

(56) References Cited

U.S. PATENT DOCUMENTS

| | | | |
|---|---|---|---|
| 2016/0064992 A1* | 3/2016 | Herbst | H02J 7/025 307/104 |
| 2016/0111888 A1 | 4/2016 | Cho et al. | |
| 2016/0336816 A1* | 11/2016 | Mach | H02J 50/10 |
| 2017/0302110 A1* | 10/2017 | Riehl | H02J 50/40 |
| 2018/0138756 A1* | 5/2018 | Bae | H02J 50/12 |

FOREIGN PATENT DOCUMENTS

| | | |
|---|---|---|
| KR | 10-2014-0053282 A | 5/2014 |
| KR | 10-2015-0057984 A | 5/2015 |
| KR | 10-2015-0115339 A | 10/2015 |
| KR | 10-2016-0046195 A | 4/2016 |
| WO | WO 2013/020138 A2 | 2/2013 |

\* cited by examiner

WIRELESS POWER TRANSMITTER

CROSS-REFERENCE TO RELATED APPLICATIONS

This application claims the benefit under 35 U.S.C. § 119(a) of Korean Patent Application Nos. 10-2016-0131880 and 10-2016-0153568 filed on filed on Oct. 12, 2016 and Nov. 17, 2016, respectively, in the Korean Intellectual Property Office, the entire disclosures of which are incorporated herein by reference for all purposes.

BACKGROUND

1. Field

The present disclosure relates to a device for transmitting power wirelessly.

2. Description of Related Art

Recently, many mobile devices that are charged in a wireless manner have been introduced. Accordingly, many wireless power transmitters for wirelessly transmitting power to mobile devices have been introduced. With such wireless power transmission devices, research is being conducted into reducing material costs, satisfying various requirements, and improving wireless power transmission efficiency. Research into improving user convenience and wireless power transmission efficiency while satisfying various requirements are also being carried out.

SUMMARY

An aspect of the present disclosure may provide a wireless power transmitter transmitting power wirelessly.

In one general aspect, a wireless power transmitter includes a converter comprising at least one switching element, and configured to generate boosted input power; a resonator and a controller. The resonator is configured to receive the boosted input power as an alternating current (AC) power, and transmit a ping signal in a detection mode for determining whether any one or both of an external object approaching and a type of the external object. The controller is configured to control the switching element, and gradually increase a duty cycle of a gate signal provided to the switching element, in the detection mode.

The controller may gradually increase the duty cycle of the gate signal in an amount equal to a reference duty cycle.

The controller may increase the duty cycle of the gate signal from a first duty cycle of 0%, in an initial operation mode of the detection mode.

The initial operation mode may correspond to a mode for transmitting the ping signal in a stop state for a time equal to or greater than a reference time.

The controller may increase the duty cycle of the gate signal to a ping duty cycle, and the boosted input power to reach a target boosted input power for generating the ping signal in the ping duty cycle.

The controller may be further configured to calculate data on a voltage level of the boosted input power gradually increasing to the target boosted input power, and a duty cycle corresponding to the voltage level of the boosted input power gradually increases.

The controller may be further configured to increase the duty cycle of the gate signal from a second duty cycle, in a standby operation mode of the detection mode, and the second duty cycle is determined based on the voltage level of boosted input power.

The standby operation mode may correspond to a mode for transmitting a ping signal in the stop state for less than the reference time.

The voltage level of the boosted input power may be estimated based on a period of the ping signal.

The second duty cycle may be calculated based on the voltage level of the boosted input power and the data.

The second duty cycle may be determined by applying a weighted index, calculated by comparing a voltage level of the target boosted input power to the voltage level of the boosted input power, to the ping duty cycle.

The data may be provided in the form of a lookup-table, and the second duty cycle may be determined by searching through the lookup-table for a duty cycle corresponding to the voltage level of the boosted input power.

In another general aspect, a wireless power transmitter operated in a detection mode including a first mode and a second mode, and transmitting a ping signal in the detection mode, the transmitting wireless power transmitter, includes a converter, a resonator, and a controller. The converter includes at least one switching element, and is configured to convert input power into boosted input power based on a switching operation of the switching element, and output the boosted input power as an alternating current (AC) power. The resonator is configured to generate the ping signal from the AC power. The controller is configured to control the switching element, increase a duty cycle of a gate signal provided to the switching element from a first duty cycle in the first mode, and increase a duty cycle of the gate signal from a second duty cycle higher than the first duty cycle in the second mode.

The controller may be further configured to increase the duty cycle of the gate signal to a ping duty cycle in the first mode, and the boosted input power may reach a target boosted input power for generating the ping signal in the ping duty cycle.

The second duty cycle may be determined based on a weighted index, calculated by comparing a voltage level of the target boosted input power to a voltage level of the boosted input power, to the ping duty cycle.

The switching element may be configured to perform a converting operation from the boosted input power to the input power and an outputting operation from the boosted input power as AC power.

In another general aspect, a wireless power transmitter includes a converter, a resonator, and a controller. The converter is configured to generate an alternating current (AC) voltage. The resonator is configured to receive the AC voltage, and transmit a ping signal for determining whether an external object is within proximity. The controller is configured to control the switching element, and increase a duty cycle of a gate signal provided to the switching element by a step size from a first duty cycle to a target duty cycle.

The step size is an integer and the first duty cycle may be 0%.

The initial operation mode may correspond to a mode for transmitting the ping signal in a stop state for a time equal to or greater than a reference time.

According to an aspect of the present disclosure, a wireless power transmitter may include a converter including at least one switching element, and boosting input power and then generating boosted input power, a resonator receiving the boosted input power in the form of alternating current (AC) power from the converter, and transmitting a ping signal in a detection mode for determining at least one of whether or not an external object is approaching and the type of the external object, and a controller controlling the at least one switching element, wherein the controller gradually increases a duty of a gate signal provided for the at least one switching element, in the detection mode.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
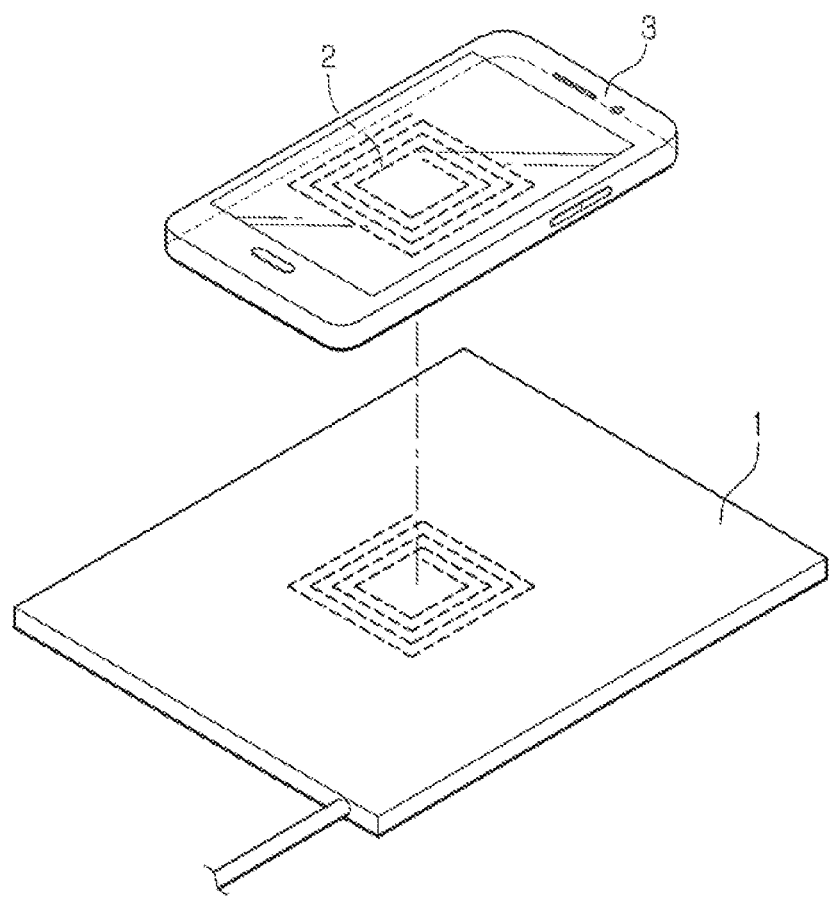
FIG. 1 is a diagram schematically illustrating an application of a wireless power transmitter, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram schematically illustrating an application of a wireless power transmitter 1, according to an embodiment.

Referring to FIG. 1, the wireless power transmitter 1 and a wireless power receiver 2 are magnetically coupled to each other to wirelessly transmit and receive power. As an example, the wireless power transmitter 1 and the wireless power receiver 2 are coupled to each other by magnetic resonance and/or magnetic induction.

The wireless power receiver 2 provides the received power to an electronic device 3. The electronic device 3 performs an operation, such as charging an internal battery using the power provided by the wireless power receiver 2. The wireless power receiver 2 is present in the electronic device 3 as one component, or may be a separate device connected to the electronic device 3.

Referring to FIG. 1, the wireless power receiver 2 is disposed in a position adjacent to the wireless power transmitter 1, but the relative distance and/or alignment from the wireless power transmitter 1 to the wireless power receiver 2 may be changed. The wireless power transmitter 1 may be operated in boost mode to stably transmit power to the wireless power receiver 2 in situations where the wireless power receiver 2 does not sufficiently receive required power due to increased distance or misalignment from the wireless power transmitter 1 and the wireless power receiver 2, large amount of power is required due to the battery of the electronic device 3 being close to a discharged state, and/or in other required cases. Alternatively, the wireless power transmitter 1 may be operated in a reduction mode to prevent unnecessary power consumption and prevent overheating of the wireless power receiver 2 and/or the electronic device 3 in situations where the wireless power receiver 2 receives required power or more than the required power due to the distance from the wireless power transmitter 1 being decreased or the alignment between the wireless power transmitter 1 and the wireless power receiver 2 improves, in a case in which a reduced amount of power is required due to the battery of the electronic device 3 being close to a fully charged state.

Figure 2:
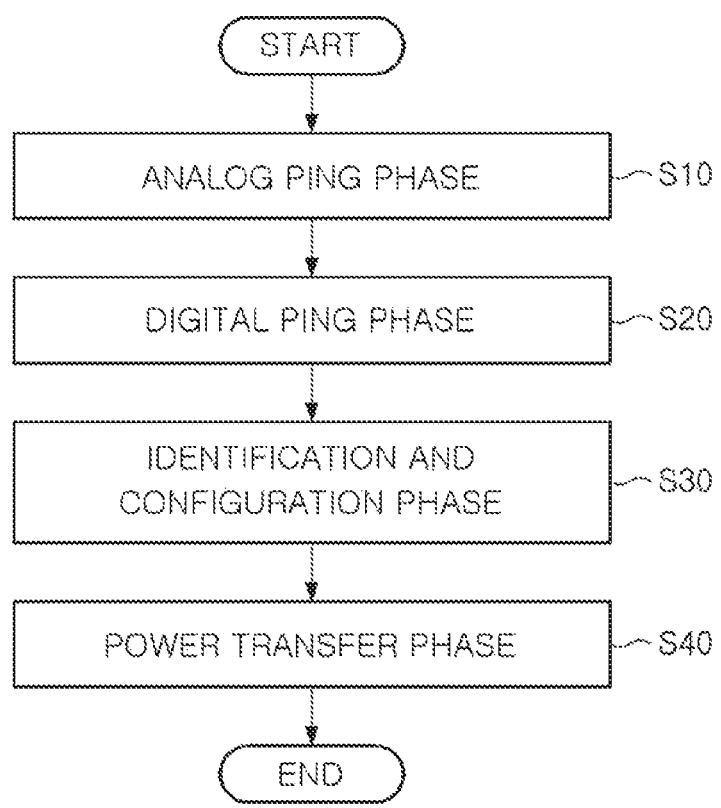
FIG. 2 is a diagram schematically illustrating a wireless power transmission method, according to an embodiment.

FIG. 2 is an operation flowchart schematically illustrating a method for wirelessly transmitting power, according to an embodiment.

The wireless power transmission method of FIG. 2 may be performed by the wireless power transmitter 1. Although the flowchart of FIG. 2 is illustrated in a sequential time order, the order of some operations may be modified or some operations may be omitted, and some phases may also be periodically repeated. As an example, the wireless power transmitter 1 periodically enters an analog ping phase (S10) and a digital ping phase (S20).

Referring to FIGS. 1 and 2, the wireless power transmission method begins by the wireless power transmitter 1 entering the analog ping phase (S10).

In the analog ping phase, the wireless power transmitter 1 transmits an analog ping signal. In a case in which an impedance level of the analog ping signal changes, the wireless power transmitter 1 determines that an external object is positioned around the wireless power transmitter 1. For example, the wireless power transmitter 1 transmits the analog ping signal through a transmission coil or other coils, and determines whether the external object is positioned around the wireless power transmitter 1 using a change in impedance of the coil that transmits the analog ping signal or a change in the level of the analog ping signal. The analog ping signal may be transmitted according to a set period.

In a case in which it is determined that a predetermined external object is adjacent to the wireless power transmitter 1 in the analog ping phase, the wireless power transmitter 1 enters the digital ping phase (S20). Alternatively, the wireless power transmitter 1 enters the digital ping phase based on a set period. The wireless power transmitter 1 transmits a digital ping signal in the digital ping phase to determine whether the external object, which is adjacent to the wireless power transmitter 1, is the wireless power receiver. For example, the wireless power transmitter 1 determines whether the external object adjacent thereto is the wireless power receiver depending on whether a response signal is received from the wireless power receiver 2, after transmitting the digital ping signal.

The wireless power transmitter 1 enters an identification and configuration phase (S30) in response to receiving the response signal of the wireless power receiver for the digital ping signal. In a case in which the external object is the wireless power receiver, the wireless power receiver transmits the response signal for the received digital ping signal. The response signal of the wireless power receiver includes any one or any combination of information regarding signal strength, a kind of the wireless power receiver, input voltage strength, power required by the wireless power receiver, and an error value indicating a difference between the power required by the wireless power receiver and power received by the wireless power receiver. Therefore, the wireless power transmitter 1 confirms a target and a power demand using the response signal of the wireless power receiver for the digital ping signal.

Thereafter, the wireless power transmitter 1 enters a power transfer phase (S40), in which the wireless power transmitter 1 wirelessly provides the power to the wireless power receiver using the information confirmed in the identification and configuration phase (S30).

In the power transfer phase (S40), the wireless power transmitter 1 is operated in a normal mode, a boost mode, or a reduction mode.

The normal mode is, for example, an operation mode in which a duty cycle, or "duty" for short, of a control signal for controlling a switching element of the wireless power transmitter 1 is fixed to any value, and an operating frequency of the wireless power transmitter 1 is varied within a preset reference range. The value to which the duty cycle is fixed may be a duty cycle of a control signal generated to transmit the above-mentioned analog ping and/or digital ping signals, and other signals for determining whether the wireless power receiver is present. The reference range of the operating frequency may be a frequency range usable by a defined standard, determined by considering the degree of heat generated in the wireless power receiver, of a spatial region to be charged using the wireless power transmitter within the usable frequency range, or determined by considering power transfer characteristics between the wireless power transmitter 1 and the wireless power receiver 2.

The boost mode is, for example, an operation mode of the wireless power transmitter 1 in which the wireless power receiver 2 is operated to receive a larger amount of power in comparison to the normal mode. The wireless power transmitter 1 may adjust the duty cycle or adjust the operating frequency to be lower than the reference range to allow the wireless power receiver 2 to receive a larger amount of power.

The reduction mode is, for example, an operation mode of the wireless power transmitter 1 in which the wireless power receiver 2 is operated to receive a smaller amount of power in comparison to the normal mode. The wireless power transmitter 1 may adjust the duty cycle or adjust the operating frequency to be greater than the reference range to allow the wireless power receiver 2 to receive a smaller amount of power.

Although FIG. 2 illustrates a case in which the wireless power transmitter 1 uses the analog ping signal and the digital ping signal to determine whether the wireless power receiver 2 is present. The wireless power transmitter 1 may also determine whether the wireless power receiver 2 is present by using a signal other than the ping signals.

In addition, although FIG. 2 illustrates a case in which the wireless power transmitter 1 performs the analog ping phase and the digital ping phase to determine whether the wireless power receiver 2 is present, the wireless power transmitter 1 may also determine whether the wireless power receiver 2 is present in a different manner. For example, the wireless power transmitter 1 may determine whether the wireless power receiver 2 is present by using a separate local area communications circuit, such as Bluetooth, and may also determine whether the external object is adjacent to the wireless power transmitter 1 and whether the adjacent object is the wireless power receiver through one phase or three or more phases.

Figure 3:
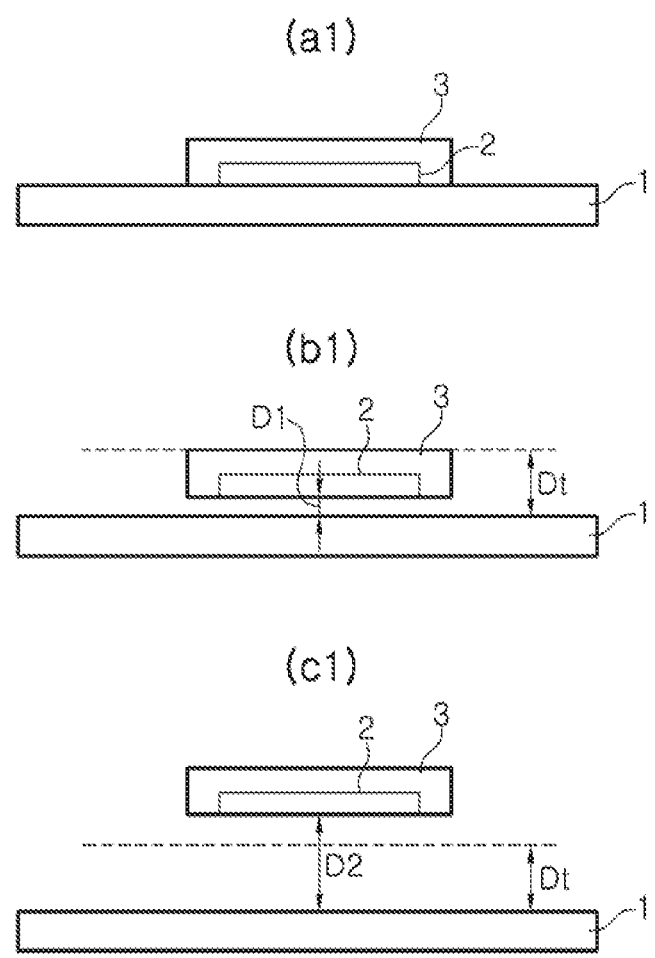
FIG. 3 is a diagram illustrating a change in an operation of the wireless power transmitter for transmitting power required by a wireless power receiver depending on the distance between the wireless power transmitter and the wireless power receiver.

FIG. 3 is a diagram illustrating a changed operation of the wireless power transmitter 1 based on a distance between the wireless power transmitter 1 and the wireless power receiver 2, and illustrates the electronic device 3 including the wireless power receiver 2 and the wireless power transmitter 1.

FIG. 3 illustrates situations (a1) through (c1). Situation (a1) illustrates a case in which the wireless power receiver 2 is mounted on the wireless power transmitter 1, situation (b1) illustrates a case in which the wireless power receiver 2 is spaced apart from the wireless power transmitter 1 by a spacing threshold distance Dt or less, and situation (c1) illustrates a case in which the wireless power receiver 2 is spaced apart from the wireless power transmitter 1 by the spacing threshold distance Dt or more.

In situation (c1), as compared to situation (a1) or situation (b1), in order for the wireless power receiver 2 to receive a required amount of power, the wireless power transmitter 1 needs to transmit a larger amount of power. Conversely, in the case of situation (a1), as compared to situation (b1) or situation (c1), even when the wireless power transmitter 1 transmits the least amount of power, the wireless power receiver 2 receives the required amount of power.

In the example illustrated in FIG. 3, the spacing threshold distance Dt is an effective charging distance at the time of transmission at maximum power in the normal mode.

When the distance between the wireless power transmitter and the wireless power receiver is equal to the spacing threshold distance or less, the wireless power transmitter 1 is operated in the normal mode. That is, in situation (a1) and/or situation (b1), the wireless power transmitter 1 is operated in the normal mode in which the duty cycle is fixed and the operating frequencies of the switches are changed to adjust an output.

However, when the distance between the wireless power transmitter 1 and the wireless power receiver 2 is greater than the spacing threshold distance, the wireless power transmitter 1 is operated in the boost mode to compensate for the distance. That is, in situation (c1), the wireless power transmitter 1 adjusts the duty cycle, and/or the operating frequency.

Alternatively, the wireless power transmitter 1 is operated in the normal mode in situation (b1), and in the reduction mode in situation (a1).

Figure 4:
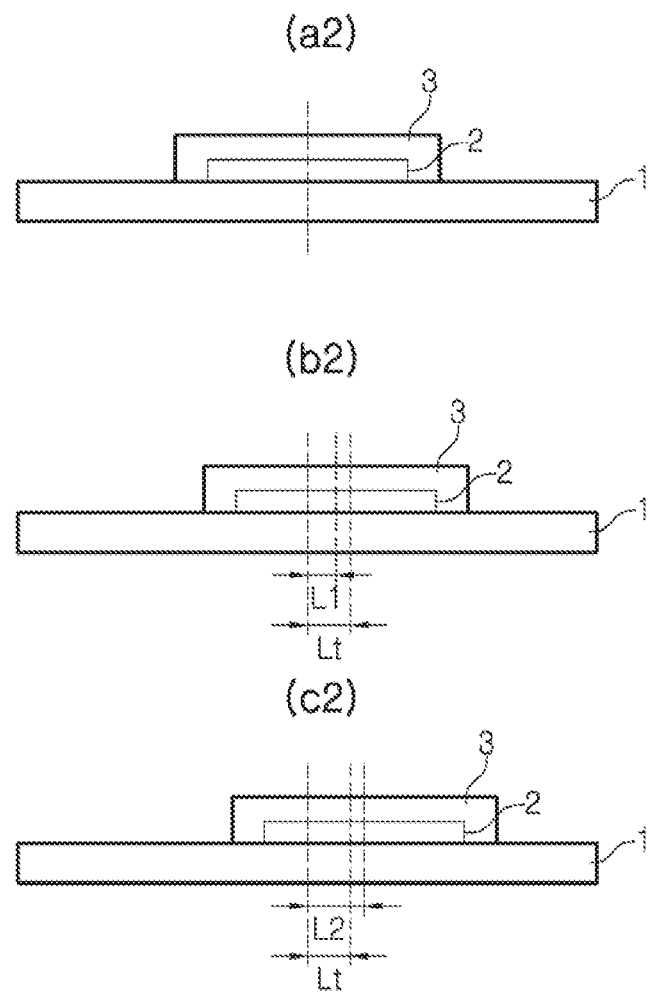
FIG. 4 is a diagram illustrating a change in an operation of the wireless power transmitter for transmitting power required by the wireless power receiver depending on the degree of alignment between the wireless power transmitter and the wireless power receiver.

FIG. 4 is a diagram illustrating a changed operation of the wireless power transmitter 1 based on a degree of alignment between the wireless power transmitter 1 and the wireless power receiver 2, and illustrates the electronic device 3 including the wireless power receiver 2 and the wireless power transmitter 1.

FIG. 4 illustrates situation (a2) through situation (c2). In situation (a2), the center of the wireless power receiver 2 and the center of the wireless power transmitter 1 coincide with each other. In situation (b2), the center of the wireless power receiver 2 and the center of wireless power transmitter 1 are misaligned by a distance L1, which is less than or equal to a spacing threshold distance Lt. Situation (c2) illustrates a case in which misalignment between the center of the wireless power receiver 2 and the center of wireless power transmitter 1 are spaced apart by a distance L2, which is greater than or equal to the spacing threshold distance Lt.

In the case of situation (c2), as compared to situation (a2) or situation (b2), in order for the wireless power receiver 2 to receive the required amount of power, the wireless power transmitter 1 needs to transmit a larger amount of power. Conversely, in the case of situation (a2), as compared to situation (b2) or situation (c2), even though the wireless power transmitter 1 transmits the least amount of power, the wireless power receiver 2 receives the required amount of power.

In the illustrated example, the spacing threshold distance Lt represents an effective charging distance, at the time of transmission, at maximum power in the normal mode.

Similarly to the situations described in FIG. 3, in situation (a2) and/or situation (b2), the wireless power transmitter 1 is operated in the normal mode. In situation (c2), the wireless power transmitter 1 is operated in the boost mode. Alternatively, in situation (a2), the wireless power transmitter 1 is also operated in the reduction mode.

Figure 5:
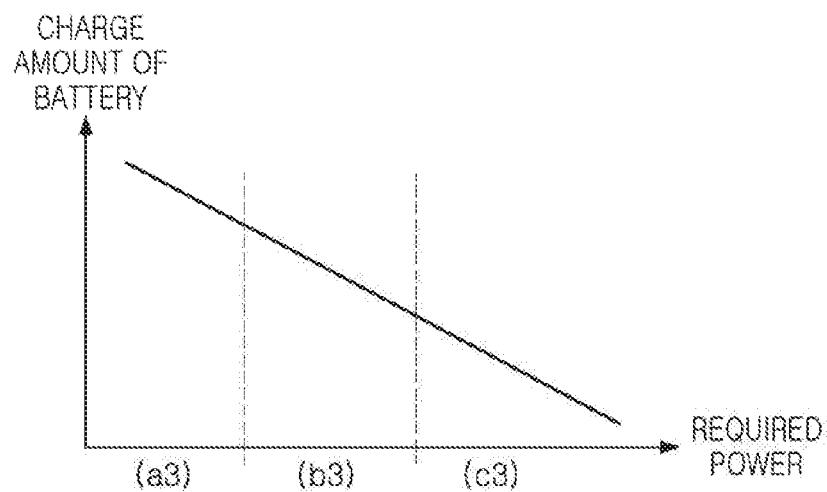
FIG. 5 is a diagram illustrating a change in an operation of the wireless power transmitter for transmitting power required by the wireless power receiver depending on the amount of charge of a battery of the wireless power receiver.

FIG. 5 is a diagram illustrating a changed operation of the wireless power transmitter 1 based on an amount of charge of a battery of the wireless power receiver 2.

In situation where the amount of charge of the battery approaches a full charge state (situation (a3)), the wireless power receiver requires the least amount of power. In a case in which the amount of charge of the battery approaches a discharge state (situation (c3)), the wireless power receiver requires a larger amount of power.

The wireless power transmitter 1 determines the operation mode in response to the signal received from the wireless power receiver 2. In this case, the wireless power transmitter is operated in the normal mode in situation (b3), the boost mode in situation (c3), and the reduction mode in situation (a3).

Figure 6:
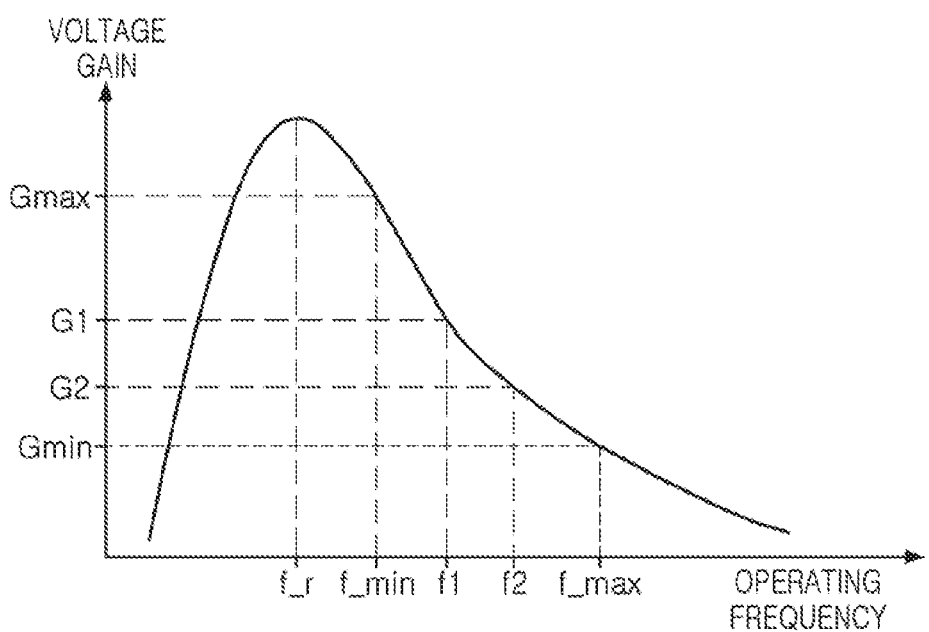
FIG. 6 is a diagram illustrating a relationship between a voltage gain and an operating frequency between a transmission coil of the wireless power transmitter and a reception coil of the wireless power receiver.

FIG. 6 is a diagram illustrating a relationship between a voltage gain and an operating frequency between a transmission coil of the wireless power transmitter and a reception coil of the wireless power receiver, wherein the X axis represents the operating frequency and the Y axis represents the voltage gain.

Referring to FIG. 6, in normal mode, the wireless power transmitter fixes the duty cycle of the switches and adjusts the operating frequency between a first reference frequency f1 and a second reference frequency f2. The duty cycle in the normal mode may be the duty cycle of the signal used by the wireless power transmitter to determine whether the wireless power receiver is present. In normal mode, when the wireless power receiver 2 is somewhat distant from the wireless power transmitter 1 or requires a larger amount of power, the wireless power transmitter increases the amount of power received by the wireless power receiver 2 by decreasing the frequency. Alternatively, in the normal mode, when the wireless power receiver 2 is somewhat closer to the wireless power transmitter 1 or requires a smaller amount of power, the wireless power transmitter 1 decreases the amount of power received by the wireless power receiver 2 by increasing the frequency.

Also, when the amount of power required by the wireless power receiver 2 is higher than the maximum value of power that the wireless power receiver 2 receives in normal mode, the wireless power transmitter 1 changes the operation mode to the boost mode so that the wireless power receiver 2 receives an amount of power equal to or more than an amount of power receivable by the wireless power receiver 2 in the normal mode. In this case, the operating frequency of the wireless power transmitter is fixed to the first reference frequency f1, and the duty cycle is adjusted. Further, when the amount of power received by the wireless power receiver is not sufficiently large, even when the duty cycle is increased to a limit value of a defined range, the wireless power transmitter 1 additionally decreases the operating frequency after fixing the duty cycle to the limit value. A detailed operation in the boost mode will be described below.

In addition, when the amount of power required by the wireless power receiver 2 is lower than the minimum value of the power that the wireless power receiver 2 receives in the normal mode, the wireless power transmitter 1 changes the operation mode to the reduction mode. In this case, the operating frequency of the wireless power transmitter 1 is fixed to the second reference frequency f2, and the duty cycle is adjusted. Alternatively, the wireless power transmitter may operate as a full bridge and then also operate as a half bridge. A detailed operation in the reduction mode will be described below.

The first reference frequency f1 and the second reference frequency f2 may each be equal to each of the minimum frequency f_min and the maximum frequency f_max. The minimum frequency f_min and the maximum frequency f_max may each be a lower limit value and an upper limit value of a usable frequency range defined by standards or other protocols. Alternatively, the first reference frequency f1 and the second reference frequency f2 may also be determined based on the degree of heat generated in the wireless power receiver 2 or a range of a spatial region to be charged using the wireless power transmitter 1 in the range of the minimum frequency f_min to the maximum frequency f_max. By determining the first reference frequency f1 and the second reference frequency f2 as described above, the wireless power transmitter 1 operates more stably within a defined range, and prevents damage or over-heating of an element in the wireless power receiver 2.

Alternatively, the first reference frequency f1 and the second reference frequency f2 are also determined by considering power transfer characteristics between the wireless power transmitter 1 and the wireless power receiver 2 in the range of the minimum frequency f_min to the maximum frequency f_max.

In a case in which the operating frequency is within a predetermined range between frequency value f2 and f_max as illustrated in FIG. 6, since a change of the gain value with respect to a change of the frequency value has a gradual slope, it is easier to control the wireless power transmitter 1 so that the wireless power receiver 2 receives an appropriate amount of power. However, since a change of the gain value with respect to a change of the operating frequency value is large when the operating frequency falls to a predetermined threshold frequency value f1 or less, and the change of the gain with respect to the change of the operating frequency may be excessively small when the operating frequency reaches a predetermined threshold value f2 or more, it is not easy to control the wireless power transmitter 1 so that the wireless power receiver 2 receives an appropriate amount of power.

In consideration of the above-mentioned aspects, when the wireless power transmitter 1 is operated in normal mode, the first reference frequency f1 and the second reference frequency f2 are determined so that a change of the gain value with respect to a change of the operating frequency value is within a reference range. That is, referring to the graph illustrated in FIG. 6, the first reference frequency f1 is determined as a frequency at which the change of the gain value with respect to the change of the frequency value in the range of the minimum frequency f_min to the maximum frequency f_max is a predetermined maximum value. The second reference frequency f2 is determined as a frequency at which the change of the gain value with respect to the change of the frequency in the range of the minimum frequency f_min to the maximum frequency f_max is a predetermined minimum value.

By determining the first reference frequency f1 and the second reference frequency f2 as described above, the wireless power transmitter 1 prevents damage and/or over-heating of an element in the wireless power receiver 2, and more precisely controls power transmissions to the wireless power receiver.

The first reference frequency f1 and the second reference frequency f2 may be experimentally determined and set in advance, or may be input externally. Alternatively, the first reference frequency f1 and the second reference frequency f2 are also set or changed in the wireless power transmitter 1 after the wireless power transmitter 1 is operated. In order to set or change the first reference frequency f1 and the second reference frequency f2, the wireless power transmitter 1 may also perform a predetermined algorithm, and may also include an additional hardware configuration for this purpose.

In addition, as illustrated in FIG. 6, the voltage gain has a maximum value at a resonance frequency f_r. The resonance frequency f_r is a resonance frequency of a resonator of the wireless power transmitter to be described below. In this case, the minimum frequency f_min is about 110% of the resonance frequency f_r, and the maximum frequency f_max is about 150% of the resonance frequency f_r.

Figure 7:
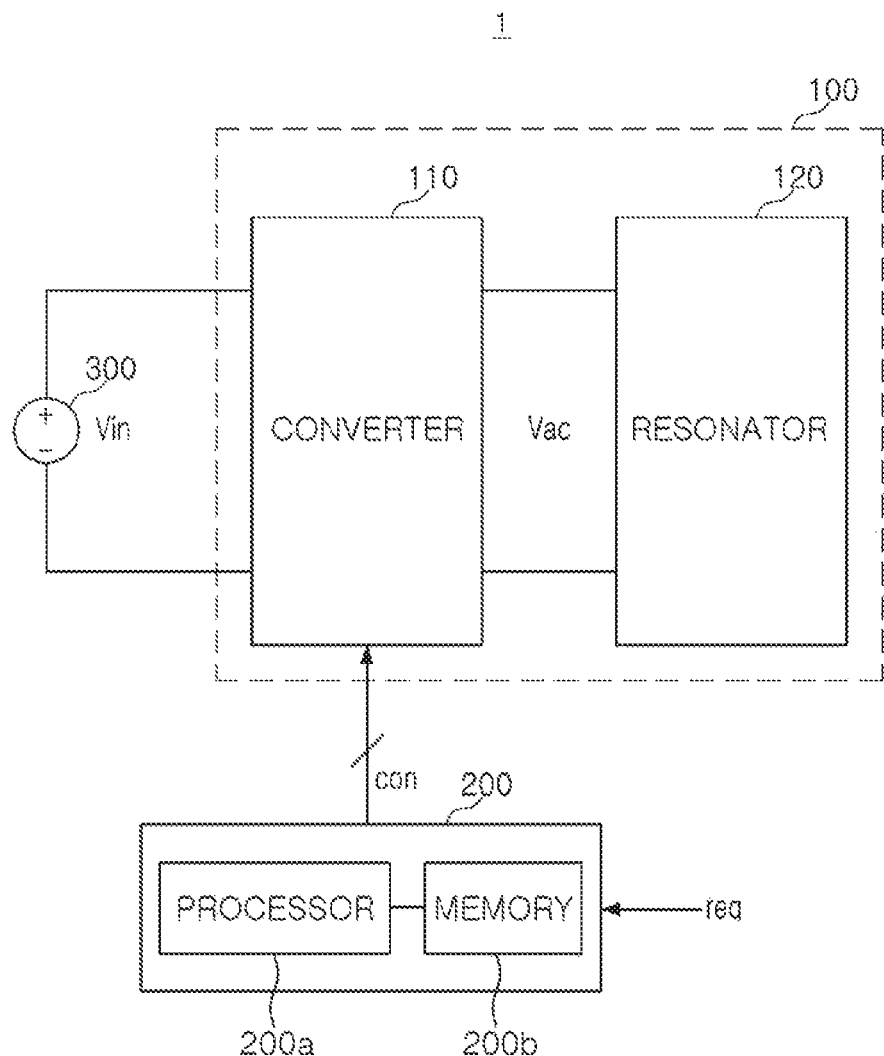
FIGS. 7 through 15 are diagrams each schematically illustrating a configuration of a wireless power transmitter, according to embodiments.

FIG. 7 is a block diagram schematically illustrating a configuration of the wireless power transmitter 1 including a circuit unit 100 and a controller 200, according to an embodiment. The circuit unit 100 includes a converter 110 and a resonator 120. In FIG. 7, reference numeral 300 denotes an input power source.

The circuit unit 100 is provided with an input voltage Vin from the input power source 300, and wirelessly transmits the power in response to at least one control signal con. An amount and frequency of the power wirelessly transmitted is varied by the control signal con.

The converter 110 converts the input voltage Vin into an alternating current (AC) voltage Vac in response to the control signal con, and outputs the converted AC voltage. Amplitude and frequency of the AC voltage Vac are determined based on the control signal con. For example, the amplitude of the AC voltage Vac is determined based on a duty cycle of the control signal con (when there are a plurality of control signals con, the duty cycle of some or all of the control signals con determines the amplitude of the AC voltage Vac). In addition, the frequency of the AC voltage Vac is determined based on a frequency of the control signal con (when there are a plurality of control signals con, the frequency of some or all of the control signals con determines the frequency of the AC voltage Vac).

The frequency of the AC voltage Vac may be greater than the resonance frequency f_r (FIG. 6) of the resonator 120. For example, the frequency of the AC voltage Vac may also be determined to be between about 110% to about 150% of the resonance frequency f_r (FIG. 6) of the resonator 120.

The converter 110 may be implemented in various forms. For example, the converter 110 may also include a boost converter and an inverter, may also include only the inverter, and may also include a boost inverter that performs both the function of the boost converter and the function of the inverter.

The resonator 120 is provided with the AC voltage Vac, and transmits a signal for determining whether the wireless power receiver 1 is present using the analog ping signal or the digital ping signal. The resonator 120 wirelessly transmits the signal and/or the power by changing a surrounding magnetic field based on the AC voltage Vac. The resonator 120 may include a resonance capacitor and a resonance coil, and the resonance frequency f_r (FIG. 6) of the resonator 120 may be determined by capacitance of the resonance capacitor and inductance of the resonance coil.

The controller 200 outputs at least one control signal con in response to a request signal req. The controller 200 adjusts a duty cycle and/or a frequency of the control signal con in response to the request signal req. The request signal req is input from the wireless power receiver 2, and represents an amount of power required by the wireless power receiver 2. For example, the request signal req may be a signal requesting an amount of power wirelessly transmitted by the wireless power transmitter 1 to increase, or may be a signal requesting the amount of power to decrease. Alternatively, the request signal req is also a signal representing a difference between the amount of power required by the wireless power receiver and an amount of power actually received by the wireless power receiver. The controller 200 determines whether to increase or decrease the amount of transmitted power based on the request signal req, and adjusts an operating duty cycle and an operating frequency of the control signal con accordingly.

For example, the controller 200 adjusts the operating frequency in the normal mode. In the boost mode or the reduction mode, the controller 200 adjusts the operating duty cycle or both the operating duty cycle and the operating frequency. For example, in the normal mode, the controller 200 decreases the frequency when a distance between the wireless power receiver 2 and the wireless power transmitter 1 increases, and increases the frequency when the distance decreases. In the boost mode or the reduction mode, the controller 200 increases the duty cycle when the distance between the wireless power receiver 2 and the wireless power transmitter 1 increases, and decreases the duty cycle when the distance decreases.

As an example, when the operating frequency corresponds to a lowest reference frequency and a normal mode operation is performed, if the request signal req requests the amount of power to increase, the controller 200 performs controlling so that the operation mode is switched from the normal mode to the boost mode.

As another example, when the operating duty cycle corresponds to a lowest reference duty cycle and a boost mode operation is performed, if the request signal req requests the amount of power to decrease, the controller 200 performs controlling so that the operation mode is switched from the boost mode to the normal mode.

A detailed operation of the controller 200 and controllers 201-208, according to additional embodiments, will be described below with reference to FIGS. 16 through 46.

As shown in FIG. 7, controller 200 includes at least one processor 200a. According to an embodiment, the controller 200 further includes a memory 200b. The processor 200a may include, a central processing unit (CPU), a graphics processing unit (GPU), a microprocessor, an application specific integrated circuit (ASIC), and/or field programmable gate arrays (FPGAs), and may have a plurality of cores. The memory 200b may be a volatile memory (e.g., a random access memory (RAM)), a non-volatile memory (e.g., a read only memory (ROM) or a flash memory), or a combination thereof. A program including instructions configured to perform a wireless power transmission method according may be stored in the memory.

The controller 200 may include a gate driver. Alternatively, the wireless power transmitter 1 separately includes the gate driver for driving switches included in the converter 110 based on the control signal con provided by the controller 200.

The input power source 300 outputs the input voltage Vin. For example, the input power source 300 is an adapter that converts an alternating current (AC) voltage input from the outside into a direct current (DC) voltage and outputs the converted DC voltage. A level of the input voltage Vin output from the input power source 300 may be one of various voltage levels which are standardized in a wireless power transmission and reception system. For example, the input voltage is one of 5V, 9V, and 12V.

Figure 8:
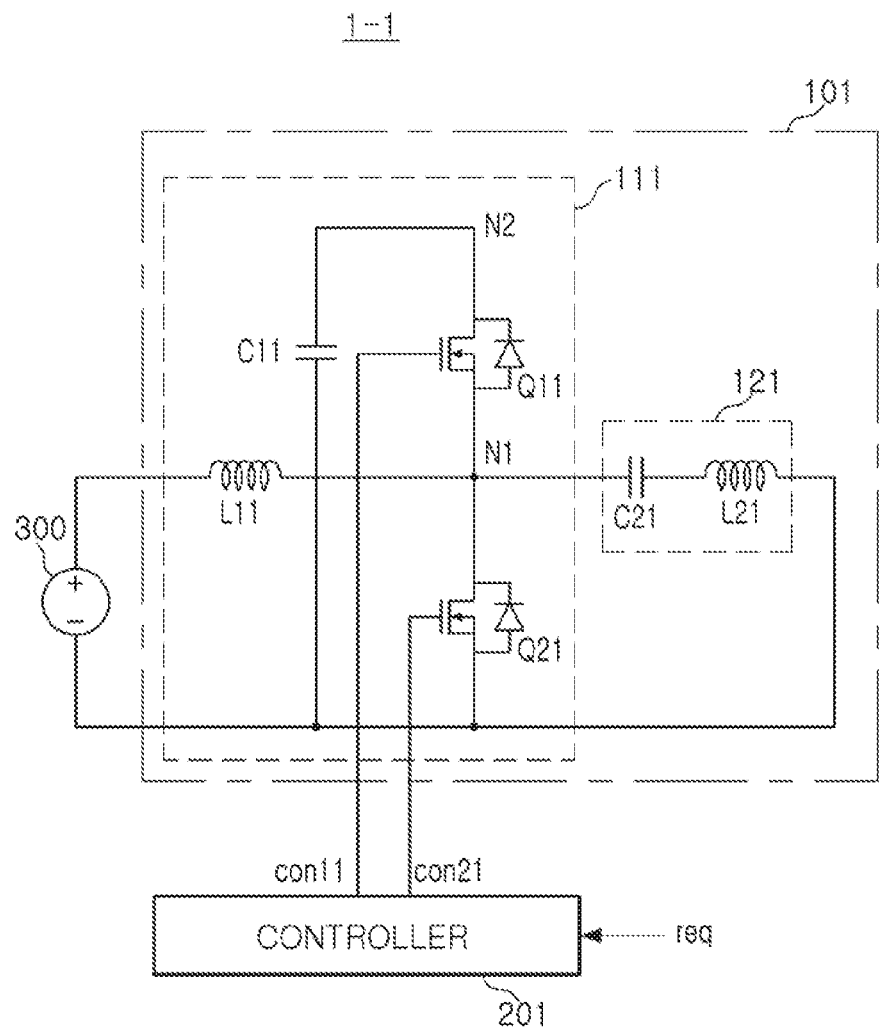

FIG. 8 is a diagram schematically illustrating a configuration of a wireless power transmitter 1-1 including a circuit unit 101 and a controller 201, according to an embodiment. The circuit unit 101 includes a converter 111 and a resonator 121. The converter 111 includes switching elements Q11 and Q21, a first coil L11, and a first capacitor C11. The resonator 121 includes a second capacitor C21 and a second coil L21.

Functions of the circuit unit 101, the converter 111, the resonator 121, the controller 201, and the input power source 300 are substantially the same as those of the circuit unit 100, the converter 110, the resonator 120, the controller 200, and the input power source 300, respectively, described in FIG. 7.

An amplitude of the AC voltage output from the converter 111 is determined based on magnitude of a voltage of a second node N2, that is, a boost voltage. The magnitude of the boost voltage Vboost is determined by Equation 1.

$$Vboost = Vin/(1-D) \quad \text{[Equation 1]}$$

In Equation 1, Vin is a magnitude of a voltage of power input from the input power source 300, and D is an ON-duty cycle of a second control signal con21.

The duty cycle in the boost mode is greater than the duty cycle in the normal mode. Therefore, a boost voltage in the boost mode is greater than a boost voltage in the normal mode, and consequently, the amount of power transmitted by the wireless power transmitter 1-1 in the boost mode is greater than an amount of power transmitted by the wireless power transmitter 1-1 in the normal mode.

In addition, a voltage of a first node N1 is the AC voltage output from the converter 111, and the AC voltage Vinv(t) output from the converter 111 is determined by Equation 2.

$$Vinv(t) = 2(Vin/(1-D))\sin(wt/\pi) \quad \text{[Equation 2]}$$

In Equation 2, w denotes a frequency of a first control signal con11 and the second control signal con21.

The first coil L11 is connected between a terminal to which the input voltage is applied and the first node N1. The first switching element Q11 is connected between the first node N1 and the second node N2. The second switching element Q21 is connected between the first node N1 and a ground terminal. The first capacitor C11 is connected between the second node N2 and the ground terminal. The AC voltage generated by the converter 111 is output to the first node N1. The voltage of the second node N2 is a boost voltage obtained by boosting the input voltage by the converter 111. The first switching element Q11 is turned on and off in response to the first control signal con11, and the second switching element Q21 is turned on and off in response to the second control signal con21. In addition, the first switching element Q11 and the second switching element Q21 are turned on and off complementarily with each other.

In other words, the converter 111 includes a bridge circuit, and the bridge circuit includes the first switch Q11 and the second switch Q21 connected in series with each other and alternately operated. One terminal of the inductor L11 is connected to one terminal of the input power source 300, and the other terminal of the inductor L11 is connected to a connection terminal (node N1) between the first and second switches. One terminal of the output capacitor C11 is connected to one terminal of a half-bridge circuit, and the other terminal of the output capacitor C11 is connected to the other terminal of the input power source 300 and the other terminal of the half-bridge circuit.

That is, the converter 111 simultaneously functions as the boost converter that boosts the input voltage to the boost voltage based on the duty cycle of the control signals con11 and con21, and as the inverter that converts the DC voltage into the AC voltage. Specifically, the switching elements Q11 and Q12, the first capacitor C11, and the first coil L11 are operated as the boost converter. In addition, the switching elements Q11 and Q12 are also operated as the inverter. In other words, the converter 111 includes a boost inverter having a form in which the boost converter and the inverter are coupled to each other and commonly use the switching elements Q11 and Q12.

More specifically, charges are accumulated in the first capacitor C11 by the switching operation of the switching elements Q11 and Q21 configuring the half-bridge circuit, such that a voltage across the first capacitor C11 becomes the boost voltage obtained by boosting the input voltage provided by the input power source 300, and the magnitude of the boost voltage is determined by the duty cycle of the control signals con11 and con21. In addition, the AC voltage generated by using the boost voltage accumulated in the output capacitor C11 is applied across the resonator 121 by the switching operation of the switching elements Q11 and Q21 configuring the half-bridge circuit. The amplitude of the AC voltage is determined by the magnitude of the boost voltage, and the frequency of the AC voltage is determined by the frequency of the control signals con11 and con21.

The switching operation of the switching elements Q11 and Q21 are controlled differently based on the modes of the wireless power transmitter 1-1.

The second capacitor C21 and the second coil L21 are connected in series between the first node N1 and the ground terminal. The second capacitor C21 is the resonance capacitor, the second coil L21 is the resonance coil, and an LC resonance is provided by the second capacitor C21 and the second coil L21. Therefore, the resonance frequency f_r (FIG. 6) of the resonator 121 is determined by capacitance of the second capacitor C21 and inductance of the second coil L21. That is, the capacitance of the second capacitor C21 and the inductance of the second coil L21 are determined based on a general environment in which the wireless power transmitter 1-1 is used, for example, a wireless power transmission standard. The frequency range of the control signals con11 and con21 is determined based on the resonance frequency in response to the determined capacitance and inductance.

The controller 201 outputs the control signals con11 and con21 in response to the request signal req. The controller 201 adjusts a duty cycle and/or a frequency of the control signals con11 and con21 in response to the request signal req.

Figure 9:
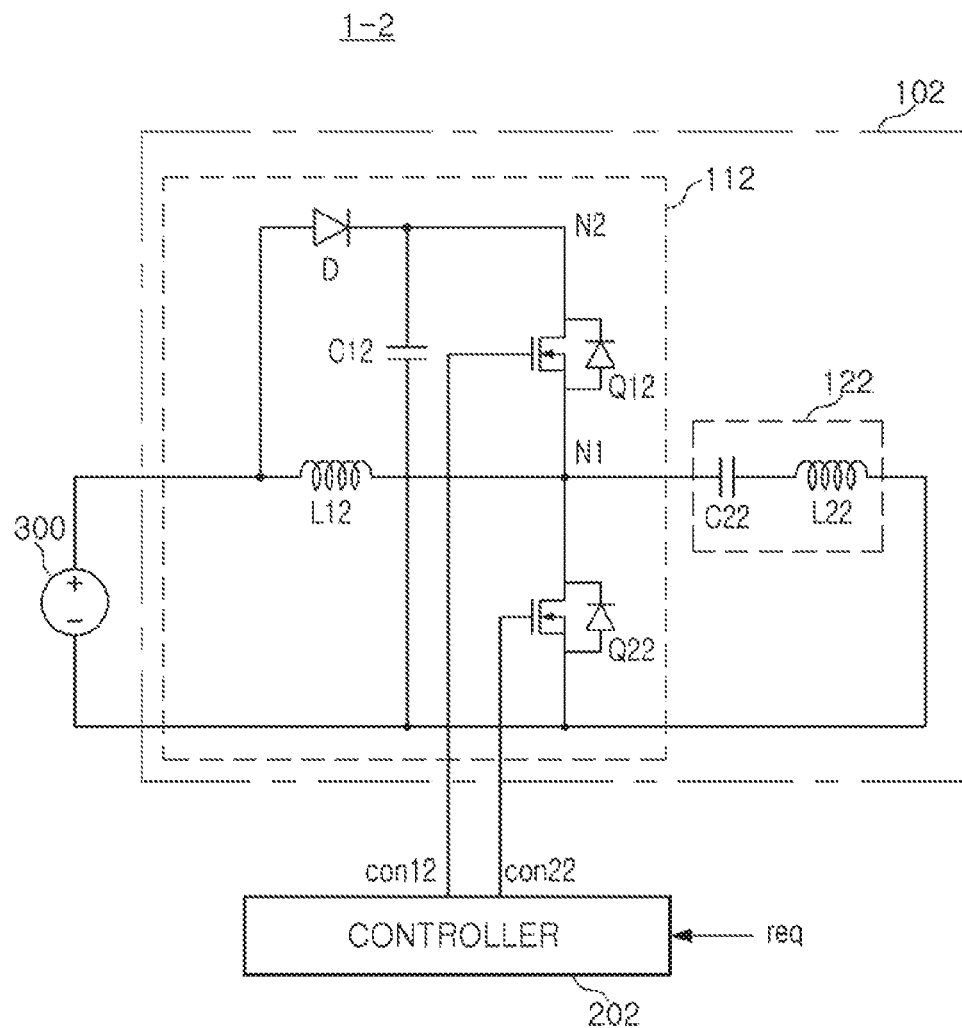

FIG. 9 is a diagram schematically illustrating a configuration of a wireless power transmitter 1-2 including a circuit unit 102 and a controller 202, according to an embodiment. The circuit unit 102 includes a converter 112 and a resonator 122. The converter 112 includes switching elements Q12 and Q22, a first coil L12, a first capacitor C12, and a diode D, and the resonator 122 includes a second capacitor C22 and a second coil L22.

Functions of the circuit unit 102, the converter 112, the resonator 122, the controller 202, and the input power source 300 are substantially the same as those of each of the circuit unit 100, the converter 110, the resonator 120, the controller 200, and the input power source 300, respectively, described in FIG. 7. In addition, the configuration and operation of the resonator 122 are the same as those of the resonator 121 described in FIG. 8.

The first coil L12 is connected between a terminal to which the input voltage is applied and the first node N1. The first switching element Q12 is connected between the first node N1 and the second node N2. The second switching element Q22 is connected between the first node N1 and a ground terminal. The first capacitor C12 is connected between the second node N2 and the ground terminal. The diode D is connected between the second node N2 and the terminal to which the input voltage is applied. The AC voltage generated by the converter 112 is output to the first node N1. The voltage of the second node N2 is a boost voltage obtained by boosting the input voltage by the converter 112. The first switching element Q12 is turned on and off in response to a first control signal con12, and the second switching element Q22 is turned on and off in response to a second control signal con22. In addition, the first switching element Q12 and the second switching element Q22 are turned on and off complementarily with each other.

An operation of the converter 112 can be easily understood with reference to the operation of the converter 111 described in FIG. 8. In addition, as illustrated in FIG. 9, the converter 112 includes half-bridge circuits Q12 and Q22 that perform both the functions of the boost converter and the inverter. That is, the converter 112 includes the boost converter and the inverter, and the boost converter and the inverter share the switching elements Q12 and Q22.

Since the converter 112 includes the diode D for preventing a reverse current flowing to the terminal to which the input voltage is applied from a boost node, it prevents ripples caused by the complementary switching operation of the first switching element Q12 and the second switching element Q22.

Figure 10:
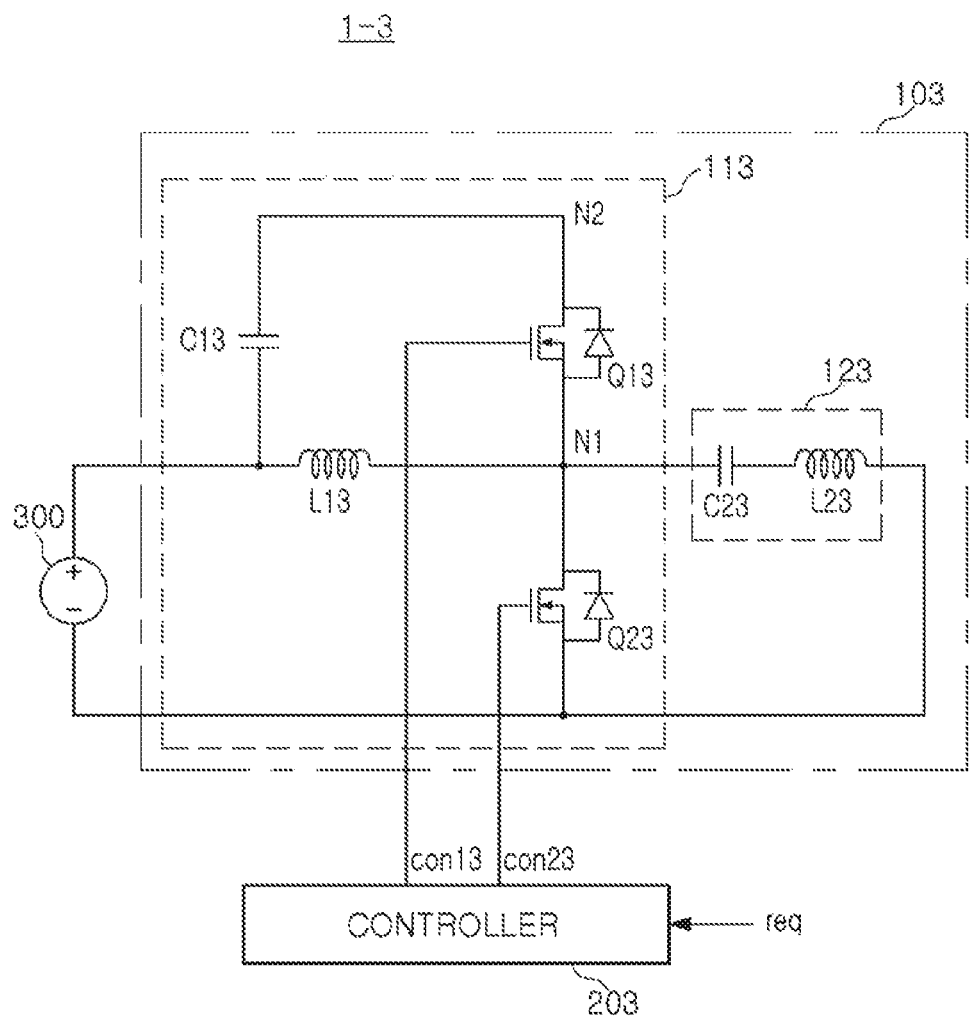

FIG. 10 is a diagram schematically illustrating a configuration of a wireless power transmitter 1-3 including a circuit unit 103 and a controller 203, according to an embodiment. The circuit unit 103 includes a converter 113 and a resonator 123. The converter 113 includes switching elements Q13 and Q23, a first coil L13 and a first capacitor C13. The resonator 123 includes a second capacitor C23 and a second coil L23.

Functions of the circuit unit 103, the converter 113, the resonator 123, the controller 203, and the input power source 300 are substantially the same as those of the circuit unit 100, the converter 110, the resonator 120, the controller 200, and the input power source 300, respectively, described in FIG. 7. In addition, the configuration and operation of the resonator 122 are the same as those of the resonator 121 described in FIG. 8.

The first coil L13 is connected between a terminal to which the input voltage is applied and the first node N1. The first switching element Q13 is connected between the first node N1 and the second node N2. The second switching element Q23 is connected between the first node N1 and a ground terminal. The first capacitor C13 is connected between the second node N2 and the terminal to which the input voltage is applied. The AC voltage generated by the converter 113 is output to the first node N1. The voltage of the second node N2 is a boost voltage obtained by boosting the input voltage by the converter 113. The first switching element Q13 is turned on and off in response to a first control signal con13, and the second switching element Q23 is turned on and off in response to a second control signal con23. In addition, the first switching element Q13 and the second switching element Q23 are turned on and off complementarily with each other.

An operation of the converter 113 can be easily understood with reference to the operation of the converter 111 described in FIG. 8. In addition, as illustrated in FIG. 10, the converter 113 includes half-bridge circuits Q13 and Q23 that perform both the functions of the boost converter and the inverter. That is, the converter 113 includes the boost converter and the inverter, and the boost converter and the inverter share the switching elements Q13 and Q23.

The converter 113 improves initial operation performance by causing an initial voltage of the first capacitor C13 to be the input voltage. In addition, the converter 113 prevents ripples which may be caused when a boosting is performed by an alternative operation of the switching elements Q13 and Q23.

Figure 11:
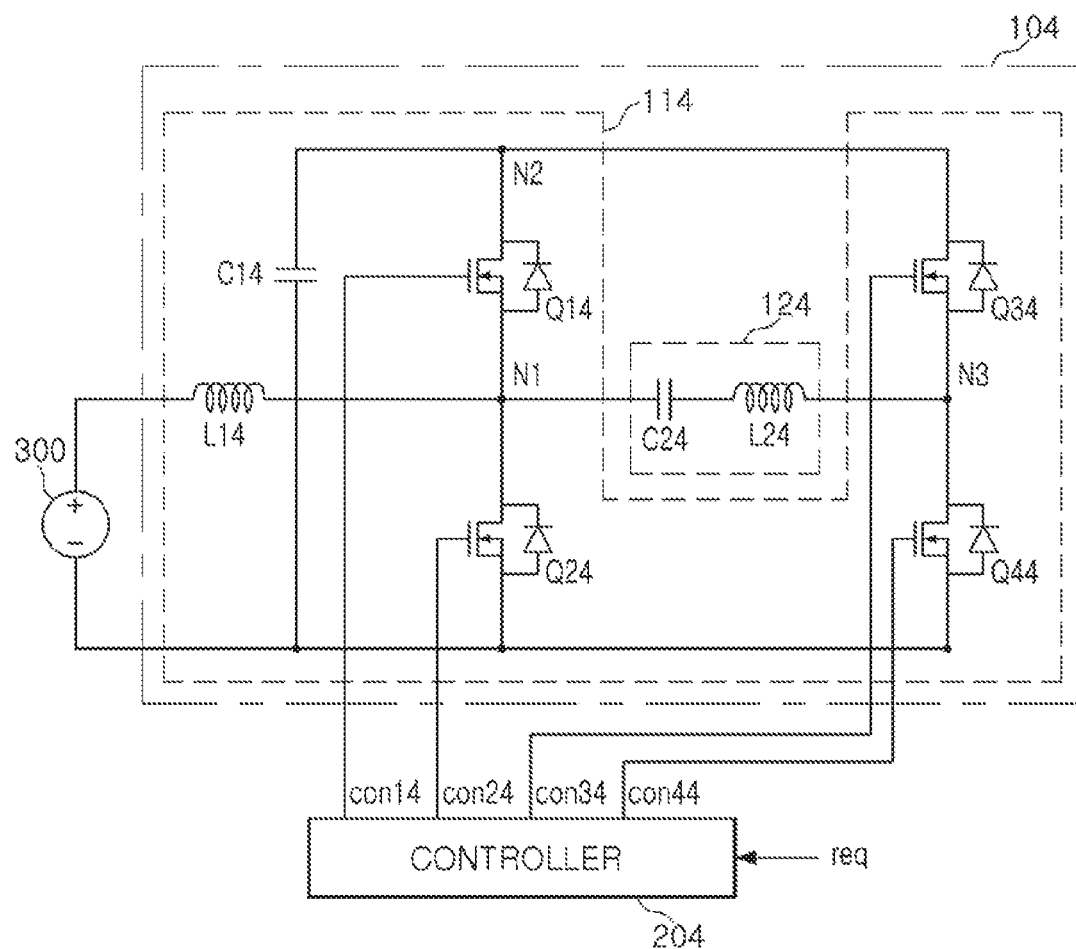

FIG. 11 is a diagram schematically illustrating a configuration of a wireless power transmitter 1-4 including a circuit unit 104 and a controller 204, according to an embodiment. The circuit unit 104 includes a converter 114 and a resonator 124. The converter 114 includes switching elements Q14, Q24, Q34, and Q44, a first coil L14, and a first capacitor C14. The resonator 124 includes a second capacitor C24 and a second coil L24.

Functions of the circuit unit 104, the converter 114, the resonator 124, the controller 204, and the input power source 300 are substantially the same as those of the circuit unit 100, the converter 110, the resonator 120, the controller 200, and the input power source 300, respectively, described in FIG. 7. In addition, the configuration and operation of the resonator 122 are the same as those of the resonator 121 described in FIG. 8.

The first coil L14 is connected between a terminal to which the input voltage is applied and the first node N1. The first switching element Q14 is connected between the first node N1 and the second node N2. The second switching element Q24 is connected between the first node N1 and a ground terminal. The third switching element Q34 is connected between the second node N2 and a third node N3. The fourth switching element Q44 is connected between the third node N3 and a ground node. The first capacitor C14 is connected between the second node N2 and the ground node. A voltage between the first node N1 and the third node N3 is the AC voltage generated by the converter 114. The voltage of the second node N2 is a boost voltage obtained by boosting the input voltage by the converter 114. The first switching element Q14 is turned on and off in response to a first control signal con14. The second switching element Q24 is turned on and off in response to a second control signal con24. The third switching element Q34 is turned on and off in response to a third control signal con34. The fourth switching element Q44 is turned on and off in response to a fourth control signal con44. In addition, the first switching element Q14 and the second switching element Q24 are turned on and off complementarily with each other, and the third switching element Q34 and the fourth switching element Q44 are turned on and off complementarily with each other. The third switching element Q34 maintains an OFF state, or may be turned on and off at the same timing as the second switching element Q24, and the fourth switching element Q44 maintains an ON state, or may be turned on and off at the same timing as the first switching element Q14.

The resonator 124 is connected between the first node N1 and the third node N3.

That is, the converter 114 is implemented as a full-bridge circuit. In some cases, the third switching element Q34 maintains the OFF state and the fourth switching element Q44 maintains the ON state, such that the converter is operated in the same manner as the half-bridge circuit, and the third switching element Q34 is turned on and off at the same timing as the second switching element Q24, and the fourth switching element Q44 is turned on and off at the same timing as the first switching element Q14, such that the converter 114 is operated in the same manner as the full-bridge circuit. In some cases, the third switching element Q34 and the fourth switching element Q44 are each turned on and off at a timing different from that of each of the second switching element Q24 and the first switching element Q14, and the converter 114 is also operated as the full-bridge circuit.

In the embodiment illustrated in FIG. 11, the first coil L14, the first capacitor C14, the first switching element Q14, and the second switching element Q24 are operated as the boost converter, and the first switching element Q14, the second switching element Q24, the third switching element Q34, and the fourth switching element Q44 are operated as the inverter. That is, the first switching element Q14 and the second switching element Q24 are operated as the boost converter, and are simultaneously operated as the inverter. In other words, the boost converter and the inverter share the f First switching element Q14 and the second switching element Q24 and are coupled to each other.

An output voltage Vinv(t) of the converter 114 of the wireless power transmitter 1-4 of FIG. 11, that is, a voltage between the first node N1 and the third node N3, are determined by Equation 3.

$$Vinv(t)=4(Vin/(1-D))\sin(wt/\pi) \quad \text{[Equation 3]}$$

In Equation 3, Vin is magnitude of a voltage of power input from the input power source 300, D is a duty cycle of a control signal con24, and w is a frequency of control signals con14, con24, con34, and con44.

That is, according to the embodiment of FIG. 11, since the same effect as that of doubling the input voltage is obtained as compared to the half-bridge circuit, current stress of the coil is reduced, and efficiency is also improved.

Figure 12:
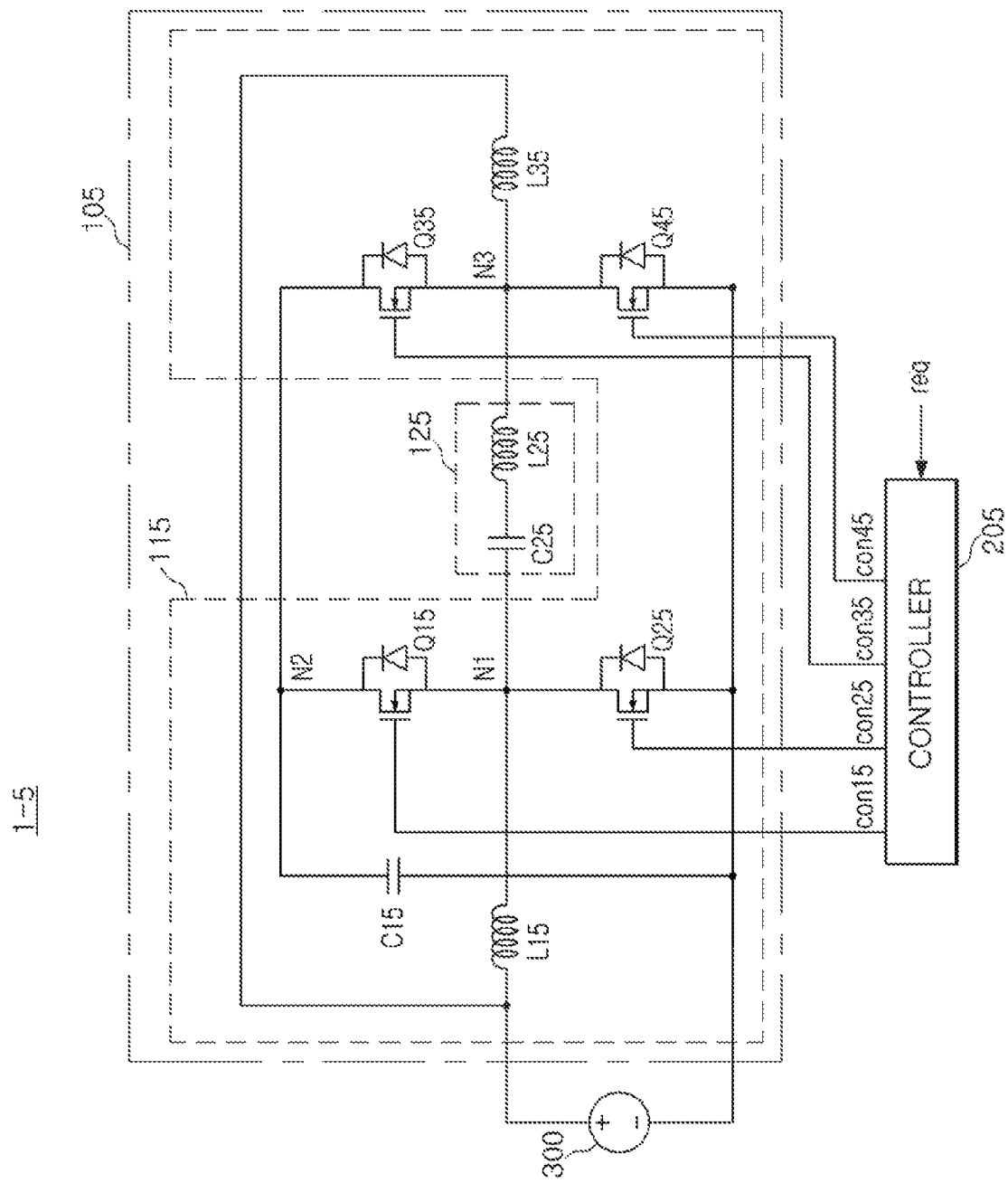

FIG. 12 is a diagram schematically illustrating a configuration of a wireless power transmitter 1-5 including a circuit unit 105 and a controller 205, according to an embodiment. The circuit unit 105 includes a converter 115 and a resonator 125. The converter 115 includes switching elements Q15, Q25, Q35, and Q45, a first coil L15, a third coil L35, and a first capacitor C15. The resonator 125 includes a second capacitor C25 and a second coil L25.

Functions of the circuit unit 105, the converter 115, the resonator 125, the controller 205, and the input power source 300 are substantially the same as that of each of the circuit unit 100, the converter 110, the resonator 120, the controller 200, and the input power source 300, respectively, described in FIG. 7. In addition, the configuration and operation of the resonator 125 are the same as those of the resonator 121 described in FIG. 8.

The first coil L15 is connected between a terminal to which the input voltage is applied and the first node N1. The first switching element Q15 is connected between the first node N1 and the second node N2. The second switching element Q25 is connected between the first node N1 and a ground terminal. The third switching element Q35 is connected between the second node N2 and a third node N3. The fourth switching element Q45 is connected between the third node N3 and a ground node. The third coil L35 is connected between the terminal to which the input voltage is applied and the third node N3. The first capacitor C15 is connected between the second node N2 and the ground node. A voltage between the first node N1 and the third node N3 is the AC voltage generated by the converter 115. The voltage of the second node N2 is a boost voltage obtained by boosting the input voltage by the converter 115. The first switching element Q15 is turned on and off in response to a first control signal con15. The second switching element Q25 is turned on and off in response to a second control signal con25. The third switching element Q35 is turned on and off in response to a third control signal con35. The fourth switching element Q45 is turned on and off in response to a fourth control signal con45. In addition, the first switching element Q15 and the second switching element Q25 are turned on and off complementarily with each other, and the third switching element Q35 and the fourth switching element Q45 are turned on and off complementarily with each other. The third switching element Q35 maintains an OFF state, or may be turned on and off at the same timing as the second switching element Q25, and the fourth switching element Q45 maintains an ON state, or may be turned on and off at the same timing as the first switching element Q15.

The resonator 125 is connected between the first node N1 and the third node N3.

That is, the converter 115 is implemented as a full-bridge circuit. In some cases, the third switching element Q35 maintains the OFF state and the fourth switching element Q45 maintains the ON state, such that the converter is operated in the same manner as the half-bridge circuit, and the third switching element Q35 is turned on and off at the same timing as the second switching element Q25, and the fourth switching element Q45 is turned on and off at the same timing as the first switching element Q15, such that the converter 115 is operated in the same manner as the full-bridge circuit. In some cases, the third switching element Q35 and the fourth switching element Q45 are each turned on and off at a timing different from that of each of the second switching element Q25 and the first switching element Q15, and the converter 115 is also operated as the full-bridge circuit.

In the embodiment illustrated in FIG. 12, the first coil L15, the third coil L25, the first capacitor L15, the first switching element C15, the second switching element Q25, the third switching element Q35, and the fourth switching element Q45 are operated as the boost converter, and the first switching element Q15, the second switching element Q24, the third switching element Q35, and the fourth switching element Q45 are operated as the inverter. That is, the first switching element Q15, the second switching element Q24, the third switching element Q35, and the fourth switching element Q45 are operated as the boost converter, and simultaneously operated as the inverter. In other words, the boost converter and the inverter share the first switching element Q15, the second switching element Q24, the third switching element Q35, and the fourth switching element Q45, and are coupled to each other.

According to the embodiment of FIG. 12, since the converter is operated as the full-bridge circuit to obtain the same effect as that of the input voltage being doubled as compared to the half-bridge circuit, current stress of the coil is reduced and efficiency improved. In addition, since the third switching element Q35 and the fourth switching element Q45 also contribute to boosting the input voltage, a capacitor having lower capacitance may also be used as the first capacitor C15.

Figure 13:
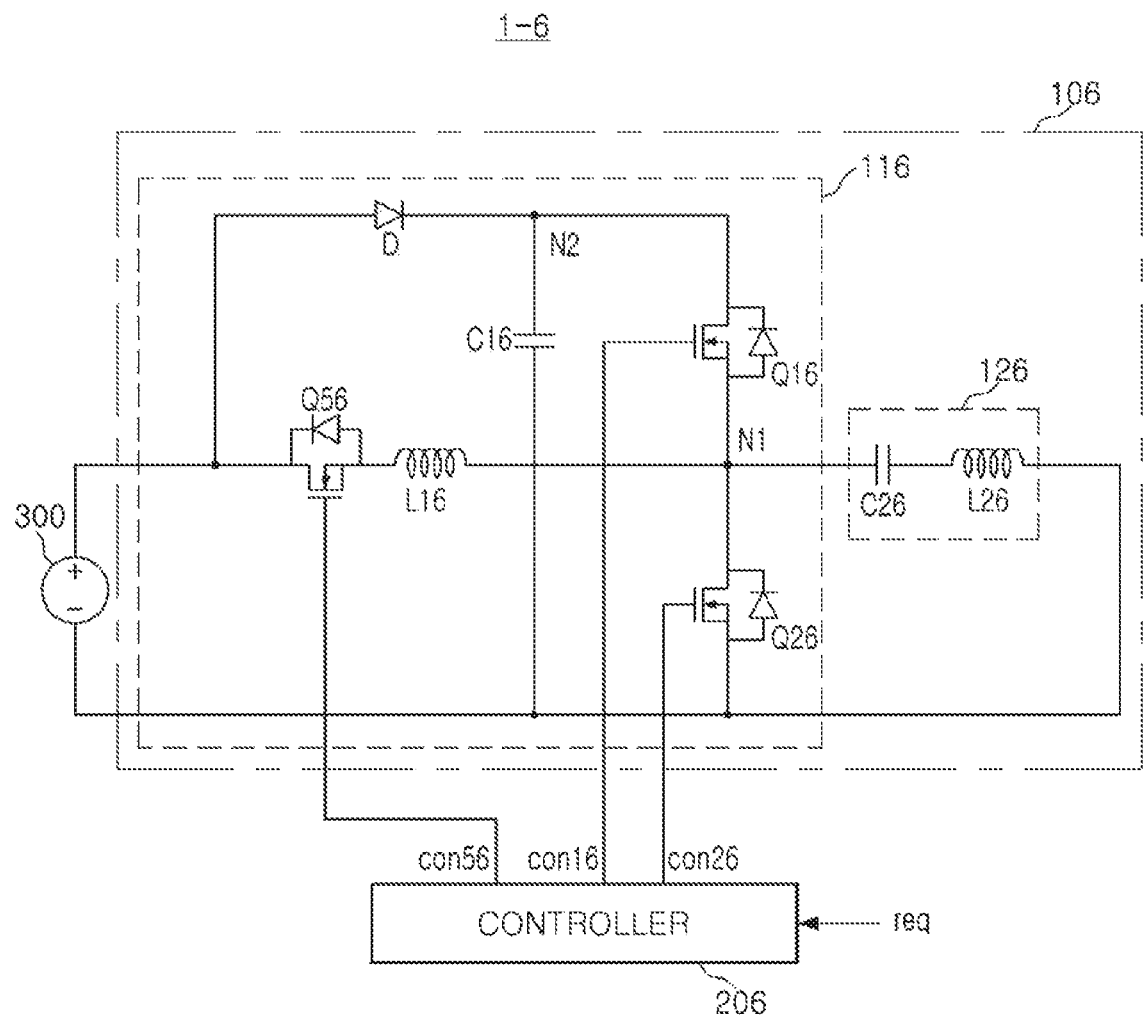

FIG. 13 is a diagram schematically illustrating a configuration of a wireless power transmitter 1-6 including a circuit unit 106 and a controller 206, according to an embodiment. The circuit unit 106 includes a converter 116 and a resonator 126. The converter 116 includes switching elements Q16, Q26, and Q56, a first coil L16, a first capacitor C16, and a diode D. The resonator 126 includes a second capacitor C26 and a second coil L26.

Functions of the circuit unit 106, the converter 116, the resonator 126, the controller 206, and the input power source 300 are substantially the same as that of each of the circuit unit 101, the converter 111, the resonator 121, the controller 201, and the input power source 300, respectively, described in FIG. 8. In addition, the configuration and operation of the resonator 126 are the same as those of the resonator 121 described in FIG. 8.

The first coil L13 and a fifth switching element Q56 are connected in series between a terminal to which the input voltage is applied and the first node N1. The switching element Q16 is connected between the first node N1 and the second node N2. The second switching element Q26 is connected between the first node N1 and a ground terminal. The first capacitor C16 is connected between the second node N2 and the ground terminal. The diode D is connected between the second node N2 and the terminal to which the input voltage is applied. The AC voltage generated by the converter 116 is output to the first node N1. The voltage of the second node N2 is a boost voltage obtained by boosting the input voltage by the converter 116. The first switching element Q16 is turned on and off in response to a first control signal con16. The second switching element Q26 is turned on and off in response to a second control signal con22. The fifth switching element Q56 is turned on and off in response to a fifth control signal con56. In addition, the first switching element Q16 and the second switching element Q26 are turned on and off complementarily with each other.

An operation of the converter 116 can be easily understood with reference to the operation of the converter 111 described in FIG. 8. In addition, as illustrated in FIG. 13, the converter 116 includes half-bridge circuits Q16 and Q26 that perform both the functions of the boost converter and the inverter. That is, the converter 116 includes the boost converter and the inverter, and the boost converter and the inverter share the switching elements Q16 and Q26.

The fifth switching element Q56 is turned on and off based on the magnitude of the input voltage input from the input power source 300. For example, when the magnitude of the input voltage is a reference value or less, the fifth switching element Q56 is turned on, and when the magnitude of the input voltage is greater than the reference value, the fifth switching element Q56 is turned off. When the fifth switching element Q56 is turned off, the converter 116 does not function as the boost converter, and functions only as the inverter.

Therefore, according to the embodiment of FIG. 13, since the function of the converter 116 is varied depending on the magnitude of the input voltage, the power is more efficiently transmitted.

Although not illustrated, the fifth switching element Q56 may also be added to each of the embodiments of FIGS. 8, 10, 11, and 12. In addition, the diode D of FIG. 9 may also be added to the embodiments of FIGS. 11 and 12. In addition, the first capacitor C14 and C15 according to the embodiments of FIGS. 11 and 12 may be connected in the same manner as the first capacitor C13 according to the embodiment of FIG. 10.

Figure 14:
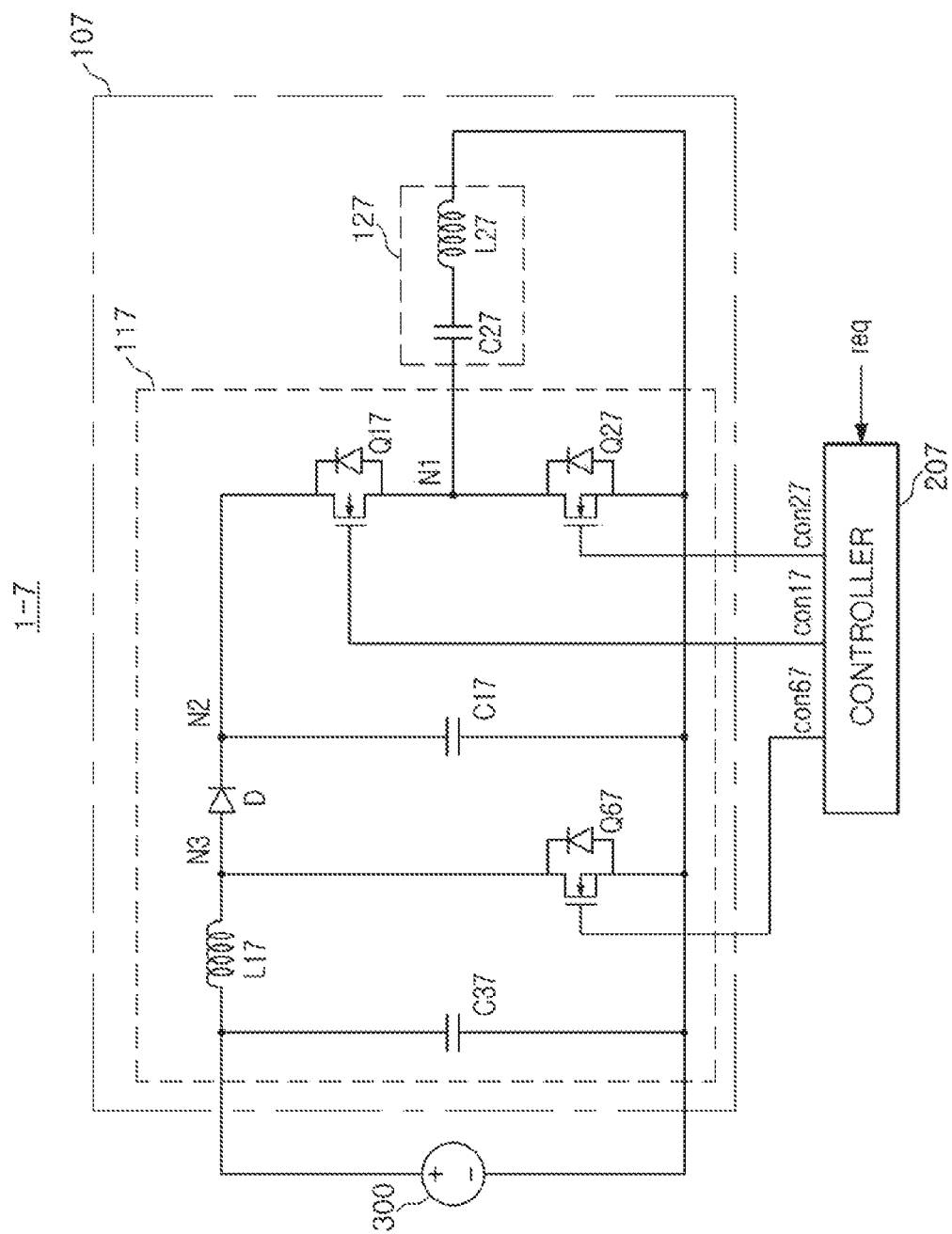

FIG. 14 is a diagram schematically illustrating a configuration of a wireless power transmitter 1-7 including a circuit unit 107 and a controller 207, according to an embodiment. The circuit unit 107 includes a converter 117 and a resonator 127. The converter 117 includes switching elements Q17, Q27, and Q67, a first coil L17, a first capacitor C17, a diode D, and a third capacitor C37. The resonator 127 includes a second capacitor C27 and a second coil L27.

Functions of the circuit unit 107, the converter 117, the resonator 127, the controller 207, and the input power source 300 are substantially the same as that of each of the circuit unit 100, the converter 110, the resonator 120, the controller 200, and the input power source 300, respectively, described in FIG. 7. In addition, the configuration and operation of the resonator 127 are the same as those of the resonator 121 described in FIG. 8.

The first coil L17 is connected between a terminal to which the input voltage is applied and the third node N3. The third capacitor C37 is connected between the terminal to which the input voltage is applied and a ground terminal. The sixth switching element Q67 is connected between the third node N3 and the ground terminal. The diode D is connected between the third node N3 and the second node N2. The first capacitor C17 is connected between the second node N2 and the ground terminal. The first switching element Q12 is connected between the first node N1 and the second node N2. The second switching element Q22 is connected between the first node N1 and the ground terminal. The AC voltage generated by the converter 117 is output to the first node N1. The voltage of the second node N2 is a boost voltage obtained by boosting the input voltage by the converter 117. The first switching element Q17 is turned on and off in response to a first control signal con17. The second switching element Q27 is turned on and off in response to a second control signal con27. The sixth switching element Q67 is turned on and off in response to a fifth control signal con67. In addition, the first switching element Q17 and the second switching element Q27 are turned on and off complementarily with each other.

According to the embodiment of FIG. 14, the duty cycle of the first switching element Q17 and the second switching element Q27 is fixed. That is, the amount of power received by the wireless power receiver is adjusted by adjusting a duty cycle of the sixth switching element Q67, or adjusting an operating frequency of the first switching element Q17 and the second switching element Q27.

In FIG. 14, the first coil L17, the sixth switching element Q67, the diode D, and the first capacitor C17 are operated as the boost converter, and the first switching element Q17 and the second switching element Q27 are operated as the inverter. That is, the boost converter and the inverter of the converter 117 are similar to those illustrated in FIG. 14.

Although FIG. 14 illustrates the case in which the converter 117 includes the half-bridge inverter, the converter 117 may also include the boost converter and the full-bridge inverter.

Figure 15:
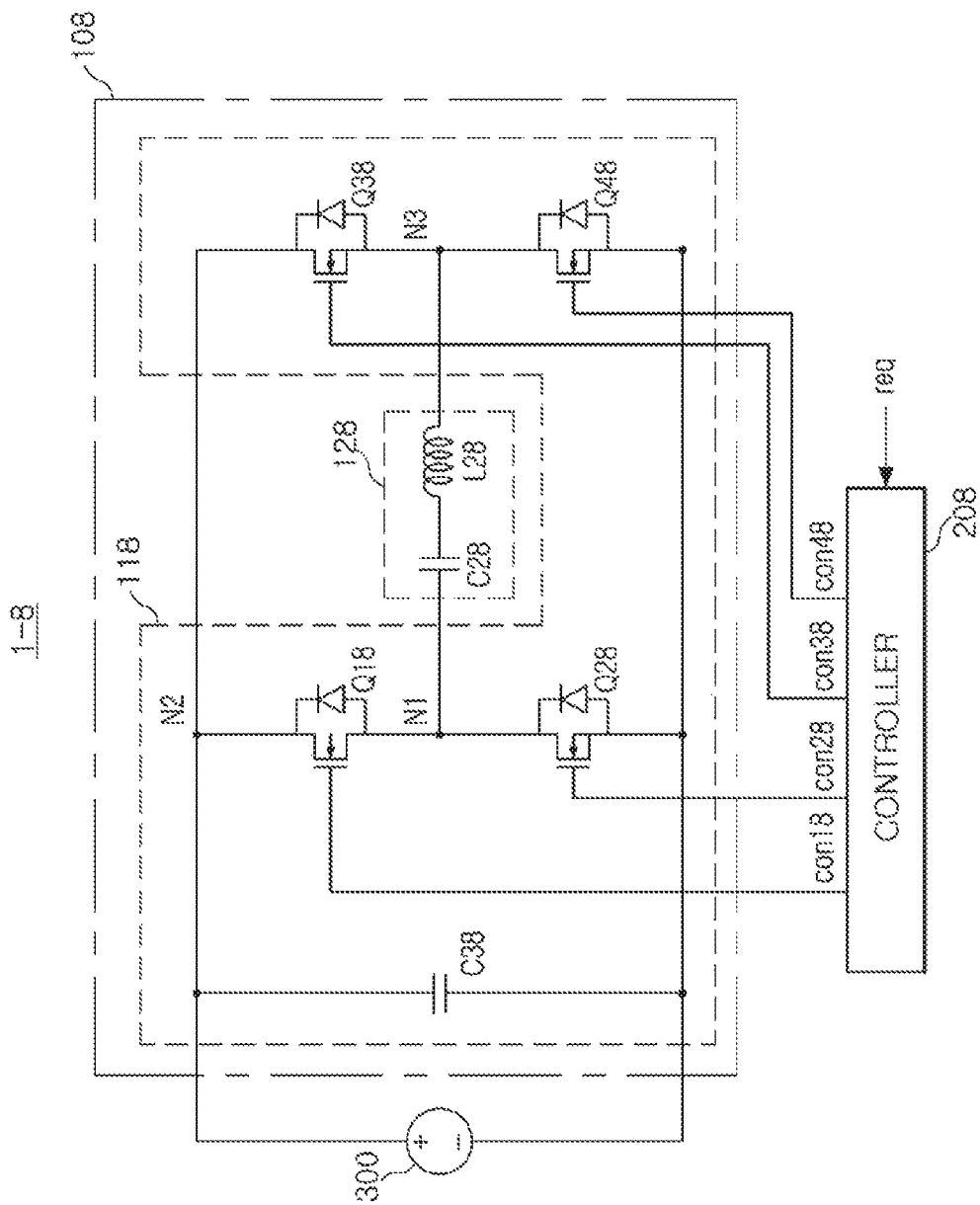

FIG. 15 is a diagram schematically illustrating a configuration of a wireless power transmitter according to an embodiment. The wireless power transmitter 1-8 includes a circuit unit 108 and a controller 208. The circuit unit 108 includes a converter 118 and a resonator 128. The converter 118 includes switching elements Q18, Q28, Q38, and Q48, and a third capacitor C38. The resonator 128 includes a second capacitor C28 and a second coil L28. In FIG. 15, reference numeral 300 denotes an input power source.

Functions of the circuit unit 108, the converter 118, the resonator 128, the controller 208, and the input power source 300 are substantially the same as that of each of the circuit unit 100, the converter 110, the resonator 120, the controller 200, and the input power source 300 described in FIG. 7. In addition, the configuration and operation of the resonator 128 are the same as those of the resonator 121 described in FIG. 8.

The first switching element Q18 is connected between the first node N1 and the second node N2. The second switching element Q28 is connected between the first node N1 and a ground terminal. The third switching element Q38 is connected between the second node N2 and the third node N3. The fourth switching element Q48 is connected between the third node N3 and a ground node. The third capacitor C38 is connected between the second node N2 and the ground node. A voltage between the first node N1 and the third node N3 is the AC voltage generated by the converter 118. The input voltage output from the input power source 300 is applied to the second node N2. The first switching element Q18 is turned on and off in response to a first control signal con18. The second switching element Q28 is turned on and off in response to a second control signal con28. The third switching element Q38 is turned on and off in response to a third control signal con38. The fourth switching element Q48 is turned on and off in response to a fourth control signal con48. In addition, the first switching element Q18 and the second switching element Q28 are turned on and off complementarily with each other, and the third switching element Q38 and the fourth switching element Q48 are turned on and off complementarily with each other. The third switching element Q38 maintains an OFF state, or may be turned on and off at the same timing as the second switching element Q28, and the fourth switching element Q48 maintains an ON state, or may be turned on and off at the same timing as the first switching element Q18. In some cases, the third switching element Q38 and the fourth switching element Q48 are each turned on and off at a timing different from that of each of the second switching element Q28 and the first switching element Q18.

The converter 118 includes only the inverter similar to that illustrated in FIG. 15. Although FIG. 15 illustrates the case in which the converter 118 includes the full-bridge inverter, the converter 118 may also include the half-bridge inverter.

The wireless power transmitters 1 through 1-8 illustrated in FIGS. 7 through 15 are operated in a detection mode and a power transmission mode. The power transmission mode includes two or more of the normal mode, the boost mode, and the reduction mode.

The detection mode, which is a mode for determining whether an external object is approaching the wireless power transmitter or whether the approaching external object is the wireless power receiver, corresponds to the analog ping phase and the digital ping phase described above.

In the detection mode, the wireless power transmitter transmits an analog ping signal for determining whether the external object is approaching and a digital ping signal for determining whether the approaching object is the wireless power receiver. In this case, as described above, after the wireless power transmitter periodically transmits the analog ping signal, the wireless power transmitter 1, 1-1, 1-2, 1-3, 1-4, 1-5, 1-6, 1-7, or 1-8 transmits the digital ping signal when it is determined that the external object is approaching, or transmits the digital ping signal based on a set period.

Hereinafter, for convenience of explanation, the analog ping signal and the digital ping signal transmitted by the wireless power transmitter 1, 1-1, 1-2, 1-3, 1-4, 1-5, 1-6, 1-7, or 1-8 in the detection mode are collectively referred to as a ping signal.

The detection mode includes, for example, a first mode and a second mode. The first mode corresponds to an initial operation mode starting an operation to transmit the ping signal after a stop state for a reference time or longer, such as a case in which turned-off power of the wireless power transmitter is switched to an ON state. The second mode corresponds to a standby operation mode for transmitting the ping signal in the stop state for less than the reference time, after the initial operation mode.

In the initial operation mode, the converter 111, 112, 113, 114, 115, 116, or 117 (FIGS. 8 through 14) gradually boosts the input voltage, and stores boost power in the first capacitor C11, C12, C13, C14, C15, C16, or C17 (FIGS. 8 through 14). The converter 111, 112, 113, 114, 115, 116, or 117 eliminates a problem in which a predetermined ripple is caused in the boost power generated by the alternative switching by gradually boosting the input voltage.

The input voltage is gradually boosted by gradually increasing a duty cycle of a gate signal provided to the switching element Q21, Q22, Q23, Q24, Q25 (and/or Q45), Q26, or Q67 (FIGS. 8 through 14) of the converter 111, 112, 113, 114, 115, 116, or 117 from a first duty cycle. It can be understood that the gradual increase of the duty cycle means that the duty cycle is repeatedly and sequentially increased from the specific duty cycle by a reference duty cycle.

As an example, a first duty cycle corresponds to a duty cycle increased from a duty cycle of 0% by the reference duty cycle. According to an embodiment, the first duty cycle is set as the duty cycle close to 0% to prevent the rapid boosting of the input power in a phase in which an operation starts, after the stop state for the reference time or more, whereby the problem in which the predetermined ripple is caused in the boost power is effectively eliminated.

In an operation of boosting the input voltage by sequentially increasing the duty cycle from the first duty cycle close to the duty cycle of 0% by the reference duty cycle, the converter (or the controller) calculates data regarding a voltage level of the boost power which is gradually boosted and a duty cycle corresponding to the voltage level. The data regarding the voltage level of the boost power which is gradually boosted and the duty cycle corresponding to the voltage level calculated by the converter 111, 112, 113, 114, 115, 116, or 117 (or the controller 201, 202, 203, 204, 205, 206, 207, or 208 (FIGS. 8 through 14)) may be stored in a separate memory element.

In addition, when the voltage level of the boost power stored in the first capacitor C11, C12, C13, C14, C15, C16, or C17 (FIGS. 8 through 14) reaches a voltage level of target boost power, the converter 111, 112, 113, 114, 115, 116, or 117 outputs an AC voltage (or an alternating current) to transmit a ping signal through the resonator 121, 122, 123, 124, 125, 126, or 127 (FIGS. 8 through 14).

Even in a case in which various voltage levels are provided by the input power source 300, the converter 111, 112, 113, 114, 115, 116, or 117 boosts the input voltage up to the target boost voltage. Therefore, even in a case in which the voltage level of the input voltage is varied, the converter 111, 112, 113, 114, 115, 116, or 117 boosts the input voltage up to a set target boost voltage to decrease dependency on the input power source 300.

Figure 16:
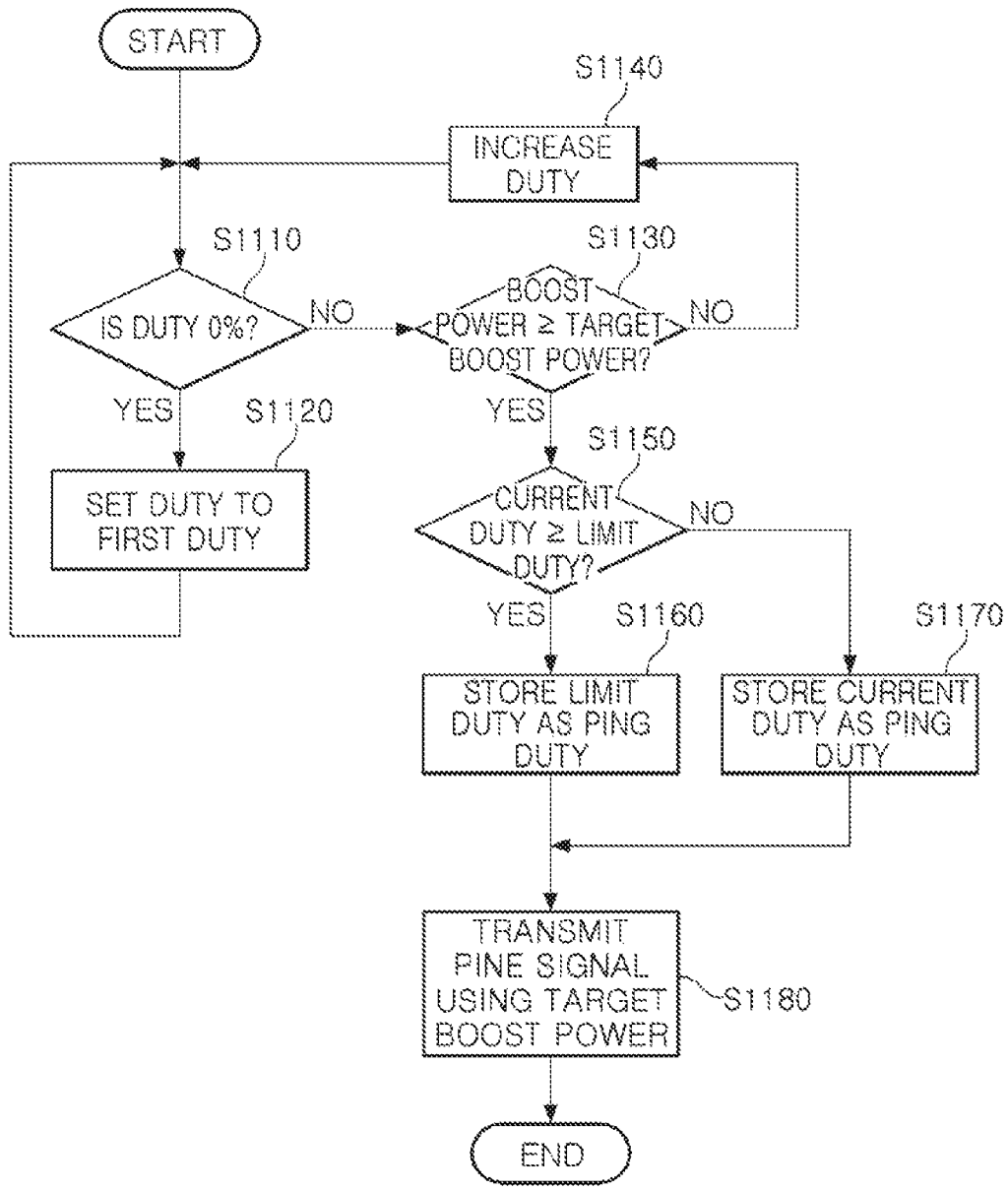
FIG. 16 is a flowchart illustrating an operation in an initial operation mode of the wireless power transmitter and the wireless power transmission method, according to an embodiment.

FIG. 16 is an operation flowchart illustrating an operation in an initial operation mode of the wireless power transmitter 1, 1-1, 1-2, 1-3, 1-4, 1-5, 1-6, 1-7, or 1-8 and the wireless power transmission method, according to an embodiment.

Referring to FIG. 16, in the initial operation mode, the controller 201, 202, 203, 204, 205, 206, 207, or 208 determines whether a current duty cycle is a duty cycle of 0% in operation S1110. If it is determined that the current set duty cycle is 0%, the duty cycle is set as the first duty cycle which is increased from the duty cycle of 0% by the reference duty cycle in operation S1120. If it is determined that the current set duty cycle is not 0%, the boost power and the target boost power are compared with each other in operation S1130 and, if it is determined, based on the comparison between the boost power and the target boost power, that the boost power does not reach the target boost power, the duty cycle is increased by the reference duty cycle in operation S1140 to gradually boost the boost power. On the other hand, if it is determined, based on the comparison between the boost power and the target boost power, that the boost power reaches the target boost power, the current duty cycle and a limit duty cycle are compared with each other in operation S1150. The limit duty cycle corresponds to a maximum duty cycle which is allowed in the detection mode. By setting the limit duty cycle in the detection mode, excessive power consumption for transmission of the ping signal is prevented and over-heating is eliminated. If it is determined, based on the comparison between the current duty cycle and the limit duty cycle, that the current duty cycle is higher than the limit duty cycle, the limit duty cycle is stored as a ping duty cycle corresponding to the target boost power in operation S1160, and, if the current duty cycle is lower than the limit duty cycle, the current duty cycle is stored as the ping duty cycle corresponding to the target boost power in operation S1170. Thereafter, the ping signal is transmitted using the target boost power in operation S1180, and the initial operation mode ends. Thereafter, after the initial operation mode ends, the wireless power transmitter 1, 1-1, 1-2, 1-3, 1-4, 1-5, 1-6, 1-7, or 1-8 enters the standby operation mode, or enters a power transmission mode based on a response signal of the wireless power receiver 2 (FIG. 1) for the ping signal transmitted in the initial operation mode.

In the standby operation mode, the converter 111, 112, 113, 114, 115, 116, or 117 (or the controller 201, 202, 203, 204, 205, 206, 207, or 208) gradually increases the duty cycle from a second duty cycle to boost the input voltage. The converter gradually increases the duty cycle from the second duty cycle to significantly decrease an inrush current caused by a rapid voltage change, thereby decreasing standby power. In addition, the converter 111, 112, 113, 114, 115, 116, or 117 prevents a peak current from being input to the resonator to reduce noise of the wireless power transmitter.

The second duty cycle is determined based on a voltage level of the current boost power.

In the standby operation mode, the boost power stored in the first capacitor C11, C12, C13, C14, C15, C16, or C17 (each of FIGS. 8 through 14) is discharged based on a period in which the ping signal is transmitted, such that the voltage level of the boost power is gradually decreased. The second duty cycle is determined by considering an amount by which the boost power stored in the first capacitor C11, C12, C13, C14, C15, C16, or C17 is discharged based on a time interval at which the ping signal is transmitted. The second duty cycle is higher than the first duty cycle.

As an example, the voltage level of the boost power stored in the first capacitor C11, C12, C13, C14, C15, C16, or C17 is directly detected by a separate detection element. A duty cycle corresponding to the detected voltage level of the boost power may be determined as the second duty cycle.

In another example, the voltage level of the boost power is estimated based on the period in which the ping signal is transmitted. Specifically, since the voltage level of the boost power is decreased based on the discharge by the time interval at which the ping signal is transmitted, when the period of the ping signal is determined, the voltage level of the boost power in which the voltage level is partially decreased from the target boost power is estimated. A duty cycle corresponding to the estimated voltage level of the boost power is determined as the second duty cycle.

As described above, the data regarding the voltage level of the boost power which is gradually boosted and the duty cycle corresponding to the voltage level calculated by the converter 111, 112, 113, 114, 115, 116, or 117 (or the controller 201, 202, 203, 204, 205, 206, 207, or 208) of the initial operation mode may be stored in a separate memory element. In this case, the second duty cycle is determined based on the data regarding the voltage level of the boost power stored in the initial operation mode and the duty cycle corresponding to the voltage level of the boost power.

According to an embodiment, a weighting index is calculated by comparing the voltage level of the target boost power with the voltage level of the current boost power, and the second duty cycle is calculated by applying the calculated weighting index to a ping duty cycle corresponding to the target boost power. In this case, the weighting index has a value greater than 0 but less than 1. This embodiment is applied to a case in which only the voltage level of the target boost power and the ping duty cycle corresponding to the voltage level of the target boost power are stored in the data stored in the initial operation mode. In the initial operation mode, all voltage levels of the boost power and a plurality of ping duties corresponding thereto are not stored. That is, only the voltage level of the target boost power and the ping duty cycle corresponding thereto are stored, whereby a size of the memory element may be reduced.

According to another embodiment, the second duty cycle is determined by a retrieval of a duty cycle corresponding to the voltage level of the current boost power. This embodiment is applied to a case in which all voltage levels of the boost power and ping duties corresponding thereto are stored in the initial operation mode. In this case, all voltage levels of the boost power and the ping duties corresponding thereto are stored in a form of a lookup table in the data, and a load of the calculation operation is removed using the lookup table in the standby operation mode.

The converter 111, 112, 113, 114, 115, 116, or 117 (or the controller 201, 202, 203, 204, 205, 206, 207, or 208) gradually increases the duty cycle from the second duty cycle to gradually boost the input voltage. In a case in which the duty cycle is gradually increased and reaches the ping duty cycle, since the voltage level of the boost power stored in the first capacitor reaches the voltage level of the target boost power, the converter 111, 112, 113, 114, 115, 116, or 117 outputs the AC current to transmit the ping signal through the resonator 121, 122, 123, 124, 125, 126, or 127.

Figure 17:
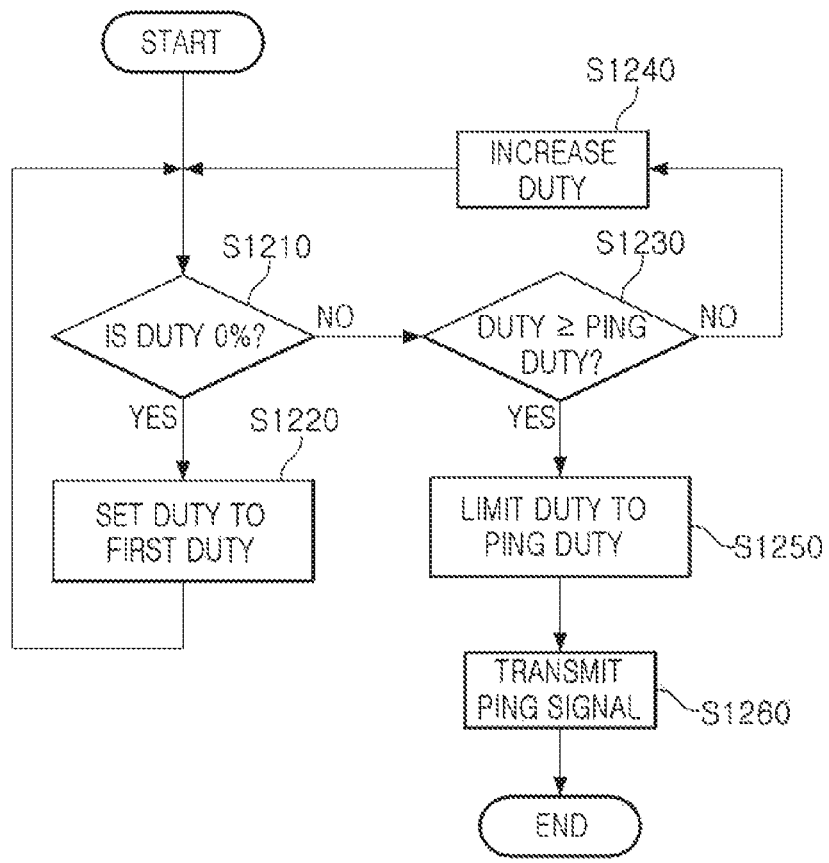
FIG. 17 is an operation flowchart illustrating an operation in a standby operation mode of the wireless power transmitter and the wireless power transmission method, according to an embodiment.

FIG. 17 is an operation flowchart illustrating an operation in a standby operation mode of the wireless power transmitter 1, 1-1, 1-2, 1-3, 1-4, 1-5, 1-6, 1-7, or 1-8 and the wireless power transmission method, according to an embodiment.

Referring to FIG. 17, in the standby operation mode, the controller 201, 202, 203, 204, 205, 206, 207, or 208 determines whether a current duty cycle is a duty cycle of 0% in operation S1210. If it is determined that the current set duty cycle is 0%, the duty cycle is set as the second duty cycle in operation S1220. The second duty cycle is higher than the first duty cycle, and as an example, the second duty cycle is calculated by applying a weighting index to a ping duty cycle. In this case, the weighting index is a value greater than 0 but less than 1.

If it is determined in operation S1210 that the current set duty cycle is not 0%, the current duty cycle and the ping duty cycle which is calculated and stored in the initial operation mode are compared with each other in operation S1230. If it is determined, as a result of the comparison between the current duty cycle and the ping duty cycle, that the current duty cycle is lower than the ping duty cycle, the duty cycle is increased by a reference duty cycle in operation S1240 to gradually boost the boost power. Alternatively, if it is determined in operation S1230 that the current duty cycle is higher than the ping duty cycle, the duty cycle is limited to the ping duty cycle in operation S1250, the ping signal is transmitted in operation S1260, and the standby operation mode ends. Thereafter, the wireless power transmitter 1, 1-1, 1-2, 1-3, 1-4, 1-5, 1-6, 1-7, or 1-8 enters the power transmission mode based on the response signal of the wireless power receiver 2 for the ping signal.

Figure 18:
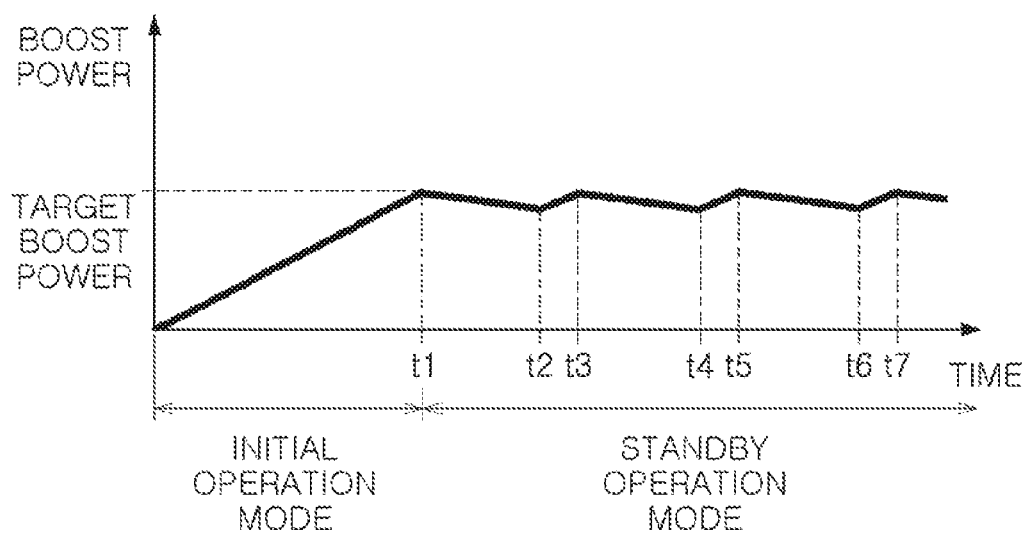
FIG. 18 is a diagram illustrating a change of a boost voltage in the initial operation mode and the standby operation mode of the wireless power transmitter and the wireless power transmission method, according to an embodiment.

FIG. 18 is a diagram illustrating a change of a boost voltage in the initial operation mode and the standby operation mode of the wireless power transmitter 1, 1-1, 1-2, 1-3, 1-4, 1-5, 1-6, 1-7, or 1-8 and the wireless power transmission method.

Referring to FIG. 18, in the initial operation mode, the converter 110, 111, 112, 113, 114, 115, 116, 117, or 118 (FIGS. 7 through 15) (or the controller 200, 201, 202, 203, 204, 205, 206, 207, or 208 (FIGS. 7 through 15)) gradually increases the duty cycle from the first duty cycle to gradually boost the input voltage. As a result of the boosting of the converter 110, 111, 112, 113, 114, 115, 116, 117, or 118, when the boost power stored in the first capacitor C11, C12, C13, C14, C15, C16, or C17 (FIGS. 8 through 14) reaches the target boost power, the ping signal is transmitted at a timing t1. After the ping signal is transmitted, the initial operation mode ends and the wireless power transmitter 1, 1-1, 1-2, 1-3, 1-4, 1-5, 1-6, 1-7, or 1-8 enters the standby operation mode.

In the standby operation mode, the voltage level of the boost power stored in the first capacitor C11, C12, C13, C14, C15, C16, or C17 is decreased based on the period in which the ping signal is transmitted. The converter 110, 111, 112, 113, 114, 115, 116, 117, or 118 (or the controller 200, 201, 202, 203, 204, 205, 206, 207, or 208) gradually increases the duty cycle from the second duty cycle at a timing t2 based on the voltage level of the boost power stored in the first capacitor to boost the input voltage, and transmits the ping signal at a timing t3 when the boost power stored in the first capacitor reaches the target boost power as a result of the boosting of the converter. In this case, the above-mentioned operation is repeated based on a transmission period of the ping signal, which is a time interval of a timing t3 to t5, or a time interval of a timing t5 to a timing t7. Thereafter, the wireless power transmitter 1, 1-1, 1-2, 1-3, 1-4, 1-5, 1-6, 1-7, or 1-8 enters the power transmission mode based on the response signal of the wireless power receiver 2 for the ping signal.

Next, the power transmission mode will be described. Hereinafter, an operation in the power transmission mode is performed by the controller 200, 201, 202, 203, 204, 205, 206, 207, or 208 (of FIGS. 7 through 15).

Figure 19:
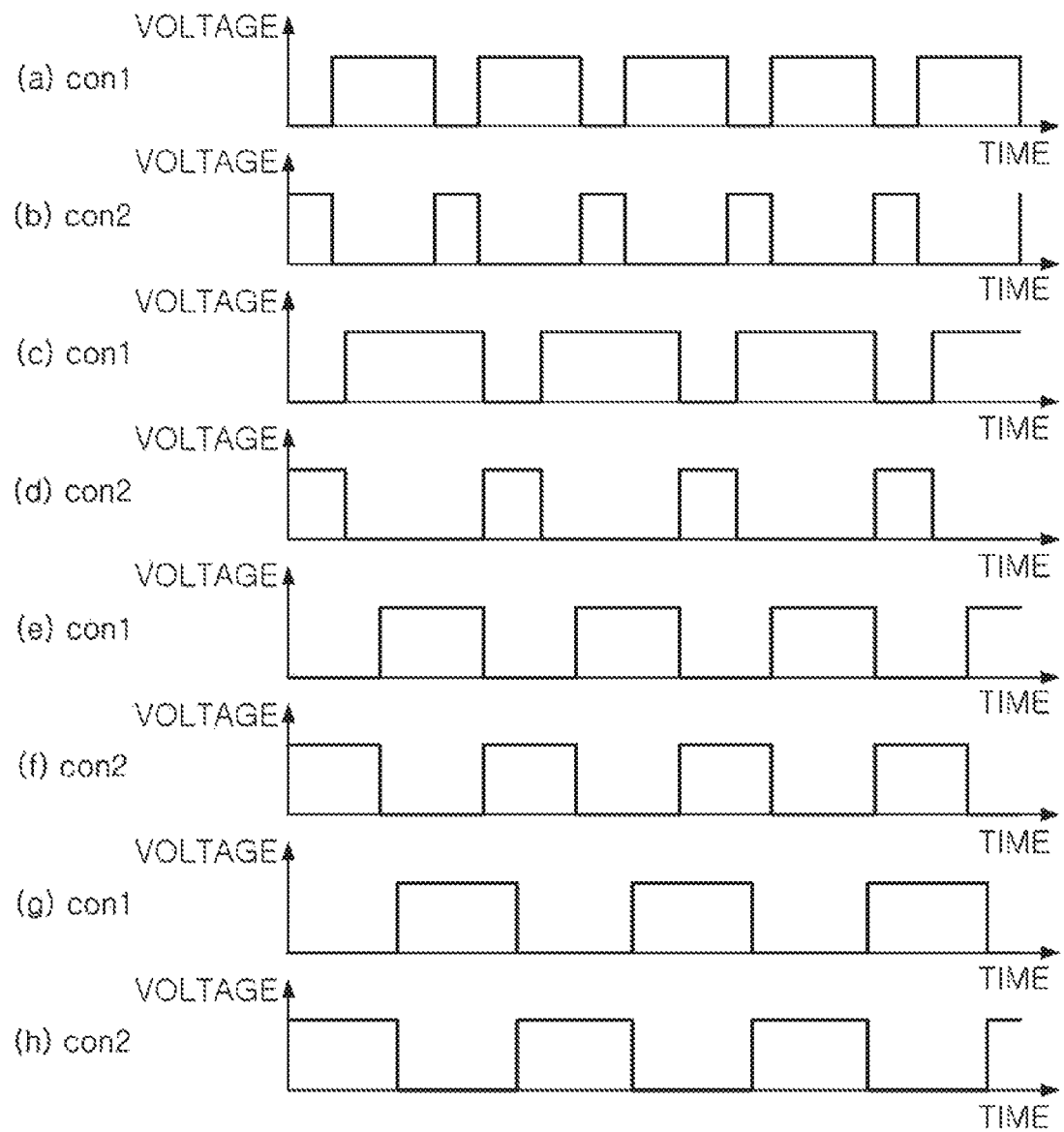
FIGS. 19 through 24 are waveform diagrams respectively illustrating operations of the wireless power transmitter and the wireless power transmission method in a power transmission mode. The waveform diagrams represent waveforms of control signals that control switching elements of the wireless power transmitter.

FIG. 19 is a waveform diagram illustrating an operation of the wireless power transmitter 1, 1-1, 1-2, 1-3, 1-4, 1-5, 1-6, 1-7, or 1-8 and the wireless transmission method when an amount of power received by the wireless power receiver 2 is increased in a power transmission mode, based on an embodiment. The waveform diagram of FIG. 19 represents a waveform of a control signal for controlling switching elements of the wireless power transmitter 1, 1-1, 1-2, 1-3, 1-4, 1-5, 1-6, 1-7, or 1-8.

The first control signals con11, con12, con13, and con16 of FIGS. 8 through 10 and 13 are equivalent to the first control signal con1 of FIG. 19, and the second control signals con21, con22, con23, and con26 of FIGS. 8 through 10 and 13 are equivalent to the second control signal con2 of FIG. 19.

In addition, the first control signal con14, con15, and con18 of FIGS. 11, 12, and 15 are equivalent to the first control signal con1 of FIG. 19. The second control signals con24, con25, and con28 of FIGS. 11, 12, and 15 are equivalent to the second control signal con2 of FIG. 19. In this case, the third control signals con34, con35, and con38 of FIGS. 11, 12, and 15 are maintained at a low level. The fourth control signals con44, con45, and con48 of FIGS. 11, 12, and 15 are maintained at a high level.

The control signals, initially output in the normal mode, have forms such as those illustrated in (a) and (b) of FIG. 19. In this case, a frequency and a duty cycle of the control signals are the ping frequency and the ping duty cycle described above. The control signals illustrated in (a) and (b) are also output in the detection mode.

In the normal mode, the frequency of the control signal is adjusted based on the signal received from the wireless power receiver 2. That is, in a case in which an amount of power received by the wireless power receiver 2 is less than an amount of power required by the wireless power receiver 2, in the normal mode, the controller 200, 201, 202, 203, 204, 205, 206, 207, or 208 decreases the frequency of the control signals con1 and con2 as illustrated in (c) and (d) of FIG. 19. Therefore, the amount of power received by the wireless power receiver 2 is increased. The frequency of the control signals con1 and con2 of (c) and (d) may be a minimum value f1 (FIG. 6) of the frequency in the normal mode. In the normal mode, the duty cycle is fixed to the above-mentioned ping duty cycle.

In the boost mode, the duty cycle of the control signal is adjusted based on the signal received from the wireless power receiver 2. That is, when the amount of power required by the wireless power receiver is not received, even though the frequency of the control signals con1 and con2 is decreased up to a predetermined reference frequency (e.g., f1 of FIG. 6), as illustrated in (e) and (f) of FIG. 19, the controller 200, 201, 202, 203, 204, 205, 206, 207, or 208 fixes the frequency of the control signals con1 and con2 to the reference frequency (e.g., f1 of FIG. 6), and increases the duty cycle of the second control signal con2.

Alternatively, as illustrated in (g) and (h) of FIG. 19, in the boost mode, the controller 200, 201, 202, 203, 204, 205, 206, 207, or 208 additionally decreases the frequency of the control signals con1 and con2. In this case, the duty cycle is fixed to the duty cycle which was previously increased.

Figure 20:
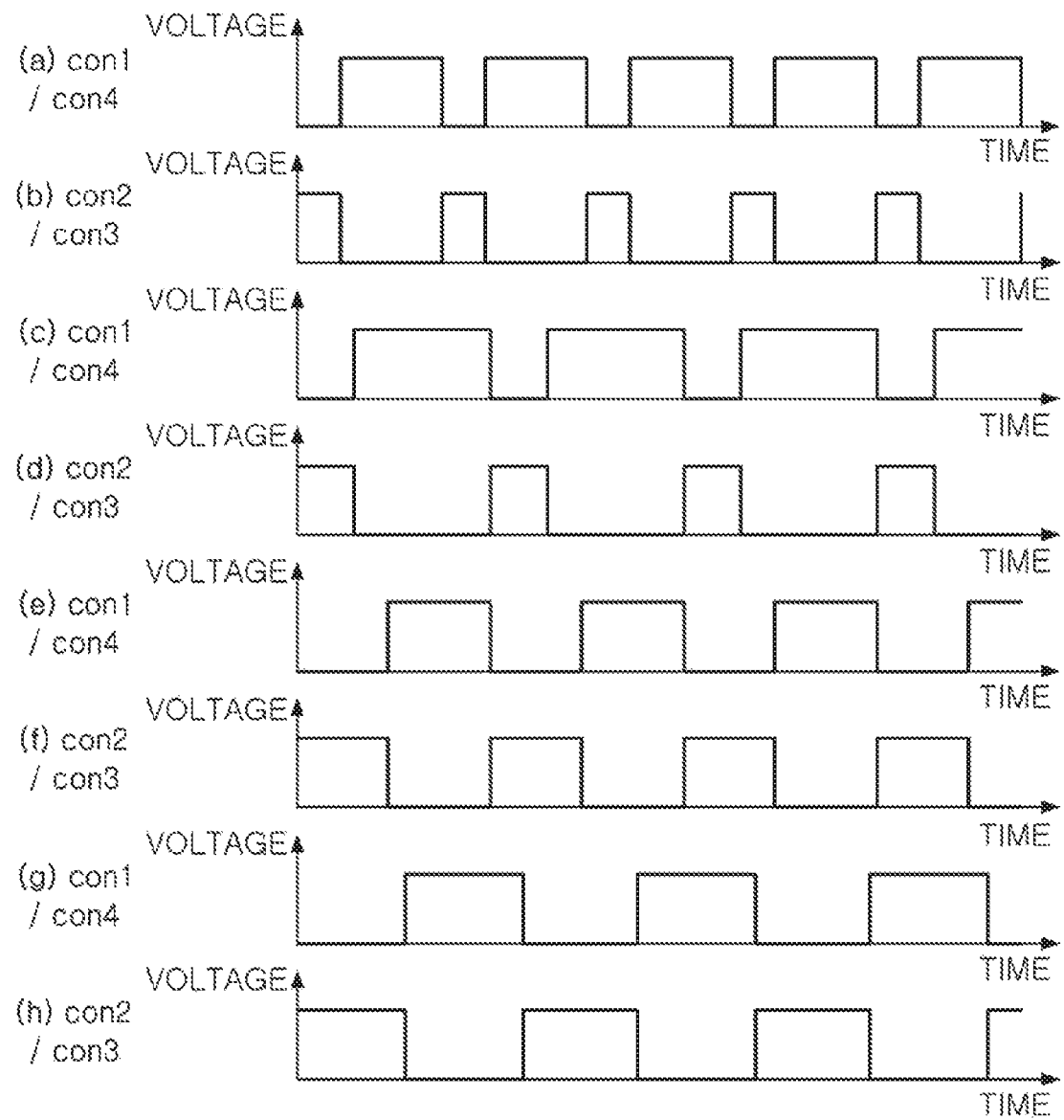

FIG. 20 is a diagram illustrating an operation of the wireless power transmitter 1, 1-1, 1-2, 1-3, 1-4, 1-5, 1-6, 1-7, or 1-8 and the wireless power transmission method when an amount of power received by the wireless power receiver 2 is increased in a power transmission mode, according to an embodiment. The waveform diagram of FIG. 20 represents a waveform of a control signal for controlling switching elements of the wireless power transmitter 1-1, 1-2, 1-3, 1-4, 1-5, 1-6, 1-7, or 1-8.

The first control signals con14, con15, and con18 of FIGS. 11, 12, and 15 are equivalent to the first control signal con1 of FIG. 20. The second control signals con24, con25, and con28 of FIGS. 11, 12, and 15 are equivalent to the second control signal con2 of FIG. 20. The third control signals con34, con35, and con38 of FIGS. 11, 12, and 15 are equivalent to the third control signal con3 of FIG. 20. The fourth control signals con44, con45, and con48 of FIGS. 11, 12, and 15 are equivalent to the fourth control signal con4 of FIG. 20.

FIG. 20 is similar to FIG. 19, except that FIG. 20 relates to the case in which the s 114, 115, and 118 (FIGS. 11, 12, and 15) are operated as the full-bridge circuit.

The controller 200, 201, 202, 203, 204, 205, 206, 207, or 208 outputs the control signals illustrated in (a) and (b). As described above, in the normal mode, the controller 200, 201, 202, 203, 204, 205, 206, 207, or 208 also outputs the control signals initially output in the forms illustrated in (a) and (b) of FIG. 20, and also outputs the control signals in the detection mode. The duty cycle of the control signals con1 and con4 illustrated in (a) is the above-mentioned ping duty cycle, and the frequency of the control signals con1, con2, con3, and con4 illustrated in (a) and (b) is the above-mentioned ping frequency.

In the normal mode, in a case in which an amount of power received by the wireless power receiver 2 is less than an amount of power required by the wireless power receiver 2, the controller 200, 201, 202, 203, 204, 205, 206, 207, or 208 decreases the frequency of the control signals con1, con2, con3, and con4 as illustrated in (c) and (d) of FIG. 20.

In the boost mode, the duty cycle of the control signal is adjusted based on the signal received from the wireless power receiver 2. That is, when the amount of power required by the wireless power receiver 2 is not received even though the frequency of the control signals con1, con2, con3, and con4 is decreased up to a predetermined frequency (e.g., f1 of FIG. 6), as illustrated in (e) and (f) of FIG. 20, the controller 200, 201, 202, 203, 204, 205, 206, 207, or 208 fixes the frequency of the control signals con1, con2, con3, and con4 to the reference frequency (e.g., f1 of FIG. 6), and increases the duty cycle of the second control signal con2 and the third control signal con3.

Alternatively, as illustrated in (g) and (h) of FIG. 20, in the boost mode, the controller 200, 201, 202, 203, 204, 205, 206, 207, or 208 additionally decreases the frequency of the control signals con1, con2, con3, and con5. In this case, the duty cycle is fixed to the duty cycle which is previously increased.

Although not illustrated in FIGS. 19 and 20, in the boost mode, the controller 200, 201, 202, 203, 204, 205, 206, 207, or 208 may also additionally increase the duty cycle after additionally decreasing the frequency as illustrated in (g) and (h).

Figure 21:
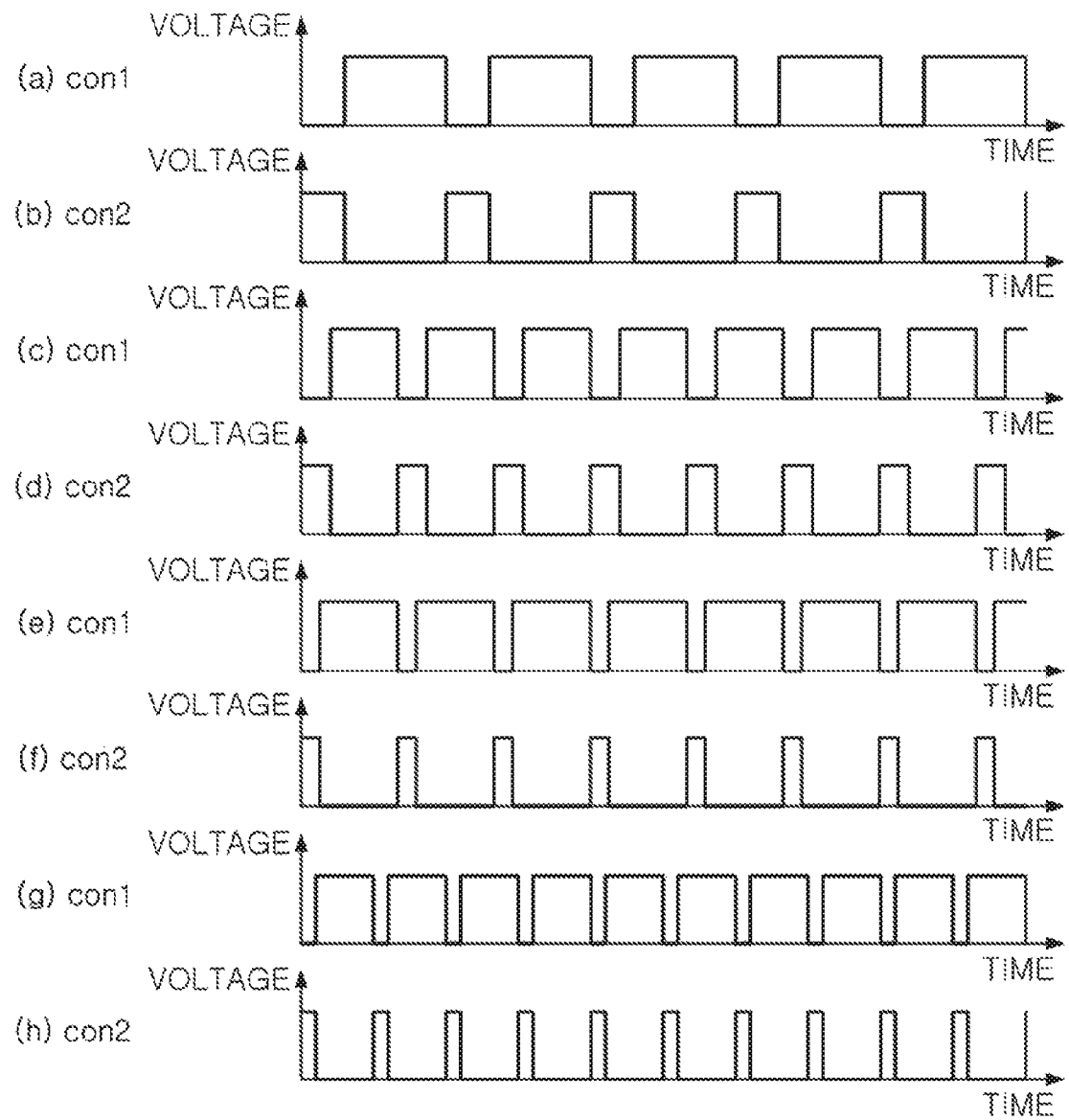

FIG. 21 is a waveform diagram illustrating an operation of the wireless power transmitter 1-1, 1-2, 1-3, 1-4, 1-5, 1-6, 1-7, or 1-8 and the wireless power transmission method when an amount of power received by the wireless power receiver 2 is decreased in a power transmission mode, according to an embodiment. The waveform diagram of FIG. 21 represents a waveform of a control signal for controlling switching elements of the wireless power transmitter 1-1, 1-2, 1-3, 1-4, 1-5, 1-6, 1-7, or 1-8.

The first control signals con11, con12, con13, and con16 of FIGS. 8 through 10, and 13 are equivalent to the first control signal con1 of FIG. 21, and the second control signals con21, con22, con23, and con26 of FIGS. 8 through 10, and 13 are equivalent to the second control signal con2 of FIG. 21.

In addition, the first control signals con14, con15, and con18 of FIGS. 11, 12, and 15 are equivalent to the first control signal con1 of FIG. 21, and the second control signals con24, con25, and con28 of FIGS. 11, 12, and 15 are equivalent to the second control signal con2 of FIG. 21. In this case, the third control signals con34, con35, and con38 of FIGS. 11, 12, and 15 are maintained at a low level, and the fourth control signal con44, con45, and con48 of FIGS. 11, 12, and 15 are maintained at a high level.

First, the controller 200, 201, 202, 203, 204, 205, 206, 207, or 208 outputs the same control signals con1 and con2 as those illustrated in (a) and (b) of FIG. 21. The controller 200, 201, 202, 203, 204, 205, 206, 207, or 208 also outputs the control signals initially output in the forms illustrated in (a) and (b) in the normal mode, and also outputs the same control signals as those illustrated in (a) and (b) in the detection mode.

In a case in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1 and con2 as illustrated in (c) and (d). Therefore, the amount of power received by the wireless power receiver 2 decreases. The frequency of the control signals con1 and con2 of (c) and (d) of FIG. 21 is a maximum value f2 (FIG. 6) of the frequency in the normal mode. In the normal mode, the duty cycle is fixed to the above-mentioned ping duty cycle.

In the reduction mode, the duty cycle of the control signal is adjusted based on the signal received from the wireless power receiver. That is, when the amount of power received by the wireless power receiver 2 is greater than the amount of power required by the wireless power receiver 2, even though the frequency of the control signals con1 and con2 is increased up to a predetermined reference frequency (e.g., f2 of FIG. 6), as illustrated in (e) and (f) of FIG. 21, the controller 200, 201, 202, 203, 204, 205, 206, 207, or 208 fixes the frequency of the control signals con1 and con2 to the reference frequency (e.g., f2 of FIG. 6), and decreases the duty cycle of the second control signal con2.

Alternatively, as illustrated in (g) and (h) of FIG. 21, in the reduction mode, the controller 200, 201, 202, 203, 204, 205, 206, 207, or 208 also increases the frequency of the control signals con1 and con2. In this case, the duty cycle may be fixed to the duty cycle which is previously decreased.

Figure 22:
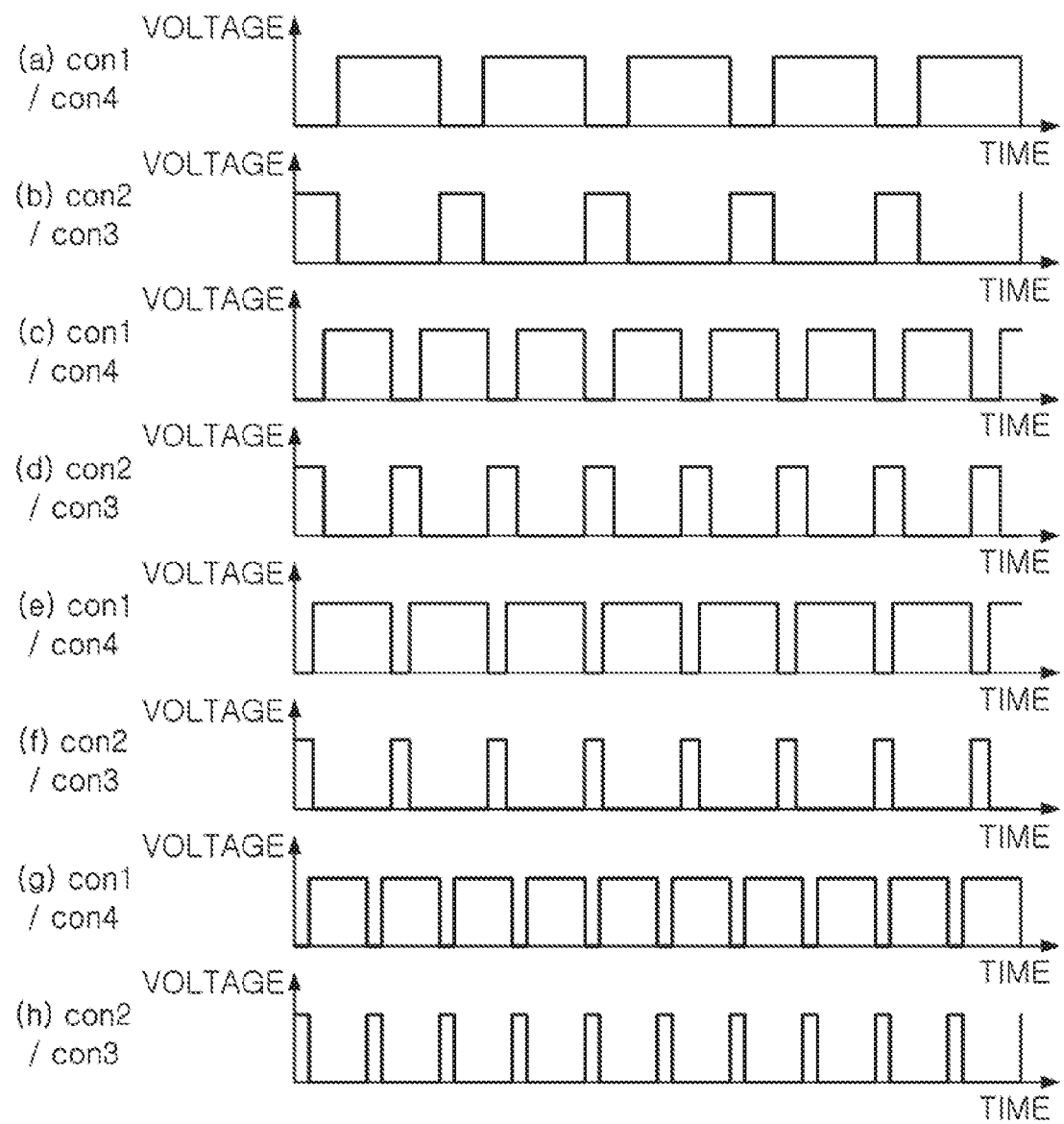

FIG. 22 is a waveform diagram illustrating an operation of the wireless power transmitter 1, 1-2, 1-3, 1-4, 1-5, 1-6, 1-7, or 1-8 and the wireless power transmission method when an amount of power received by the wireless power receiver 2 is decreased in a power transmission mode, according to an embodiment. The waveform diagram of FIG. 22 represents a waveform of a control signal for controlling switching elements of the wireless power transmitter 1, 1-2, 1-3, 1-4, 1-5, 1-6, 1-7, or 1-8.

The first control signals con14, con15, and con18 of FIGS. 11, 12, and 15 are equivalent to the first control signal con1 of FIG. 22. The second control signals con24, con25, and con28 of FIGS. 11, 12, and 15 are equivalent to the second control signal con2 of FIG. 22. The third control signals con34, con35, and con38 of FIGS. 11, 12, and 15 are equivalent to the third control signal con1 of FIG. 22. The fourth control signals con44, con45, and con48 of FIGS. 11, 12, and 15 are equivalent to the fourth control signal con4 of FIG. 22.

FIG. 22 is similar to FIG. 21 except that FIG. 22 relates to the case in which the converter 114, 115, and 118 (FIGS. 11, 12, and 15) is operated as the full-bridge circuit.

First, the controller 200, 201, 202, 203, 204, 205, 206, 207, or 208 outputs the same control signals con1, con2, con3, and con4 as those illustrated in (a) and (b) of FIG. 22. The controller 200, 201, 202, 203, 204, 205, 206, 207, or 208 also outputs the control signals initially output in the forms illustrated in (a) and (b) in the normal mode, and also outputs the same control signals as those illustrated in (a) and (b) in the detection mode.

In a case in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1, con2, con3, and con4 as illustrated in (c) and (d) of FIG. 22. Therefore, the amount of power received by the wireless power receiver 2 decreases. The frequency of the control signals con1, con2, con3, and con4 of (c) and (d) is a maximum value f2 (FIG. 6) of the frequency in the normal mode. In the normal mode, the duty cycle is fixed to the above-mentioned ping duty cycle.

In the reduction mode, the duty cycle of the control signal is adjusted based on the signal received from the wireless power receiver 2. That is, when the amount of power received by the wireless power receiver 2 is greater than the amount of power required by the wireless power receiver 2 even though the frequency of the control signals con1, con2, con3, and con4 is increased up to a predetermined reference frequency (e.g., f2 of FIG. 6), as illustrated in (e) and (f) of FIG. 22, the controller 200, 201, 202, 203, 204, 205, 206, 207, or 208 fixes the frequency of the control signals con1, con2, con3, and con4 to the reference frequency (e.g., f2 of FIG. 6), and decreases the duty cycle of the second control signal con2 and the third control signal con2 and con3.

Alternatively, as illustrated in (g) and (h) of FIG. 22, in the reduction mode, the controller 200, 201, 202, 203, 204, 205, 206, 207, or 208 also increases the frequency of the control signals con1, con2, con3, and con4. In this case, the duty cycle is fixed to the duty cycle which is previously decreased.

Figure 23:
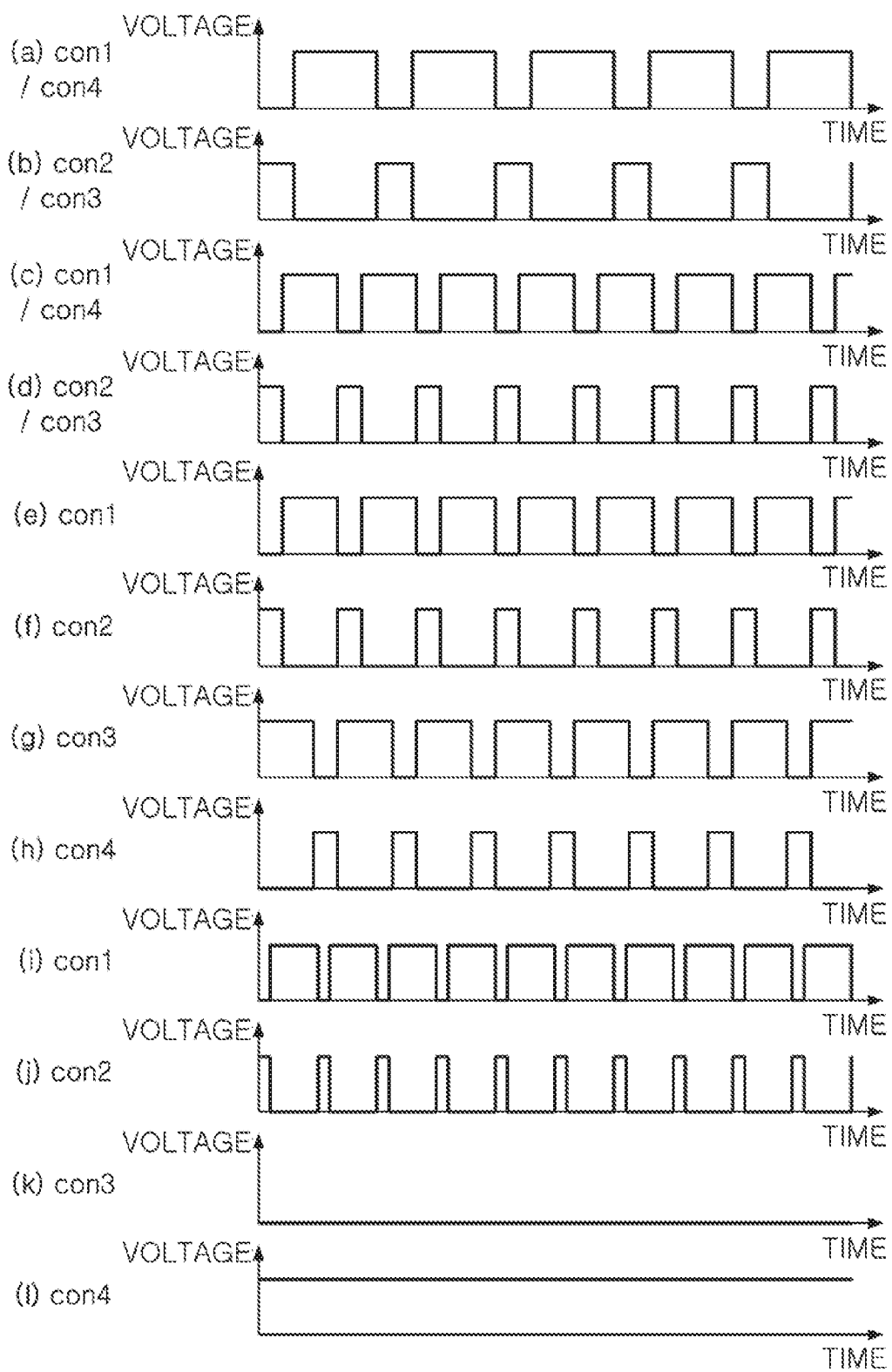

FIG. 23 is a waveform diagram illustrating an operation of the wireless power transmitter 1, 1-2, 1-3, 1-4, 1-5, 1-6, 1-7, or 1-8 and the wireless power transmission method when an amount of power received by the wireless power receiver 2 is decreased in a power transmission mode, according to an embodiment. The waveform diagram of FIG. 23 represents a waveform of a control signal for controlling switching elements of the wireless power transmitter 1, 1-2, 1-3, 1-4, 1-5, 1-6, 1-7, or 1-8.

The first control signals con14, con15, and con18 of FIGS. 11, 12, and 15 are equivalent to the first control signal con1 of FIG. 23. The second control signals con24, con25, and con28 of FIGS. 11, 12, and 15 are equivalent to the second control signal con2 of FIG. 23. The third control signals con34, con35, and con38 of FIGS. 11, 12, and 15 are equivalent to the third control signal con3 of FIG. 23. The fourth control signals con44, con45, and con48 of FIGS. 11, 12, and 15 are equivalent to the fourth control signal con4 of FIG. 23.

First, the controller 200, 201, 202, 203, 204, 205, 206, 207, or 208 outputs the same control signals con1, con2, con3, and con4 as those illustrated in (a) and (b) of FIG. 23. The controller 200, 201, 202, 203, 204, 205, 206, 207, or 208 also outputs the control signals initially output in the forms illustrated in (a) and (b) in the normal mode, and also outputs the same control signals as those illustrated in (a) and (b) in the detection mode.

In a case in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1, con2, con3, and con4 as illustrated in (c) and (d) of FIG. 23. Therefore, the amount of power received by the wireless power receiver 2 decreases. The frequency of the control signals con1, con2, con3, and con4 of (c) and (d) is a maximum value f2 (FIG. 6) of the frequency in the normal mode. In the normal mode, the duty cycle is fixed to the above-mentioned ping duty cycle.

In the reduction mode, the duty cycle of the control signal is adjusted based on the signal received from the wireless power receiver 2. That is, when the amount of power received by the wireless power receiver 2 is greater than the amount of power required by the wireless power receiver 2 even though the frequency of the control signals con1, con2, con3, and con4 is increased up to a predetermined reference frequency (e.g., f2 of FIG. 6), as illustrated in (e), (f), (g), and (h) of FIG. 23, the controller 200, 201, 202, 203, 204, 205, 206, 207, or 208 fixes the frequency of the control signals con1, con2, con3, and con4 to the reference frequency (e.g., f2 of FIG. 6), fixes the duty cycle of the second control signal con2, and decreases the duty cycle of the fourth control signal con4. In this case, a dead time is increased in the full-bridge circuit, and consequently, the amount of power transmitted by the wireless power transmitter 1, 1-2, 1-3, 1-4, 1-5, 1-6, 1-7, or 1-8 is decreased, whereby the amount of power received by the wireless power receiver 2 is also decreased.

Alternatively, as illustrated in (i) and (j) of FIG. 23, in the reduction mode, the controller 200, 201, 202, 203, 204, 205, 206, 207, or 208 also increases the frequency of the control signals con1, con2, con3, and con4. In this case, the duty cycle of the control signals con1 and con2 of (e) and (f) is equal to the duty cycle of the control signals con1 and con2 of (i) and (j). In addition, at the same time, as illustrated in (k) and (l) of FIG. 23, the third control signal con3 maintains a low level, and the fourth control signal con4 maintains a high level. In this case, the converter 114, 115, or 118 of FIG. 11, 12 or 15 is operated as the half-bridge circuit, such that the amount of power transmitted by the wireless power transmitter 2 is decreased, whereby the amount of power received by the wireless power receiver 2 is further decreased as compared to the case in which only the frequency is adjusted.

Although (k) and (l) of FIG. 23 illustrate the cases in which the controller 200, 201, 202, 203, 204, 205, 206, 207, or 208 fixes maintains the third control signal con3 at the low level, and maintains the fourth control signal con4 at the high level, the third control signal con3 is equal to the second control signal con2 of (j), and the fourth control signal con4 is also equal to the first control signal con1 of (i). That is, by increasing the frequencies of all of the first to fourth control signals, the power received by the wireless power receiver 2 is reduced.

Figure 24:
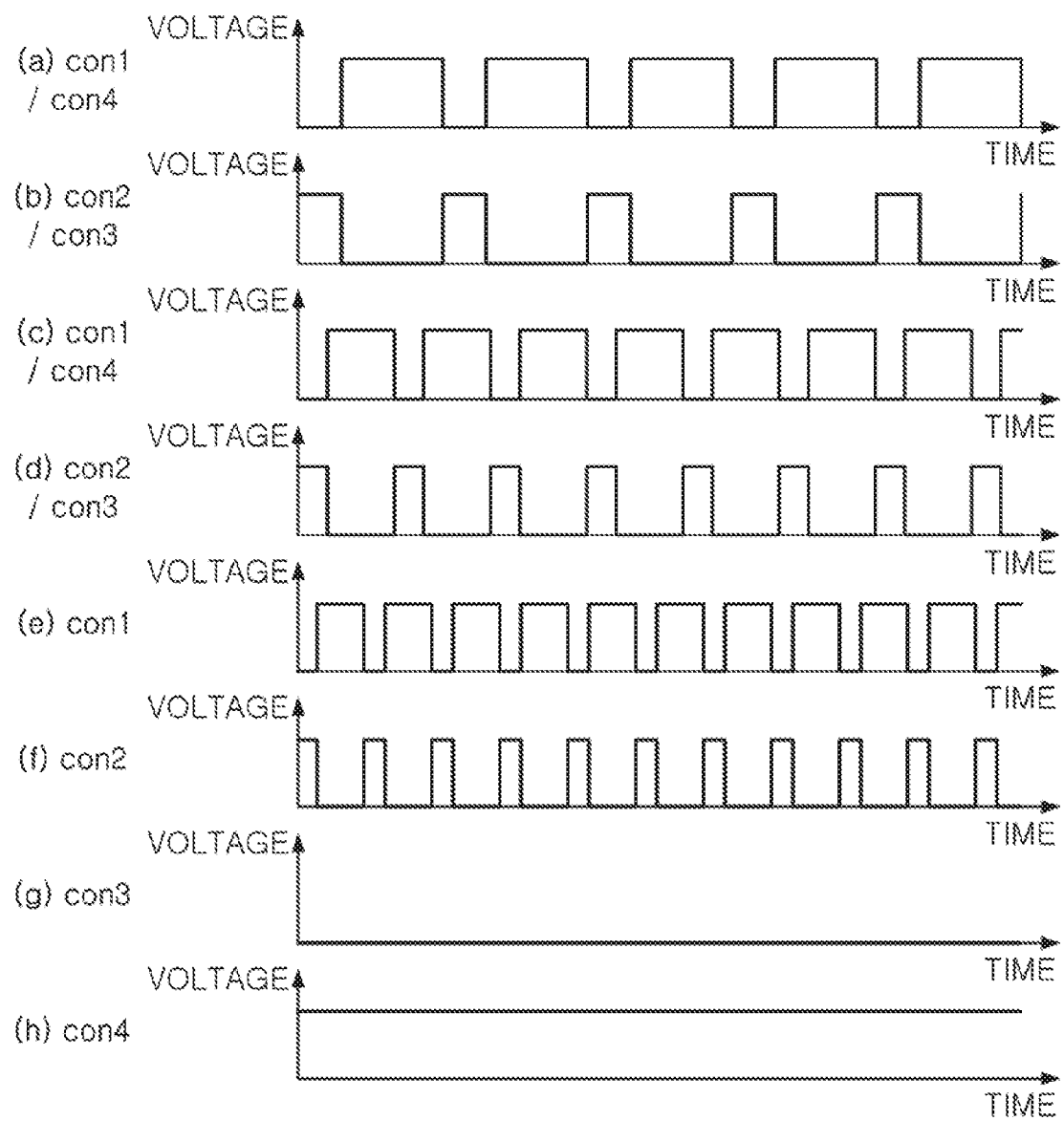

FIG. 24 is a waveform diagram illustrating an operation of the wireless power transmitter 1, 1-2, 1-3, 1-4, 1-5, 1-6, 1-7, or 1-8 and the wireless power transmission method when an amount of power received by the wireless power receiver 2 is decreased in a power transmission mode, according to an embodiment. The waveform diagram of FIG. 24 represents a waveform of a control signal for controlling switching elements of the wireless power transmitter 1, 1-2, 1-3, 1-4, 1-5, 1-6, 1-7, or 1-8 . . . .

The first control signals con14, con15, and con18 of FIGS. 11, 12, and 15 are equivalent to the first control signal con1 of FIG. 24. The second control signals con24, con25, and con28 of FIGS. 11, 12, and 15 are equivalent to the second control signal con2 of FIG. 24. The third control signals con34, con35, and con38 of FIGS. 11, 12, and 15 are equivalent to the third control signal con3 of FIG. 24. The fourth control signals con44, con45, and con48 of FIGS. 11, 12, and 15 are equivalent to the fourth control signal con4 of FIG. 24.

First, the controller 200, 201, 202, 203, 204, 205, 206, 207, or 208 outputs the same control signals con1, con2, con3, and con4 as those illustrated in (a) and (b) of FIG. 24. The controller 200, 201, 202, 203, 204, 205, 206, 207, or 208 also outputs the control signals initially output in the forms illustrated in (a) and (b) in the normal mode, and also outputs the same control signals as those illustrated in (a) and (b) in the detection mode.

In a case in which an amount of power received by the wireless power receiver 2 is greater than an amount of power required by the wireless power receiver 2, in the normal mode, the controller 200, 201, 202, 203, 204, 205, 206, 207, or 208 increases the frequency of the control signals con1, con2, con3, and con4 as illustrated in (c) and (d) of FIG. 24.

Therefore, the amount of power received by the wireless power receiver 2 decreases. The frequency of the control signals con1, con2, con3, and con4 of (c) and (d) is a maximum value f2 (FIG. 6) of the frequency in the normal mode. In the normal mode, the duty cycle is fixed to the above-mentioned ping duty cycle.

In a case in which an amount of power received by the wireless power receiver 2 is greater than an amount of power required by the wireless power receiver 2 even though the frequency of the control signals con1, con2, con3, and con4 is increased up to a predetermined reference frequency (e.g., f2 of FIG. 6), the controller 200, 201, 202, 203, 204, 205, 206, 207, or 208 is operated in the reduction mode. In the reduction mode, as illustrated in (e), (f), (g), and (h) of FIG. 24, the controller 200, 201, 202, 203, 204, 205, 206, 207, or 208 increases the frequency of the first control signal con1 and the second control signal con2, while the third control signal con3 maintains a low level and the fourth control signal con4 maintains a high level. In this case, the converters 114, 115, and 118 of FIGS. 11, 12 and/or 15 are operated as the half-bridge circuit, such that the amount of power transmitted by the wireless power transmitter 1, 1-2, 1-3, 1-4, 1-5, 1-6, 1-7, or 1-8 is decreased, whereby the amount of power received by the wireless power receiver 2 is further decreased as compared to the case in which only the frequency is adjusted.

Figure 25:
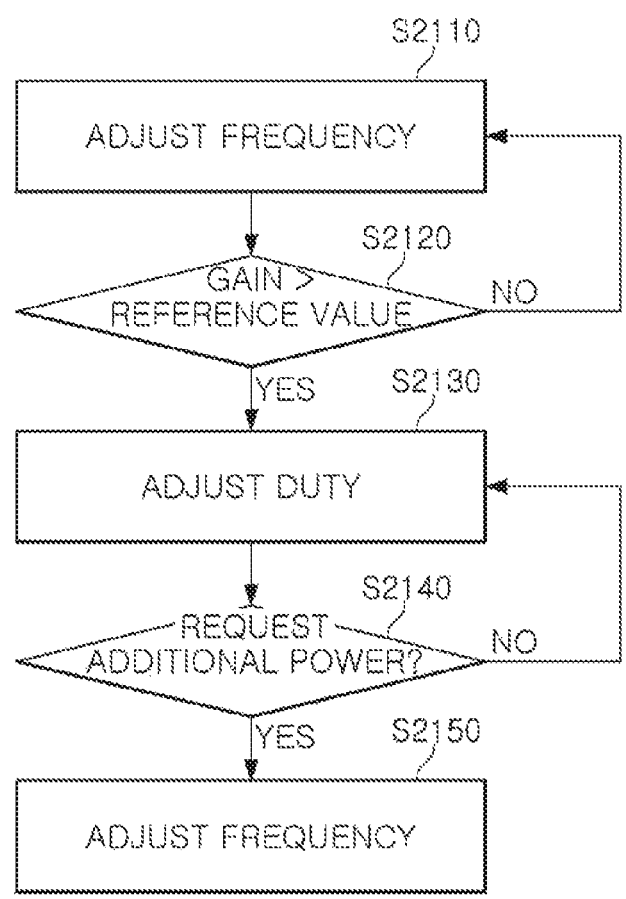
FIGS. 25 and 26 are diagrams each schematically illustrating a process of changing adjusted variables in the wireless power transmitter and the wireless power transmission method, according to an embodiment.

FIG. 25 is a diagram schematically illustrating a process of changing adjusted variables in the wireless power transmitter 1, 1-1, 1-2, 1-3, 1-4, 1-5, 1-6, 1-7, or 1-8 and the wireless power transmission method, according to an embodiment.

Referring to FIG. 25, in operation S2110, the controller 200, 201, 202, 203, 204, 205, 206, 207, or 208 adjusts a frequency of the power which is wirelessly transmitted, in response to the request signal input from the wireless power receiver 2. For example, the controller 200, 201, 202, 203, 204, 205, 206, 207, or 208 adjusts the frequency of the power which is wirelessly transmitted, by adjusting the frequency of the control signal. That is, in a case in which the wireless power receiver 2 requires a larger amount of power, the controller 200, 201, 202, 203, 204, 205, 206, 207, or 208 decreases the frequency, and, in a case in which the wireless power receiver 2 requires a smaller amount of power, the controller 200, 201, 202, 203, 204, 205, 206, 207, or 208 increases the frequency. Operation S2110 is performed in the normal mode, and may also be performed in the boost mode.

Next, in operation S2120, it is determined whether a gain at the adjusted frequency is greater than a reference value. In this case, by determining whether the adjusted frequency reaches the reference value, it is also determined whether the adjusted frequency is greater than the reference value.

As a result of the determination in operation S2120, if it is determined that the gain at the adjusted frequency is less than the reference value, operation S2110 is performed.

As a result of the determination in operation S2120, if it is determined that a gain at a current frequency is equal to or greater than the reference value, the duty cycle of the control signal is adjusted in operation S2130. In this case, the frequency is fixed. That is, in the case in which operation S2110 is performed in the normal mode, the operation mode is changed to the boost mode.

Next, even after the duty cycle is adjusted up to a limit value, it is determined in operation S2140 whether there is an additional power request. For example, even after the duty cycle is increased up to the limit value, it is determined whether the wireless power receiver requires a larger amount of power.

As a result of the determination in operation S2140, if there is an additional power request, the frequency is also adjusted in operation S2150. S2150 is performed in the boost mode.

Although FIG. 25 illustrates a case in which the amount of power received by the wireless power receiver 2 is increased, by way of example, an operation of decreasing the amount of power received by the wireless power receiver 2 is implemented similarly to FIG. 25.

Figure 26:
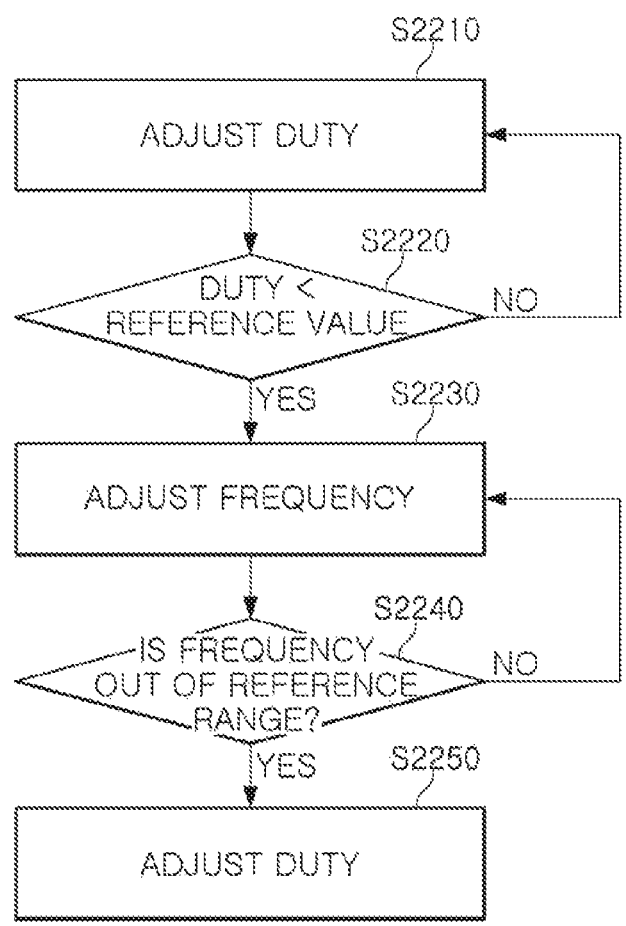

FIG. 26 is a diagram schematically illustrating a process of changing adjusted variables in the wireless power transmitter 1, 1-1, 1-2, 1-3, 1-4, 1-5, 1-6, 1-7, or 1-8 and the wireless power transmission method, according to an embodiment.

Referring to FIG. 26, in operation S2210, the controller 200, 201, 202, 203, 204, 205, 206, 207, or 208 adjusts the duty cycle of the control signal, in response to the request signal input from the wireless power receiver 2. For example, in a case in which the wireless power receiver 2 requires a larger amount of power, the controller 200, 201, 202, 203, 204, 205, 206, 207, or 208 increases the duty cycle, and in a case in which the wireless power receiver 2 requires a smaller amount of power, the controller 200, 201, 202, 203, 204, 205, 206, 207, or 208 decreases the duty cycle. Operation S2210 is performed in the boost mode and the reduction mode.

Next, in operation S2220, it is determined whether the adjusted duty cycle is less than a reference value. If it is determined in operation S2220 that the adjusted duty cycle is greater than the reference value, operation S2210 is performed.

If it is determined in operation S2220 that the adjusted duty cycle is equal to or less than the reference value, the frequency of the power which is wirelessly transmitted is adjusted in operation S2230. In this case, the duty cycle is fixed to the reference value. In addition, the frequency of the power which is wirelessly transmitted is adjusted by adjusting the frequency of the control signal. For example, the amount of power received by the wireless power receiver 2 is decreased by increasing the frequency of the control signal. In the case in which operation S2210 is performed in the boost mode, operation S2230 may be performed in the normal mode.

Next, in operation S2240, it is determined whether the adjusted frequency is out of a reference range.

If it is determined in operation S2240 that the adjusted frequency is out of the reference range, the duty cycle is adjusted in operation S2250. For example, if it is determined in operation S2240 that the adjusted frequency is the reference value or more, the frequency is fixed to the reference value and the duty cycle is decreased in operation S2250. In the case in which operation S2230 is performed in the normal mode, operation S2250 may be performed in the reduction mode. Alternatively, all of the operations illustrated in FIG. 23 are performed in the reduction mode.

Although FIG. 26 illustrates an example case in which the amount of power received by the wireless power receiver 2 is decreased, an operation of increasing the amount of power received by the wireless power receiver 2 is implemented similarly to the manner illustrated in FIG. 26.

FIGS. 27 through 46 are diagrams each illustrating an operation of determining, by the controller 200, 201, 202, 203, 204, 205, 206, 207, or 208, an operating frequency and an operating duty cycle. The controller 200, 201, 202, 203,

204, 205, 206, 207, or 208 determines the operating frequency and the operating duty cycle using the methods illustrated in FIGS. 27 through 46, and outputs the control signals that control the switching elements using the determined operating frequency and operating duty cycle.

Error information in each of FIGS. 27 through 46, which is information received from the wireless power receiver 2, is information included in the request signal req of FIGS. 7 through 15, and is also provided to the controller 200, 201, 202, 203, 204, 205, 206, 207, or 208 in a form of an independent signal.

In each of FIGS. 27 through 46, the operating duty cycle means a duty cycle of the control signal that controls a low side switching element (i.e., the second switching element Q21, Q22, Q23, Q24, Q25, Q26, and Q28 and/or the fourth switching element Q44, Q45, and Q48 of FIGS. 8 through 13, and 15) or the switching element of the boost converter (i.e., the sixth switching element Q67 of FIG. 14). Therefore, a duty cycle of each of the controlling signals that control a high side switching element (i.e., the first switching element Q11, Q12, Q13, Q14, Q15, Q16, and Q18 and/or the third switching element Q34, Q35, and Q38 of FIGS. 8 through 13, and 15) is a 100− operating duty cycle d_c.

In addition, in each of FIGS. 27 through 46, the operating frequency is an operating frequency of at least one of the switching elements (i.e., the switching elements Q11, Q21, Q12, Q22, Q13, Q23, Q14, Q24, Q34, Q44, Q15, Q25, Q35, Q45, Q16, Q26, Q17, Q27, Q18, Q28, Q38, and Q48 of FIGS. 8 through 15) performing an inverter function.

In FIGS. 27 through 46, the first reference frequency f1 and the second reference frequency f2 is set by the same method used to set the first and second reference frequencies f1 and f2 illustrated in FIG. 6. In addition, a first reference duty cycle d1 and a second reference duty cycle d2 are also set similarly to the setting of the first reference frequency f1 and the second reference frequency f2. For example, the first reference duty cycle d1, which is a lower limit value of the duty cycle which is adjustable in a first reduction mode, is determined by considering power transmission efficiency, element characteristics of the wireless power transmitter 1, 1-2, 1-3, 1-4, 1-5, 1-6, 1-7, or 1-8 and the wireless power receiver 2, standards, or other protocols. The second reference duty cycle d2, which is an upper limit value of the duty cycle which is adjustable in a first boost mode, is determined by considering power transmission efficiency, element characteristics of the wireless power transmitter 1, 1-2, 1-3, 1-4, 1-5, 1-6, 1-7, or 1-8 and the wireless power receiver 2, degree of heat generated, standards, or other protocols. The second reference frequency f2 is greater than the first reference frequency f1, and the second reference duty cycle d2 is greater than the first reference duty cycle d1. In addition, the first reference frequency f1 is less than or equal to a ping frequency f_p, and the second reference frequency f2 is greater than or equal to the ping frequency f_p. The first reference duty cycle d1 may be less than or equal to a ping duty cycle d_p, and the second reference duty cycle d2 may be greater than or equal to the ping duty cycle d_p. In addition, the first reference frequency f1 is greater than the resonance frequency of the resonator 120, 121, 122, 123, 124, 125, 126, 127, or 128 of FIGS. 7 through 15.

Figure 27:
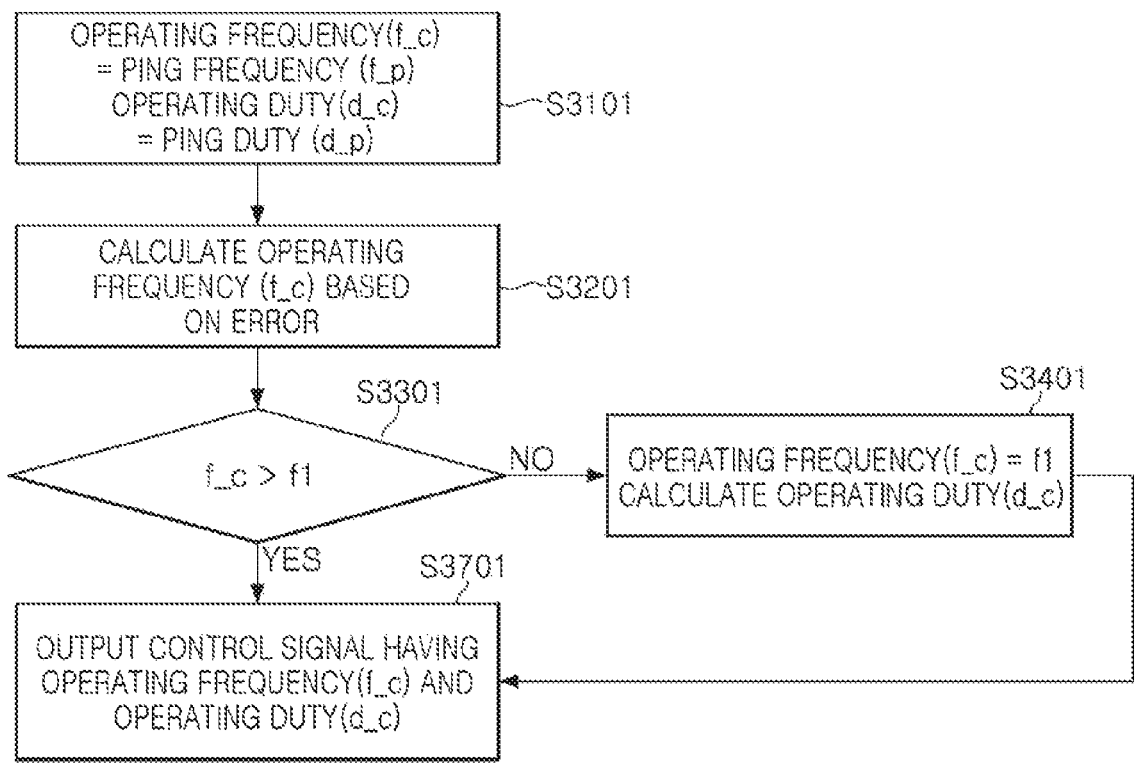
FIGS. 27 through 46 are operation flowcharts each illustrating an operation of the wireless power transmitter and the wireless power transmission method in a power transmission mode, according to an embodiment, and diagrams respectively illustrating a change of an operating frequency and an operating duty cycle.

FIG. 27 is an operation flowchart illustrating an operation of the wireless power transmitter 1, 1-2, 1-3, 1-4, 1-5, 1-6, 1-7, or 1-8 or the wireless power transmission method in a power transmission mode, according to an embodiment.

First, in operation S3101, the controller 200, 201, 202, 203, 204, 205, 206, 207, or 208 sets the operating frequency f_c to the ping frequency f_p, and sets the operating duty cycle d_c to the ping duty cycle d_p. Operation S3101 is performed in the detection mode.

Next, in operation S3201, the controller 200, 201, 202, 203, 204, 205, 206, 207, or 208 calculates the operating frequency f_c based on the error information received from the wireless power receiver 2. In this case, the operating duty cycle d_c is fixed to the ping duty cycle d_p. The error information is information regarding a difference between the amount of power required by the wireless power receiver 2 and the amount of power received by the wireless power receiver 2.

Next, in operation S3301, it is determined whether the calculated operating frequency f_c is greater than the first reference frequency f1.

If it is determined in operation S3301 that the calculated operating frequency f_c is greater than the first reference frequency f1, the controller 200, 201, 202, 203, 204, 205, 206, 207, or 208 generates the control signals using the calculated operating frequency f_c and operating duty cycle d_c, and outputs the generated control signals in operation S3701.

If it is determined in operation S3301 that the operating frequency f_c is less than or equal to the first reference frequency f1, the controller 200, 201, 202, 203, 204, 205, 206, 207, or 208 sets the operating frequency f_c to the first reference frequency f1, and calculates the operating duty cycle d_c based on the error information in operation S3401.

After performing operation S3401, the controller 200, 201, 202, 203, 204, 205, 206, 207, or 208 generates the control signals using the calculated operating frequency f_c and operating duty cycle d_c, and outputs the generated control signals in operation S3701.

Figure 28:
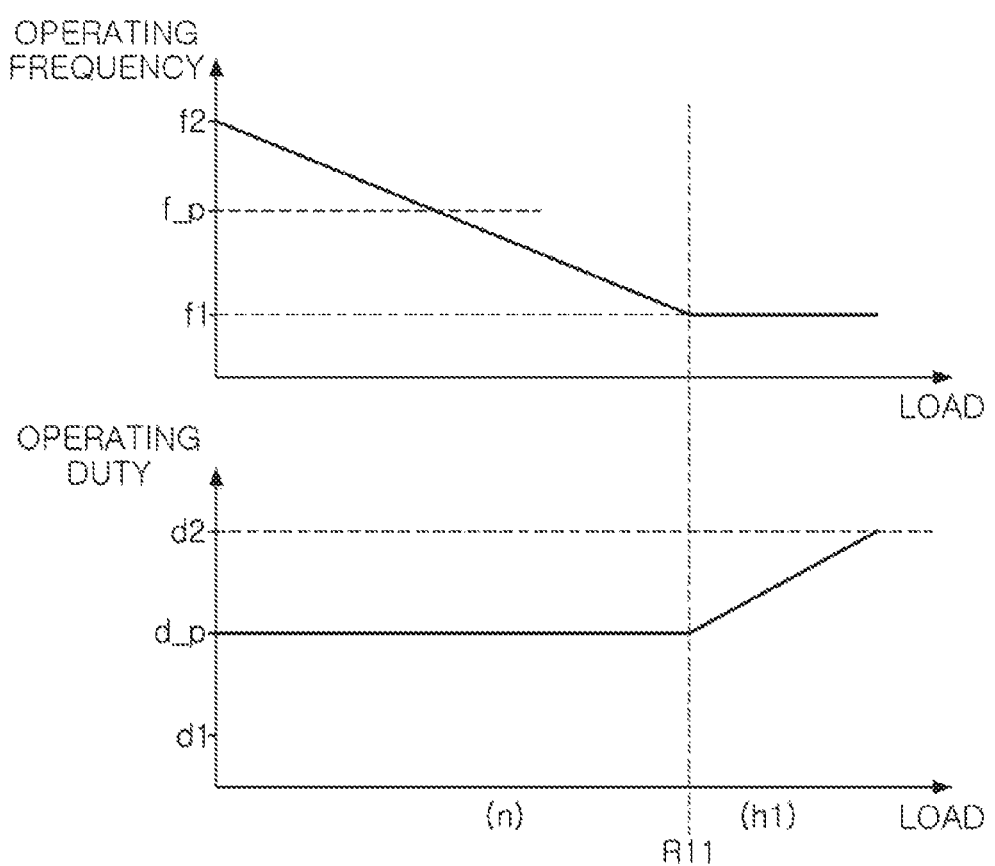

FIG. 28 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 28, first, in the normal mode n, the controller 200, 201, 202, 203, 204, 205, 206, 207, or 208 adjusts the amount of power received by the wireless power receiver 2 by varying the operating frequency f_c, in response to the error information received from the wireless power receiver 2. In this case, the operating duty cycle d_c is fixed to the ping duty cycle d_p. In the normal mode n, the operating frequency f_c is varied within the range of the first reference frequency f1 to the second reference frequency f2.

When the amount of power received by the wireless power receiver 2 is less than the amount of power required by the wireless power receiver 2, even in the case in which the operating frequency f_c is decreased up to the first reference frequency f1, the operation mode of the controller 200, 201, 202, 203, 204, 205, 206, 207, or 208 is changed to the first boost mode h1, and the controller 200, 201, 202, 203, 204, 205, 206, 207, or 208 adjusts the operating duty cycle d_c after fixing the operating frequency f_c to the first reference frequency f1. In the first boost mode h1, the operating duty cycle d_c is varied within the range of the ping duty cycle d_p to the second reference duty cycle d2.

An operation of FIG. 28 will be described below with reference to the amount of power required by the wireless power receiver 2, that is, a load amount.

With respect to FIG. 28, if the load amount is less than a first reference load amount R11, the controller 200, 201, 202, 203, 204, 205, 206, 207, or 208 is operated in the normal mode n. In the normal mode n, the controller 200, 201, 202, 203, 204, 205, 206, 207, or 208 fixes the operating duty cycle d_c to the ping duty cycle d_p, and varies the operating frequency f_c. In the normal mode, the operating frequency f_c is varied within the range of the first reference frequency f1 to the second reference frequency f2.

If the load amount is greater than the first reference load amount R11, the controller 200, 201, 202, 203, 204, 205, 206, 207, or 208 is operated in the first boost mode h1. In the first boost mode h1, the controller 200, 201, 202, 203, 204, 205, 206, 207, or 208 fixes the operating frequency f_c to the first reference frequency f1, and varies the operating duty cycle d_c. In the first boost mode h1, the controller 200, 201, 202, 203, 204, 205, 206, 207, or 208 varies the operating duty cycle d_c in the range of the ping duty cycle d_p to the second duty cycle.

Figure 29:
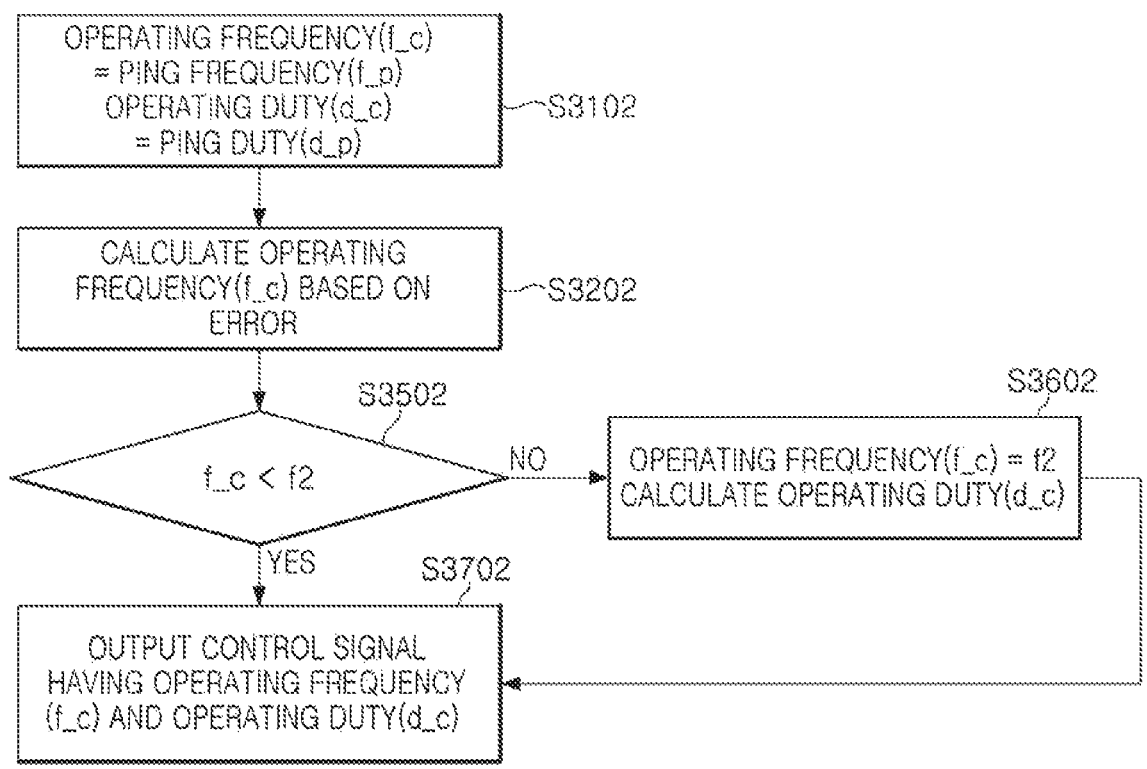

FIG. 29 is an operation flowchart illustrating an operation of the wireless power transmitter 1, 1-2, 1-3, 1-4, 1-5, 1-6, 1-7, or 1-8 and the wireless power transmission method in a power transmission mode, according to an embodiment.

First, in operation S3102, the controller 200, 201, 202, 203, 204, 205, 206, 207, or 208 sets the operating frequency f_c to the ping frequency f_p, and set the operating duty cycle d_c to the ping duty cycle d_p. Operation S3102 is performed in the detection mode.

Next, in operation S3202, the controller 200, 201, 202, 203, 204, 205, 206, 207, or 208 calculates the operating frequency f_c based on the error information received from the wireless power receiver 2. In this case, the operating duty cycle d_c is fixed to the ping duty cycle d_p. The error information error is information regarding a difference between the amount of power required by the wireless power receiver 2 and the amount of power received by the wireless power receiver 2.

Next, in operation S3502, it is determined whether the calculated operating frequency f_c is less than the second reference frequency f2.

If it is determined in operation S3502 that the calculated operating frequency f_c is less than the second reference frequency f2, the controller 200, 201, 202, 203, 204, 205, 206, 207, or 208 generates the control signals using the calculated operating frequency f_c and operating duty cycle d_c, and outputs the generated control signals in operation S3702.

Alternatively, if it is determined in operation S3502 that the operating frequency f_c is greater than or equal to the second reference frequency f2, the controller 200, 201, 202, 203, 204, 205, 206, 207, or 208 sets the operating frequency f_c to the second reference frequency f2, and calculates the operating duty cycle d_c based on the error information error in operation S3602.

After performing operation S3602, the controller 200, 201, 202, 203, 204, 205, 206, 207, or 208 generates the control signals using the calculated operating frequency f_c and operating duty cycle d_c, and outputs the generated control signals in operation S3702.

Figure 30:
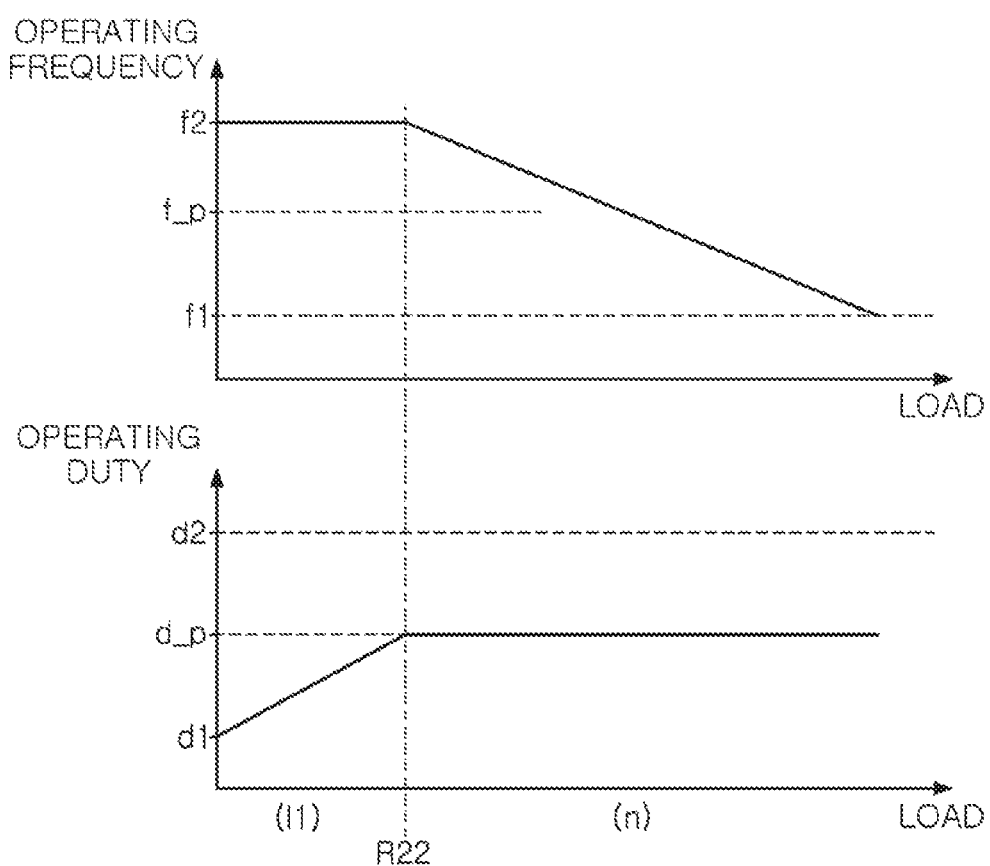

FIG. 30 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 30, first, in the normal mode n, the controller 200, 201, 202, 203, 204, 205, 206, 207, or 208 adjusts the amount of power received by the wireless power receiver 2 by varying the operating frequency f_c, in response to the error information received from the wireless power receiver 2. In this case, the operating duty cycle d_c is fixed to the ping duty cycle d_p.

When the amount of power received by the wireless power receiver 2 is greater than the amount of power required by the wireless power receiver 2, even in the case in which the operating frequency f_c is increased up to the second reference frequency f2, the operation mode of the controller 200, 201, 202, 203, 204, 205, 206, 207, or 208 is changed to a first reduction mode l1, and the controller 200, 201, 202, 203, 204, 205, 206, 207, or 208 adjusts the operating duty cycle d_c after fixing the operating frequency f_c to the second reference frequency f2.

An operation of FIG. 30 will be described below with reference to the amount of power required by the wireless power receiver 2, that is, a load amount.

Referring to FIG. 30, if the load amount is greater than a second reference load amount R22, the controller 200, 201, 202, 203, 204, 205, 206, 207, or 208 is operated in the normal mode n. In the normal mode n, the controller 200, 201, 202, 203, 204, 205, 206, 207, or 208 fixes the operating duty cycle d_c to the ping duty cycle d_p, and varies the operating frequency f_c. In the normal mode, the operating frequency f_c is varied within the range of the first reference frequency f1 to the second reference frequency f2.

If the load amount is less than the second reference load amount R22, the controller 200, 201, 202, 203, 204, 205, 206, 207, or 208 is operated in the first reduction mode l1. In the first reduction mode l1, the controller 200, 201, 202, 203, 204, 205, 206, 207, or 208 fixes the operating frequency f_c to the second reference frequency f2, and varies the operating duty cycle d_c. In the first reduction mode l1, the controller 200, 201, 202, 203, 204, 205, 206, 207, or 208 varies the operating duty cycle d_c in the range of the ping duty cycle d_p to the first duty cycle d1.

Figure 31:
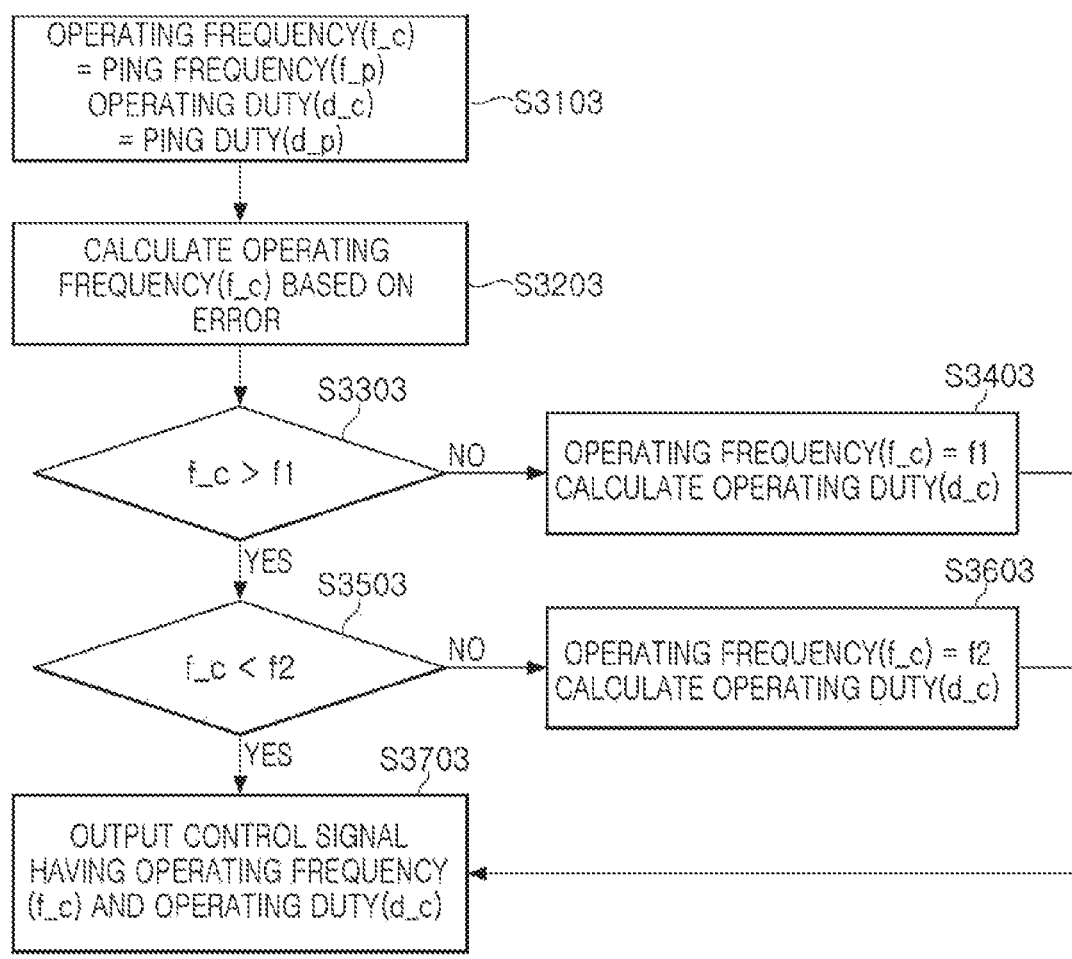

FIG. 31 is an operation flowchart illustrating an operation of the wireless power transmitter 1, 1-2, 1-3, 1-4, 1-5, 1-6, 1-7, or 1-8 and the wireless power transmission method, according to an embodiment.

First, in operation S3103, the controller 200, 201, 202, 203, 204, 205, 206, 207, or 208 sets the operating frequency f_c to the ping frequency f_p, and sets the operating duty cycle d_c to the ping duty cycle d_p. Operation S3103 is performed in the detection mode.

Next, in operation S3203, the controller 200, 201, 202, 203, 204, 205, 206, 207, or 208 calculates the operating frequency f_c based on the error information received from the wireless power receiver. In this case, the operating duty cycle d_c is fixed to the ping duty cycle d_p. The error information is information regarding a difference between the amount of power required by the wireless power receiver 2 and the amount of power received by the wireless power receiver 2.

Next, in operation S3303, it is determined whether the calculated operating frequency f_c is greater than the first reference frequency f1.

If it is determined in operation S3303 that the operating frequency f_c is less than or equal to the first reference frequency f1, the controller 200, 201, 202, 203, 204, 205, 206, 207, or 208 sets the operating frequency f_c to the first reference frequency f1, and calculates the operating duty cycle d_c based on the error information in operation S3403.

After performing operation S3403, the controller 200, 201, 202, 203, 204, 205, 206, 207, or 208 generates the control signals using the calculated operating frequency f_c and operating duty cycle d_c, and outputs the generated control signals in operation S3703.

Alternatively, if it is determined in operation S3303 that the calculated operating frequency f_c is greater than the first reference frequency f1, it is determined whether the calculated operating frequency f_c is less than the second reference frequency f2 in operation S3503.

If it is determined in operation S3503 that the calculated operating frequency f_c is less than the second reference frequency f2, that is, the operating frequency f_c calculated in operation S3203 is a value between the first reference frequency f1 and the second reference frequency f2, the controller 200, 201, 202, 203, 204, 205, 206, 207, or 208 generates the control signals using the calculated operating frequency f_c and operating duty cycle d_c, and outputs the generated control signals in operation S3703.

Alternatively, if it is determined in operation S3503 that the operating frequency f_c is greater than or equal to the second reference frequency f2, the controller 200, 201, 202, 203, 204, 205, 206, 207, or 208 sets the operating frequency f_c to the second reference frequency f2, and calculates the operating duty cycle d_c based on the error information in operation S3603.

After performing S3603, the controller 200, 201, 202, 203, 204, 205, 206, 207, or 208 generates the control signals using the calculated operating frequency f_c and operating duty cycle d_c, and outputs the generated control signals in operation S3703.

Figure 32:
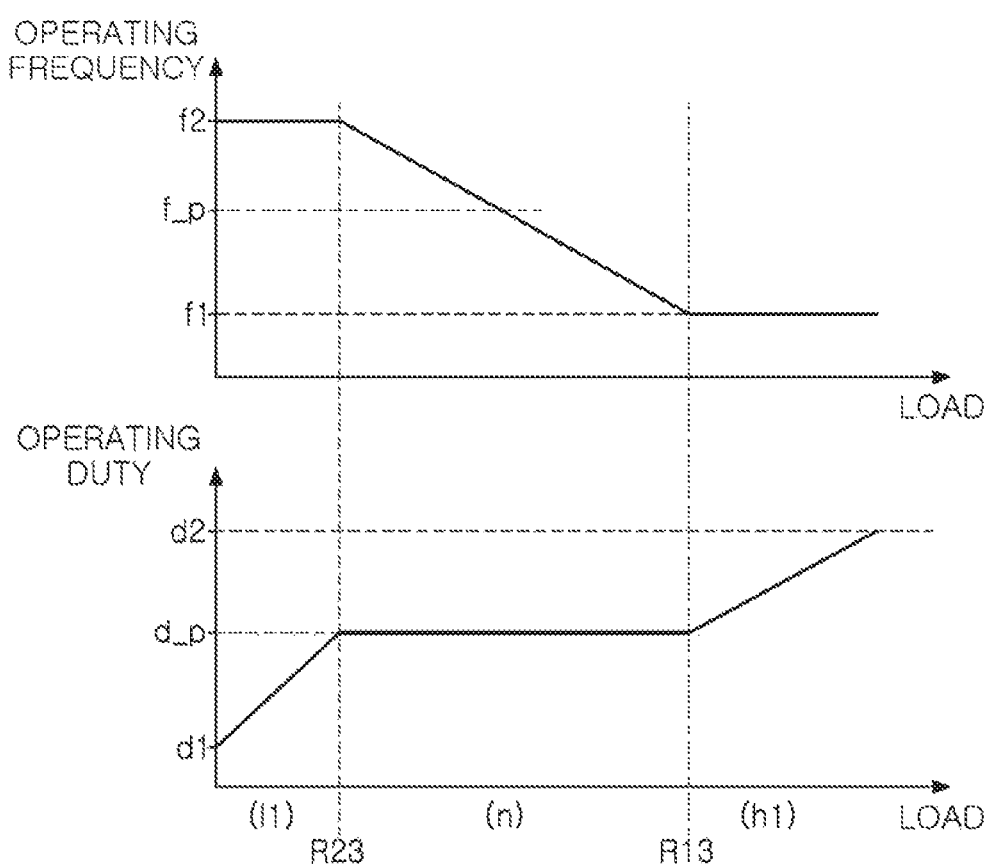

FIG. 32 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 32, first, in the normal mode n, the controller 200, 201, 202, 203, 204, 205, 206, 207, or 208 adjusts the amount of power received by the wireless power receiver 2 by varying the operating frequency f_c, in response to the error information received from the wireless power receiver 2. In this case, the operating duty cycle d_c is fixed to the ping duty cycle d_p.

When the amount of power received by the wireless power receiver 2 is less than the amount of power required by the wireless power receiver 2, even in the case in which the operating frequency f_c is decreased up to the first reference frequency f1, the operation mode of the controller 200, 201, 202, 203, 204, 205, 206, 207, or 208 is changed to the first boost mode h1, and the controller 200, 201, 202, 203, 204, 205, 206, 207, or 208 adjusts the operating duty cycle d_c after fixing the operating frequency f_c to the first reference frequency f1.

When the amount of power received by the wireless power receiver 2 is greater than the amount of power required by the wireless power receiver 2, even in the case in which the operating frequency f_c is increased up to the second reference frequency f2, the operation mode of the controller 200, 201, 202, 203, 204, 205, 206, 207, or 208 is changed to a first reduction mode l1, and the controller 200, 201, 202, 203, 204, 205, 206, 207, or 208 adjusts the operating duty cycle d_c after fixing the operating frequency f_c to the second reference frequency f2.

An operation of FIG. 32 will be described below with reference to the amount of power required by the wireless power receiver 2, that is, a load amount.

If the load amount is less than a first reference load amount R13 and is greater than a second reference load amount R23, the controller 200, 201, 202, 203, 204, 205, 206, 207, or 208 is operated in the normal mode n. In the normal mode n, the controller 200, 201, 202, 203, 204, 205, 206, 207, or 208 fixes the operating duty cycle d_c to the ping duty cycle d_p, and varies the operating frequency f_c. In the normal mode, the operating frequency f_c is varied within the range of the first reference frequency f1 to the second reference frequency f2.

If the load amount is greater than the first reference load amount R13, the controller 200, 201, 202, 203, 204, 205, 206, 207, or 208 is operated in the first boost mode h1. In the first boost mode h1, the controller 200, 201, 202, 203, 204, 205, 206, 207, or 208 fixes the operating frequency f_c to the first reference frequency f1, and varies the operating duty cycle d_c. In the first boost mode h1, the controller 200, 201, 202, 203, 204, 205, 206, 207, or 208 varies the operating duty cycle d_c in the range of the ping duty cycle d_p to the second duty cycle d2.

If the load amount is less than the second reference load amount R22, the controller 200, 201, 202, 203, 204, 205, 206, 207, or 208 is operated in the first reduction mode l1. In the first reduction mode l1, the controller 200, 201, 202, 203, 204, 205, 206, 207, or 208 fixes the operating frequency f_c to the second reference frequency f2, and varies the operating duty cycle d_c. In the first reduction mode l1, the controller 200, 201, 202, 203, 204, 205, 206, 207, or 208 varies the operating duty cycle d_c in the range of the ping duty cycle d_p to the first duty cycle d1.

Figure 33:
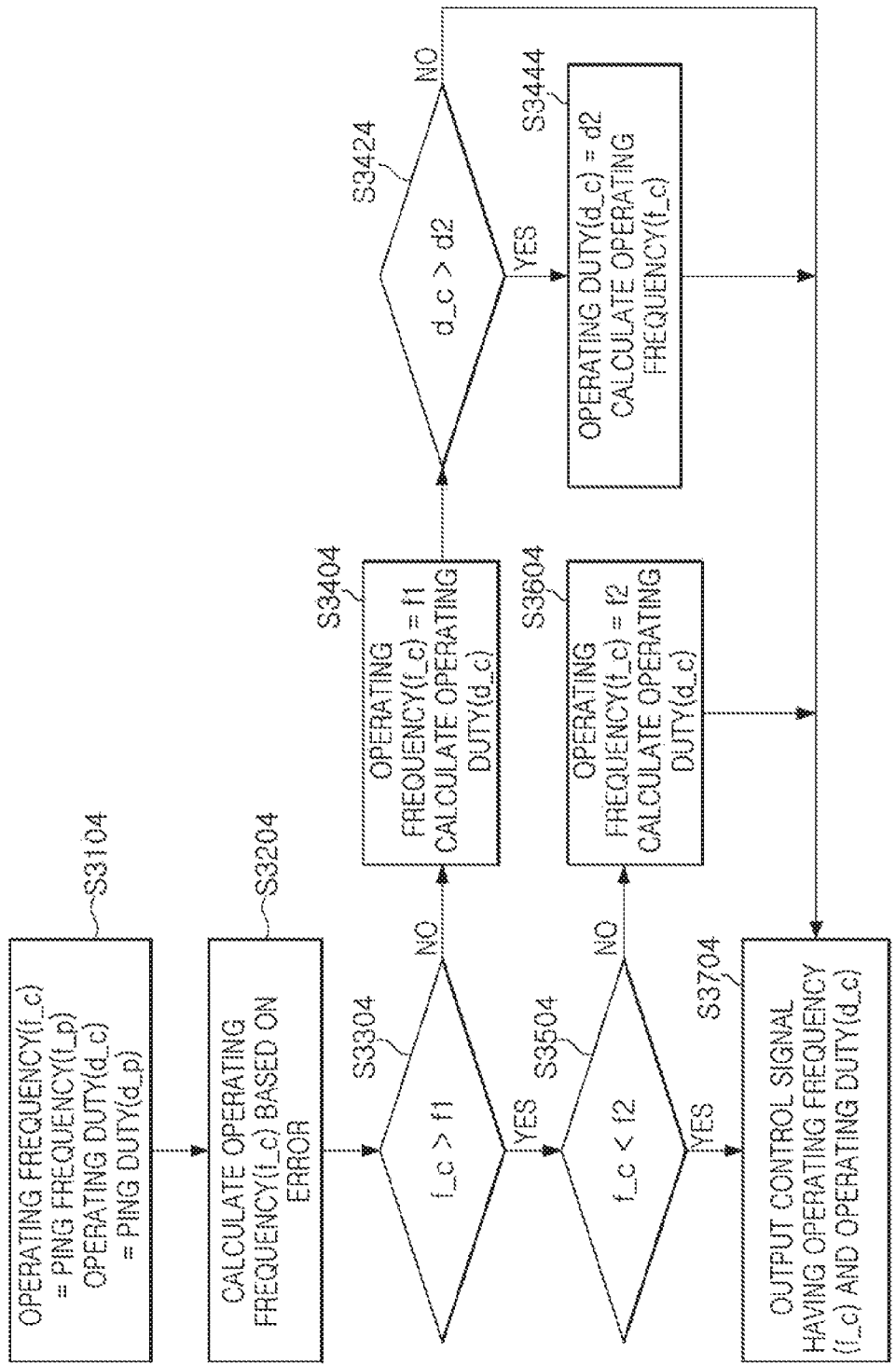

FIG. 33 is an operation flowchart illustrating an operation of the wireless power transmitter 1, 1-2, 1-3, 1-4, 1-5, 1-6, 1-7, or 1-8 and the wireless power transmission method in a power transmission mode, according to an embodiment.

Referring to FIG. 33, first, the controller 200, 201, 202, 203, 204, 205, 206, 207, or 208 sets the operating frequency f_c to the ping frequency f_p, and sets the operating duty cycle d_c to the ping duty cycle d_p in operation S3104. Operation S3104 is performed in the detection mode.

Next, in operation S3204, the controller 200, 201, 202, 203, 204, 205, 206, 207, or 208 calculates the operating frequency f_c based on the error information received from the wireless power receiver 2. In this case, the operating duty cycle d_c is fixed to the ping duty cycle d_p. The error information is information regarding a difference between the amount of power required by the wireless power receiver 2 and the amount of power received by the wireless power receiver 2.

Next, in operation S3304, it is determined whether the calculated operating frequency f_c is greater than the first reference frequency f1.

If it is determined in operation S3304 that the operating frequency f_c is less than or equal to the first reference frequency f1, the controller 200, 201, 202, 203, 204, 205, 206, 207, or 208 sets the operating frequency f_c to the first reference frequency f1, and calculates the operating duty cycle d_c based on the error information in operation S3404.

Next, in operation S3424, it is determined whether the calculated operating duty cycle d_c is greater than the second reference duty cycle d2.

If it is determined in S3424 that the calculated operating duty cycle d_c is less than or equal to the second reference duty cycle d2, the controller 200, 201, 202, 203, 204, 205, 206, 207, or 208 generates the control signals using the calculated operating frequency f_c and operating duty cycle d_c, and outputs the generated control signals in operation S3704.

Alternatively, if it is determined in operation S3424 that the calculated operating duty cycle d_c is greater than the second reference duty cycle d2, the controller 200, 201, 202, 203, 204, 205, 206, 207, or 208 fixes the operating duty cycle d_c to the second duty cycle, and again calculates the operating frequency f_c based on the error information in operation S3444.

After performing operation S3444, the controller 200, 201, 202, 203, 204, 205, 206, 207, or 208 generates the control signals using the calculated operating frequency f_c and operating duty cycle d_c, and outputs the generated control signals in operation S3704.

If it is determined in operation S3304 that the calculated operating frequency f_c is greater than the first reference frequency f1, it is determined whether the calculated operating frequency f_c is less than the second reference frequency f2 in operation S3504.

If it is determined in operation S3504 that the calculated operating frequency f_c is less than the second reference frequency f2, that is, the operating frequency f_c calculated in operation S3204 is a value between the first reference frequency f1 and the second reference frequency f2, the controller 200, 201, 202, 203, 204, 205, 206, 207, or 208 generates the control signals using the calculated operating frequency f_c and operating duty cycle d_c, and outputs the generated control signals in operation S3704.

If it is determined in operation S3504 that the operating frequency f_c is greater than or equal to the second reference frequency f2, the controller 200, 201, 202, 203, 204, 205, 206, 207, or 208 sets the operating frequency f_c to the second reference frequency f2, and calculates the operating duty cycle d_c based on the error information error in operation S3604.

After performing S3604, the controller 200, 201, 202, 203, 204, 205, 206, 207, or 208 generates the control signals using the calculated operating frequency f_c and operating duty cycle d_c, and outputs the generated control signals in operation S3704.

Figure 34:
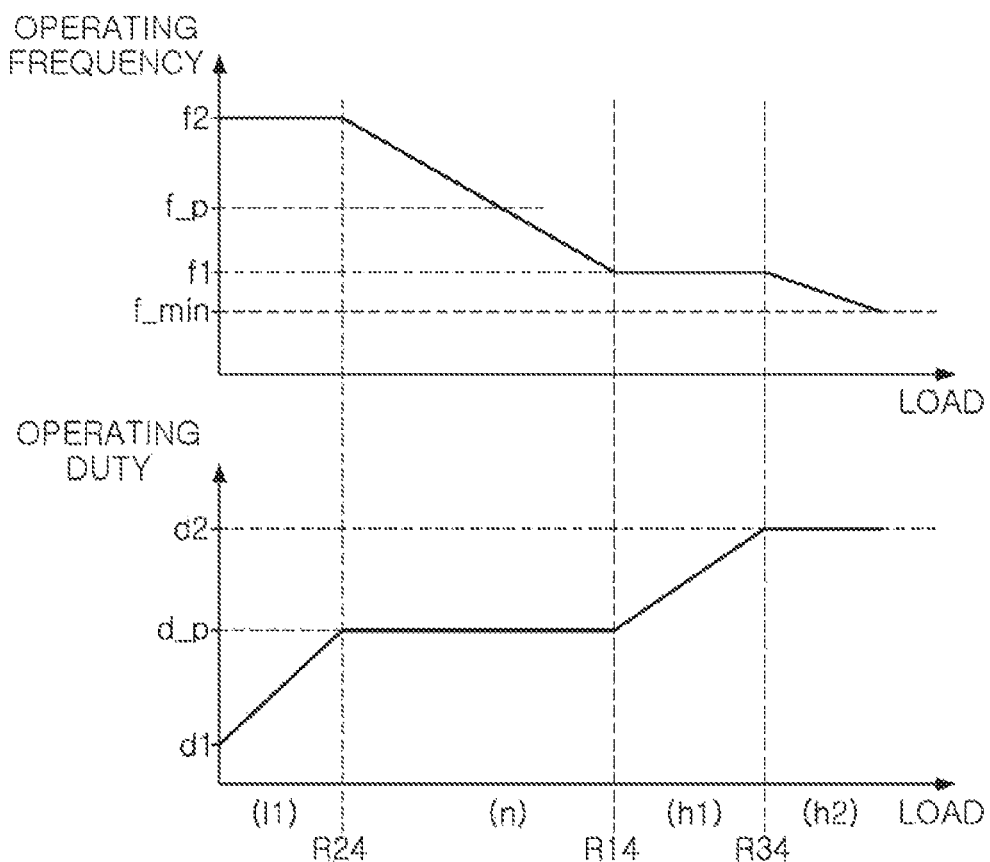

FIG. 34 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

First, in the normal mode n, the controller 200, 201, 202, 203, 204, 205, 206, 207, or 208 adjusts the amount of power received by the wireless power receiver 2 by varying the operating frequency f_c, in response to the error information received from the wireless power receiver 2. In this case, the operating duty cycle d_c is fixed to the ping duty cycle d_p. In the normal mode n, the operating frequency f_c is varied within the range of the first reference frequency f1 to the second reference frequency f2.

When the amount of power received by the wireless power receiver 2 is less than the amount of power required by the wireless power receiver 2, even in the case in which the operating frequency f_c is decreased up to the first reference frequency f1, the operation mode of the controller 200, 201, 202, 203, 204, 205, 206, 207, or 208 is changed to the first boost mode h1, and the controller 200, 201, 202, 203, 204, 205, 206, 207, or 208 adjusts the operating duty cycle d_c after fixing the operating frequency f_c to the first reference frequency f1. In the first boost mode h1, the operating duty cycle d_c is varied within the range of the ping duty cycle d_p to the second reference duty cycle d2.

When the amount of power received by the wireless power receiver 2 is less than the amount of power required by the wireless power receiver 2, even in the case in which the operating duty cycle d_c is increased up to the second reference duty cycle d2 in the first boost mode h1, the operation mode of the controller 200, 201, 202, 203, 204, 205, 206, 207, or 208 is changed to a second boost mode h2, and the controller 200, 201, 202, 203, 204, 205, 206, 207, or 208 adjusts the amount of power received by the wireless power receiver 2 by varying the operating frequency f_c. In the second boost mode h2, the operating duty cycle d_c is fixed to the second reference duty cycle d2. In the second boost mode h2, the operating frequency f_c is varied within the range of the first reference frequency f1 to a minimum frequency f_min.

In the normal mode, when the amount of power received by the wireless power receiver 2 is greater than the amount of power required by the wireless power receiver 2, even in the case in which the operating frequency f_c is increased up to the second reference frequency f2, the operation mode of the controller 200, 201, 202, 203, 204, 205, 206, 207, or 208 is changed to the first reduction mode l1, and the controller 200, 201, 202, 203, 204, 205, 206, 207, or 208 adjusts the operating duty cycle d_c after fixing the operating frequency f_c to the second reference frequency f2. In the first reduction mode l1, the operating duty cycle d_c is varied within the range of the first reference duty cycle d1 to the ping duty cycle d_p.

An operation of FIG. 34 will be described below with reference to the amount of power required by the wireless power receiver 2, that is, a load amount.

If the load amount is less than a first reference load amount R14 and is greater than a second reference load amount R24, the controller 200, 201, 202, 203, 204, 205, 206, 207, or 208 is operated in the normal mode. If the load amount is greater than the first reference amount R14 and is less than a third reference load amount R34, the controller 200, 201, 202, 203, 204, 205, 206, 207, or 208 is operated in the first boost mode h1. If the load amount is less than the second reference amount R24, the controller 200, 201, 202, 203, 204, 205, 206, 207, or 208 is operated in the first reduction mode l1. The operations in the first reduction mode l1, the normal mode n, and the first boost mode h1 are the same as those described with respect to FIG. 32.

If the load amount is greater than the third reference load amount R34, the controller 200, 201, 202, 203, 204, 205, 206, 207, or 208 is operated in the second boost mode h2. In the second boost mode h2, the controller 200, 201, 202, 203, 204, 205, 206, 207, or 208 fixes the operating duty cycle d_c to the second reference duty cycle d2, and varies the operating frequency f_c. In the second boost mode h2, the operating frequency f_c is varied within the range of the first reference frequency f1 to the minimum frequency f_min.

Figure 35:
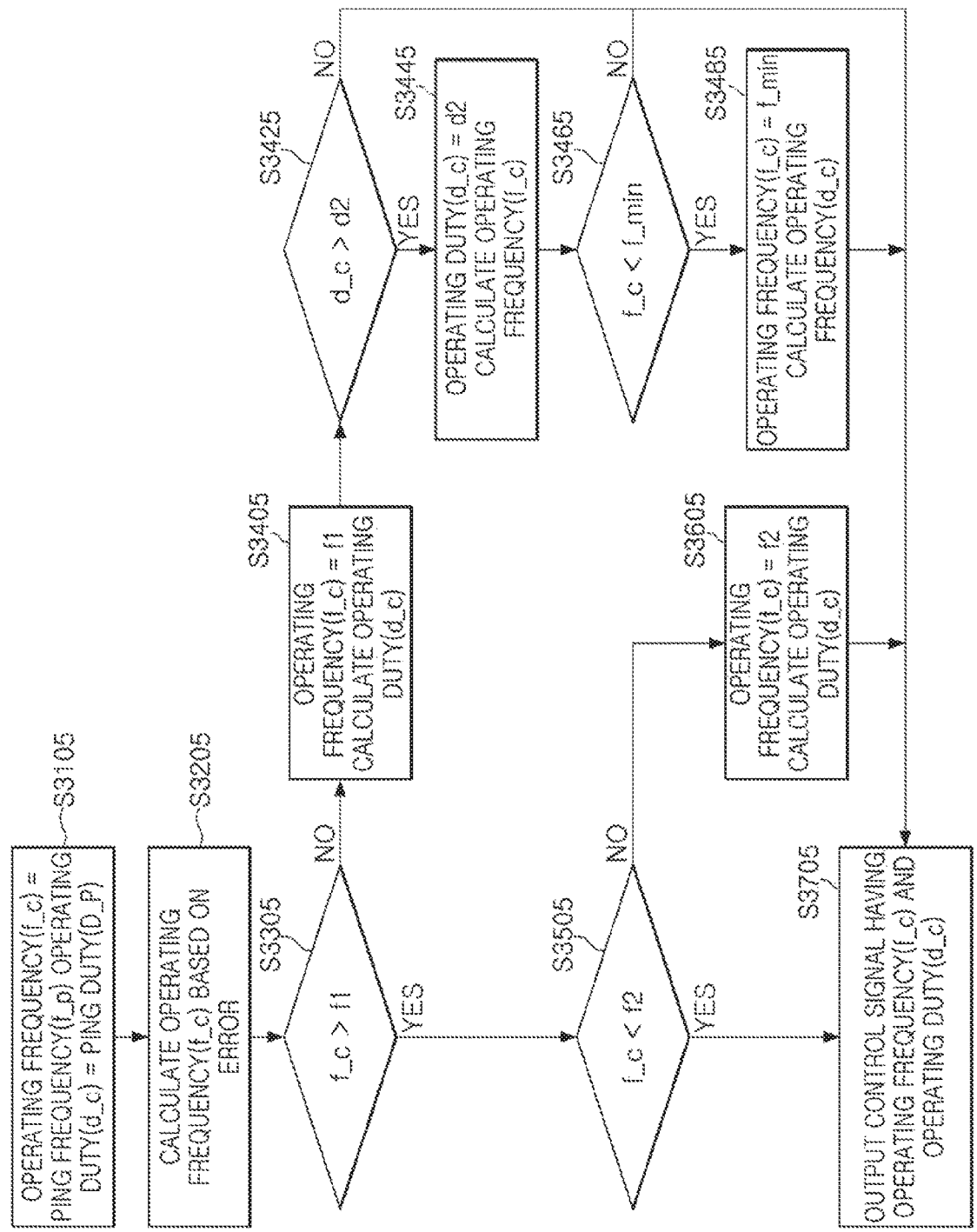

FIG. 35 is an operation flowchart illustrating an operation of the wireless power transmitter 1, 1-2, 1-3, 1-4, 1-5, 1-6, 1-7, or 1-8 and the wireless power transmission method in a power transmission mode, according to an embodiment.

Operations S3105, S3205, S3305, S3405, S3425, S3445, S3505, S3605, and S3705 are the same as operations S3104, S3204, S3304, S3404, S3424, S3444, S3504, S3604, and S3704 described in FIG. 33, respectively.

After the operating frequency f_c is calculated in operation S3445, the controller 200, 201, 202, 203, 204, 205, 206, 207, or 208 determines whether the operating frequency f_c is less than the minimum frequency f_min in operation S3465.

If it is determined in operation S3465 that the operating frequency f_c calculated in S3445 is greater than or equal to the minimum frequency f_min, the controller 200, 201, 202, 203, 204, 205, 206, 207, or 208 generates the control signals using the calculated operating frequency f_c and operating duty cycle d_c, and outputs the generated control signals in operation S3705.

Alternatively, if it is determined in operation S3465 that the operating frequency f_c calculated in operation S3445 is less than the minimum frequency f_min, the controller 200, 201, 202, 203, 204, 205, 206, 207, or 208 sets the operating frequency to the minimum frequency f_min, and calculates the operating duty cycle d_c based on the error information error in operation S3485. In operation S3485, the operating duty cycle d_c is greater than the second reference duty cycle d2. For example, the operating duty cycle d_c has a value of 50% or more.

After performing operation S3485, the controller 200, 201, 202, 203, 204, 205, 206, 207, or 208 generates the control signals using the calculated operating frequency f_c and operating duty cycle d_c, and outputs the generated control signals in operation S3705.

Figure 36:
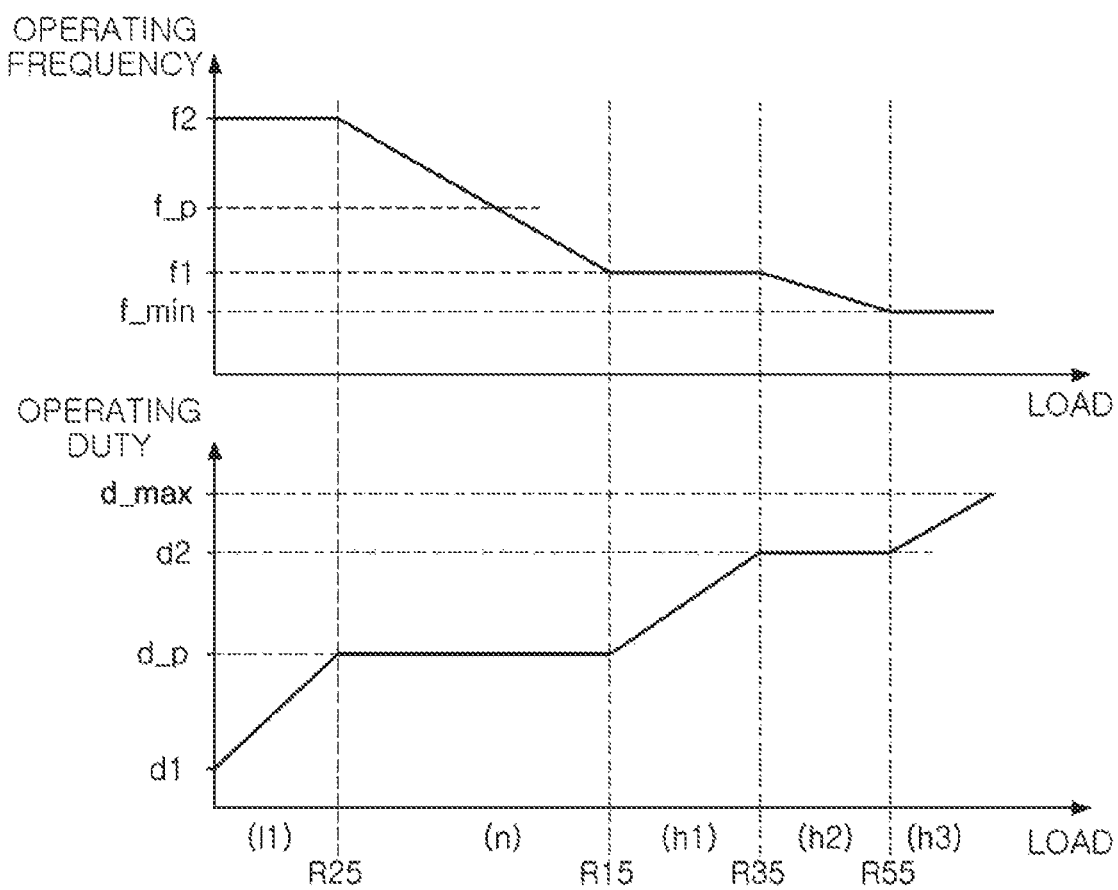

FIG. 36 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 36, the operations in the first reduction mode l1, the normal mode n, the first boost mode h1, and the second boost mode h2 are the same as those described in FIG. 34.

Referring to FIG. 36, in the second boost mode h2, when the amount of power received by the wireless power receiver 2 is less than the amount of power required by the wireless power receiver 2, even in the case in which the operating frequency is decreased up to the minimum frequency f_min, the operation mode of the controller 200, 201, 202, 203, 204, 205, 206, 207, or 208 is changed to a third boost mode h3. In the third boost mode h3, the controller 200, 201, 202, 203, 204, 205, 206, 207, or 208 fixes the operating frequency f_c to the minimum frequency f_min, and increases the operating duty cycle d_c. In the third boost mode h3, the operating duty cycle d_c has a value of the second reference duty cycle d2 or more. For example, in the third boost mode h3, the operating duty cycle d_c is adjusted in the range of the second reference duty cycle d2 or more to the maximum duty cycle d_max or less. The second reference duty cycle d2 and the maximum duty cycle d_max are set by a user in consideration of limitations based on standards and other protocols, or an environment in which the wireless power transmitter 1, 1-2, 1-3, 1-4, 1-5, 1-6, 1-7, or 1-8 is used.

That is, if the load amount is greater than a fifth reference load amount R55, the controller 200, 201, 202, 203, 204, 205, 206, 207, or 208 is operated in the third boost mode h3.

Figure 37:
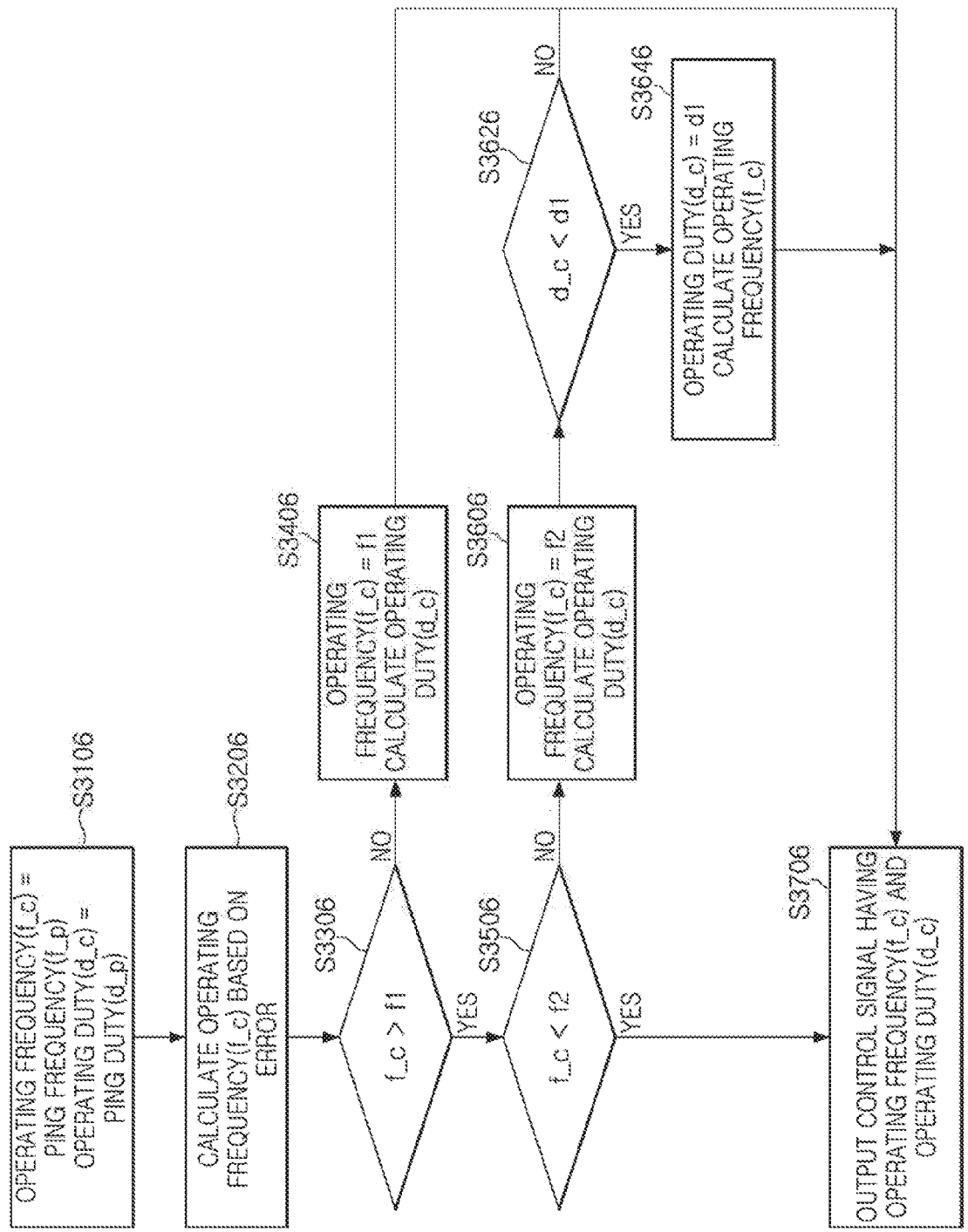

FIG. 37 is an operation flowchart illustrating an operation of the wireless power transmitter 1, 1-2, 1-3, 1-4, 1-5, 1-6, 1-7, or 1-8 and the wireless power transmission method in a power transmission mode, according to an embodiment.

In FIG. 37, operations S3106, S3206, S3306, S3406, S3506, S3606, and S3706 are the same as operations S3103, S3203, S3303, S3403, S3503, S3603, and S3703 described in FIG. 28, respectively.

After the operating duty cycle d_c is calculated in operation S3606, the controller 200, 201, 202, 203, 204, 205, 206, 207, or 208 determines whether the calculated operating duty cycle d_c is less than the first reference duty cycle d1 in operation S3626.

If it is determined in operation S3626 that the operating duty cycle d_c is greater than or equal to the first reference duty cycle d1, the controller 200, 201, 202, 203, 204, 205, 206, 207, or 208 generates the control signals using the operating frequency f_c and the operating duty cycle d_c calculated in operation S3606, and outputs the generated control signals in operation S3706.

Alternatively, if it is determined in operation S3626 that the operating duty cycle d_c is less than the first reference duty cycle d1, the controller 200, 201, 202, 203, 204, 205, 206, 207, or 208 fixes the operating duty cycle d_c to the first reference duty cycle d1, and calculates the operating frequency f_c based on the error information error in operation S3646.

After performing operation S3646, the controller 200, 201, 202, 203, 204, 205, 206, 207, or 208 generates the control signals using the calculated operating frequency f_c and operating duty cycle d_c, and outputs the generated control signals in operation S3706.

Figure 38:
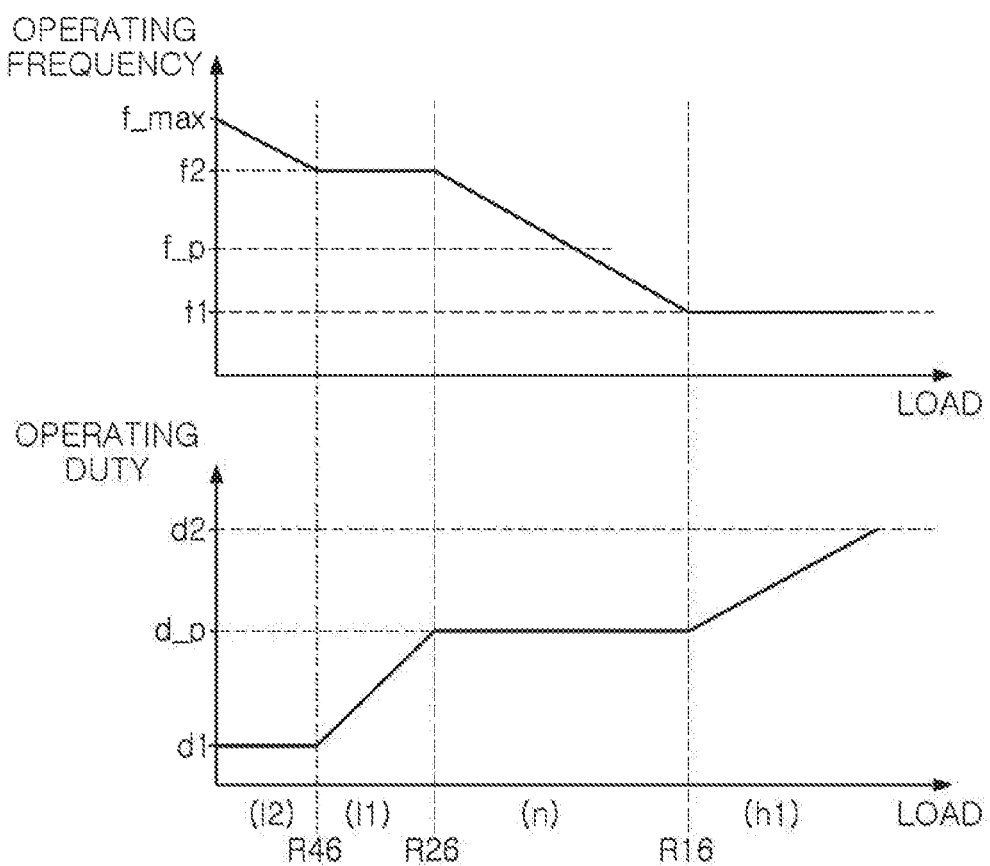

FIG. 38 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

Referring to FIG. 38, the operations in the first reduction mode l1, the normal mode n, and the first boost mode h1 are the same as those described in FIG. 32.

In the first reduction mode l1, when the amount of power received by the wireless power receiver 2 is greater than the amount of power required by the wireless power receiver 2, even in the case in which the operating duty cycle d_c is decreased up to the first reference duty cycle d1, the operation mode of the controller 200, 201, 202, 203, 204, 205, 206, 207, or 208 is changed to a second reduction mode l2. In the second reduction mode l2, the controller 200, 201, 202, 203, 204, 205, 206, 207, or 208 fixes the operating duty cycle d_c to the first reference duty cycle d1, and varies the operating frequency f_c. In the second reduction mode l2, the operating frequency f_c is varied within the range of the second reference frequency f2 to the maximum frequency f_max.

That is, if the load amount is greater than a fourth reference load amount R46, the controller 200, 201, 202, 203, 204, 205, 206, 207, or 208 is operated in the second reduction mode l2.

Figure 39:
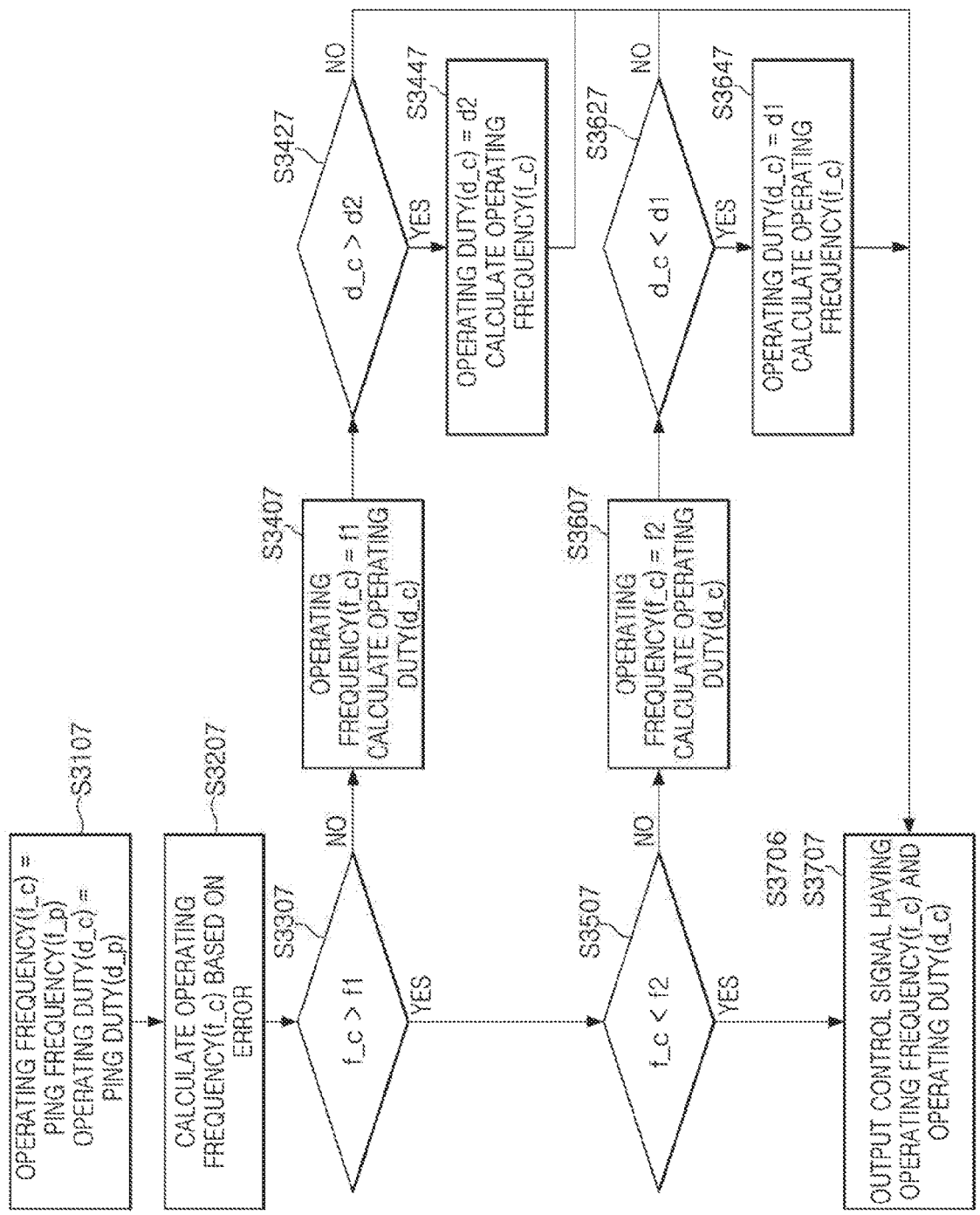

FIG. 39 is an operation flowchart illustrating an operation of the wireless power transmitter 1, 1-2, 1-3, 1-4, 1-5, 1-6, 1-7, or 1-8 and the wireless power transmission method in a power transmission mode, according to an embodiment.

In FIG. 39, operations S3107, S3207, S3307, S3407, S3507, S3607, and S3707 are the same as operations S3103, S3203, S3303, S3403, S3503, S3603, and S3703 described in FIG. 31, respectively.

Referring to FIG. 39, after the operating duty cycle d_c is calculated in operation S3407, the controller 200, 201, 202, 203, 204, 205, 206, 207, or 208 determines whether or not the calculated operating duty cycle d_c is greater than the second reference duty cycle d2 in operation S3427.

If it is determined in operation S3427 that the calculated operating duty cycle d_c is less than or equal to the second reference duty cycle d2, the controller 200, 201, 202, 203, 204, 205, 206, 207, or 208 generates the control signals using the operating frequency f_c and the operating duty cycle d_c which are calculated in operation S3407, and outputs the generated control signals in operation S3707.

Alternatively, if it is determined in operation S3427 that the calculated operating duty cycle d_c is greater than the second reference duty cycle d2, the controller 200, 201, 202, 203, 204, 205, 206, 207, or 208 fixes the operating duty cycle d_c to the second duty cycle, and again calculates the operating frequency f_c based on the error information in operation S3447.

After performing operation S3447, the controller 200, 201, 202, 203, 204, 205, 206, 207, or 208 generates the control signals using the calculated operating frequency f_c and operating duty cycle d_c, and outputs the generated control signals in operation S3707.

After the operating duty cycle d_c is calculated in operation S3607, the controller 200, 201, 202, 203, 204, 205, 206, 207, or 208 determines whether the calculated operating duty cycle d_c is less than the first reference duty cycle d1 in operation S3627.

If it is determined in operation S3627 that the operating duty cycle d_c is greater than or equal to the first reference duty cycle d1, the controller 200, 201, 202, 203, 204, 205, 206, 207, or 208 generates the control signals using the operating frequency f_c and the operating duty cycle d_c which are calculated in operation S3607, and outputs the generated control signals in operation S3707.

Alternatively, if it is determined in operation S3627 that the operating duty cycle d_c is less than the first reference duty cycle d1, the controller 200, 201, 202, 203, 204, 205, 206, 207, or 208 fixes the operating duty cycle d_c to the first reference duty cycle d1, and calculates the operating frequency f_c based on the error information error in operation S3647.

After performing operation S3647, the controller 200, 201, 202, 203, 204, 205, 206, 207, or 208 generates the control signals using the calculated operating frequency f_c and operating duty cycle d_c, and outputs the generated control signals in operation S3707.

Figure 40:
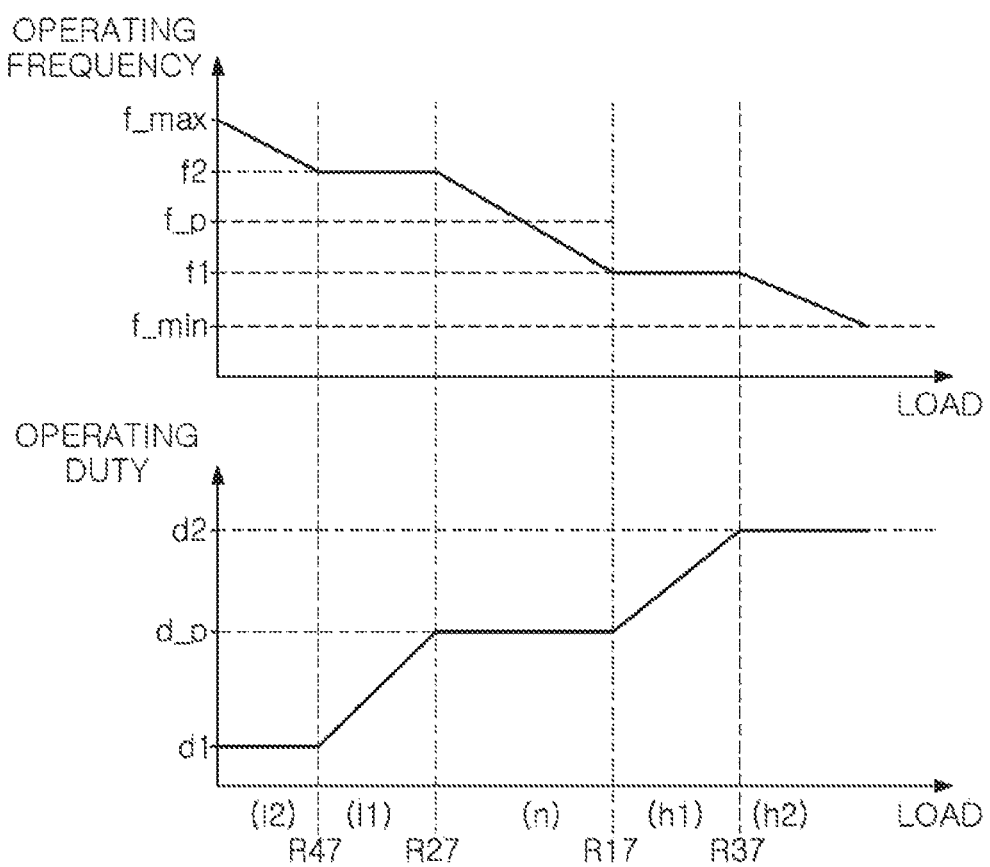

FIG. 40 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 40, the operations in the first reduction mode l1, the normal mode n, and the first boost mode h1 are the same as those described in FIG. 32.

Referring to FIG. 40, in the first reduction mode l1, when the amount of power received by the wireless power receiver 2 is greater than the amount of power required by the wireless power receiver 2, even in the case in which the operating duty cycle d_c is decreased up to the first reference duty cycle d1, the operation mode of the controller 200, 201, 202, 203, 204, 205, 206, 207, or 208 is changed to a second reduction mode l2. In the second reduction mode l2, the controller 200, 201, 202, 203, 204, 205, 206, 207, or 208 fixes the operating duty cycle d_c to the first reference duty cycle d1, and varies the operating frequency f_c. In the second reduction mode l2, the operating frequency f_c is varied within the range of the second reference frequency f2 to the maximum frequency f_max.

That is, if the load amount is greater than a fourth reference load amount R47, the controller 200, 201, 202, 203, 204, 205, 206, 207, or 208 is operated in the second reduction mode l2.

When the amount of power received by the wireless power receiver 2 is less than the amount of power required by the wireless power receiver 2, even in the case in which the operating duty cycle d_c is increased up to the second reference duty cycle d2 in the first boost mode h1, the operation mode of the controller 200, 201, 202, 203, 204, 205, 206, 207, or 208 is changed to a second boost mode h2, and the controller 200, 201, 202, 203, 204, 205, 206, 207, or 208 adjusts the amount of power received by the wireless power receiver 2 by varying the operating frequency f_c. In the second boost mode h2, the operating duty cycle d_c is fixed to the second reference duty cycle d2. In the second boost mode h2, the operating frequency f_c is varied within the range of the first reference frequency f1 to a minimum frequency f_min.

That is, if the load amount is greater than a third reference load amount R37, the controller 200, 201, 202, 203, 204, 205, 206, 207, or 208 is operated in the second boost mode h2.

Figure 41:
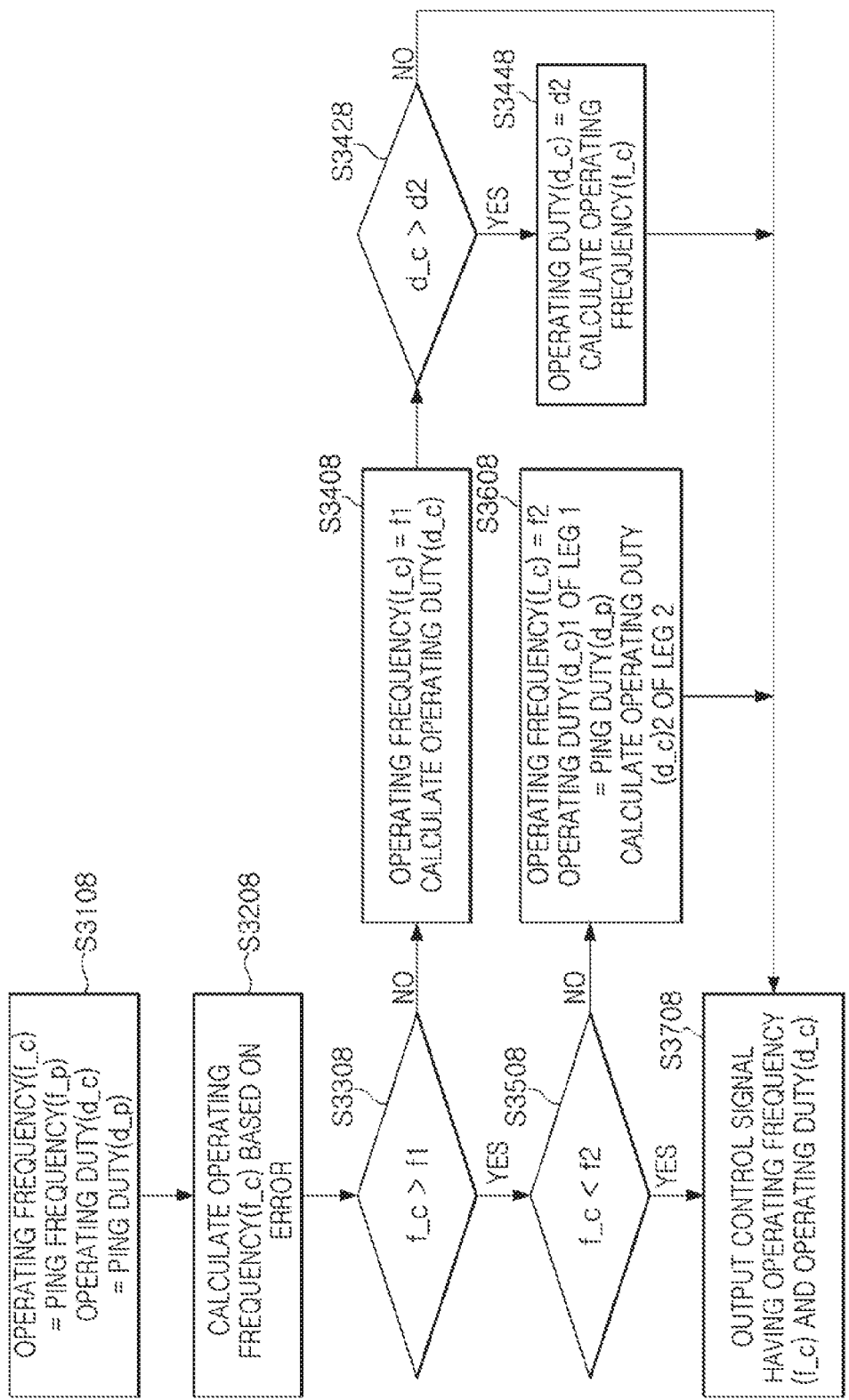

FIG. 41 is an operation flowchart illustrating an operation of the wireless power transmitter 1, 1-2, 1-3, 1-4, 1-5, 1-6, 1-7, or 1-8 and the wireless power transmission method in a power transmission mode, according to an embodiment.

In FIG. 41, operations S3108, S3208, S3308, S3408, S3428, S3438, S3508, and S3708 are the same as operations S3104, S3204, S3304, S3404, S3424, S3434, S3504, and S3704 described in FIG. 33, respectively.

If it is determined in operation S3508 that the operating frequency f_c calculated in operation S3208 is less than the second reference frequency f2, the controller 200, 201, 202, 203, 204, 205, 206, 207, or 208 sets the operating frequency f_c to the second reference frequency f2, fixes an operating duty cycle d_c1 of a first leg (i.e., an on-duty cycle of the second control signal con24, con25, and con28 (FIGS. 11, 12, and 15)) to the ping duty cycle d_p, and calculates an operating duty cycle d_c2 of a second leg (i.e., an on-duty cycle of the fourth control signal con44, con45, and con48 (FIGS. 11, 12, and 15)) in operation.

After performing operation S3608, the controller 200, 201, 202, 203, 204, 205, 206, 207, or 208 generates the control signals using the calculated operating frequency f_c and operating duty cycle d_c1 and d_c2, and outputs the generated control signals in operation S3708.

Figure 42:
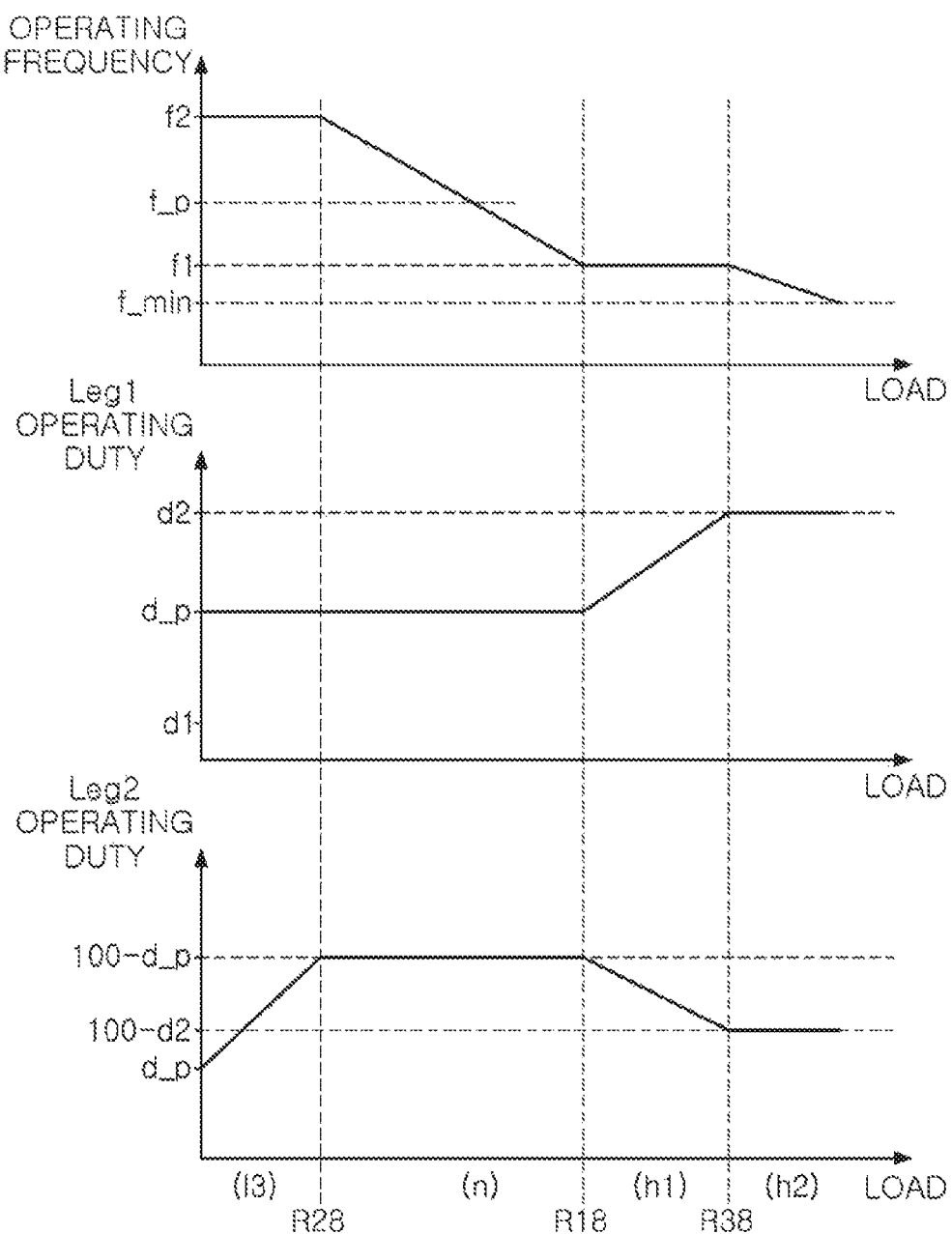

FIG. 42 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 42, the operations in the normal mode n, the first boost mode h1, and the second boost mode h2 are the same as those described in FIG. 31.

Referring to FIG. 42, in the normal mode n, when the amount of power received by the wireless power receiver 2 is greater than the amount of power required by the wireless power receiver 2, even in the case in which the operating frequency f_c is increased up to the second reference frequency f2, the operation mode of the controller 200, 201, 202, 203, 204, 205, 206, 207, or 208 is changed to a third reduction mode l3. In the third reduction mode l3, the controller 200, 201, 202, 203, 204, 205, 206, 207, or 208 fixes the operating frequency f_c to the second reference frequency f2, fixes the operating duty cycle d_c1 of the first leg (i.e., the on-duty cycle of the second control signals con24, con25, and con28 (FIGS. 11, 12, and 15)) to the ping duty cycle d_p, and adjusts the operating duty cycle d_c2 of the second leg (i.e., the on-duty cycle of the fourth control signal con44, con45, and con48 (FIGS. 11, 12, and 15)). In the third reduction mode l3, the operating duty cycle d_c2 of the second leg is varied within the range of the ping duty cycle d_p to (100−ping duty cycle d_p).

That is, if the load amount is less than a second reference load amount R28, the controller 200, 201, 202, 203, 204, 205, 206, 207, or 208 is operated in the third reduction mode l3.

Figure 43:
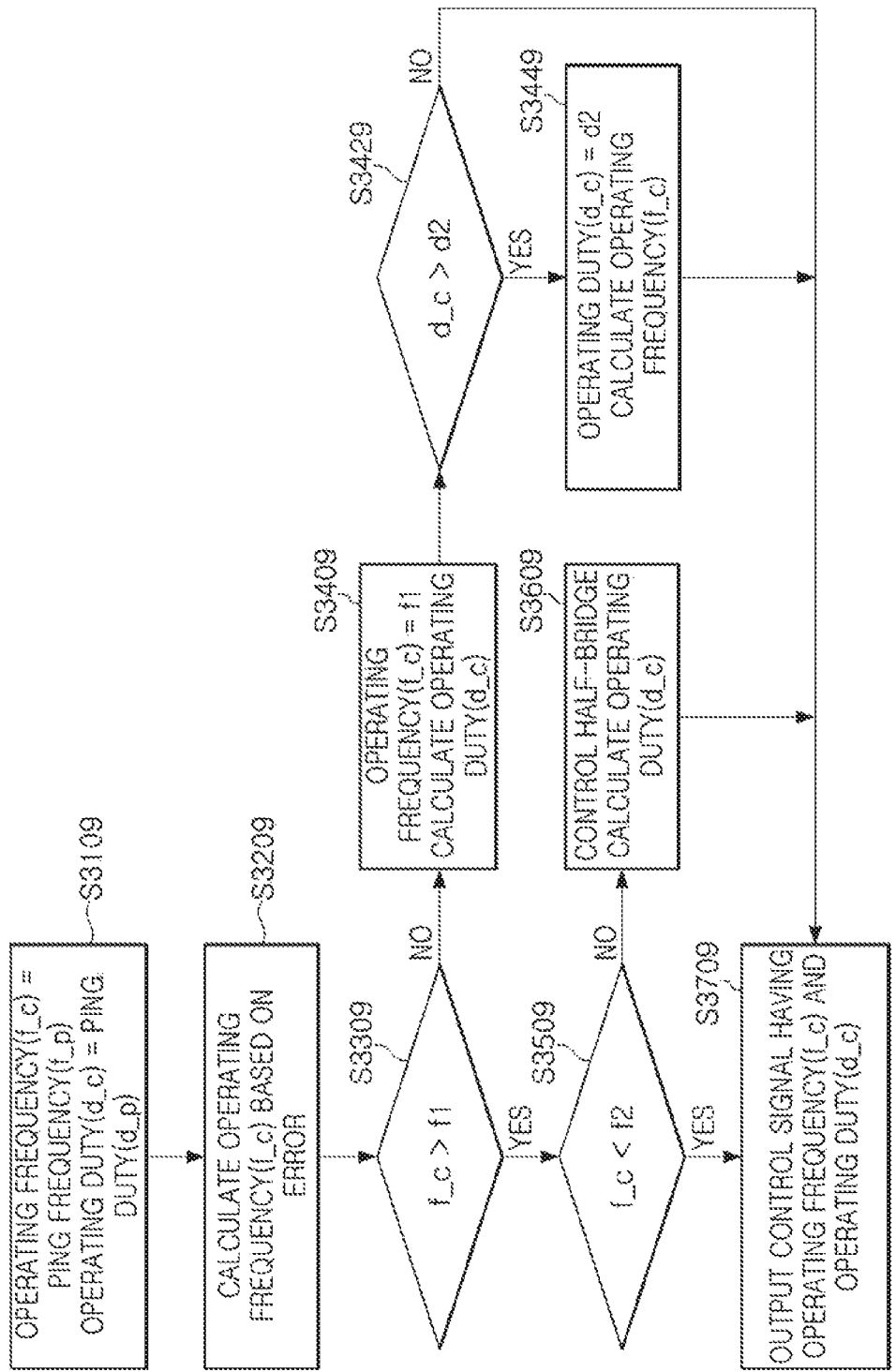

FIG. 43 is an operation flowchart illustrating an operation of the wireless power transmitter 1, 1-2, 1-3, 1-4, 1-5, 1-6, 1-7, or 1-8 and the wireless power transmission in a power transmission mode, according to an embodiment.

In FIG. 43, operations S3109, S3209, S3309, S3409, S3429, S3439, S3509, and S3709 are the same as operations S3104, S3204, S3304, S3404, S3424, S3434, S3504, and S3704 described in FIG. 33, respectively.

Referring to FIG. 43, if it is determined in operation S3509 that the operating frequency f_c calculated in operation S3209 is less than the second reference frequency f2, the controller 200, 201, 202, 203, 204, 205, 206, 207, or 208 sets the operating duty cycle d_c to an operating duty cycle at which the converter 111, 112, 113, 114, 115, 116, or 117 is operated as the half-bridge, and calculates the operating frequency f_c based on the error information in operation S3609.

After performing operation S3609, the controller 200, 201, 202, 203, 204, 205, 206, 207, or 208 generates the control signals using the calculated operating frequency f_c and operating duty cycle d_c, and outputs the generated control signals in operation S3709).

Figure 44:
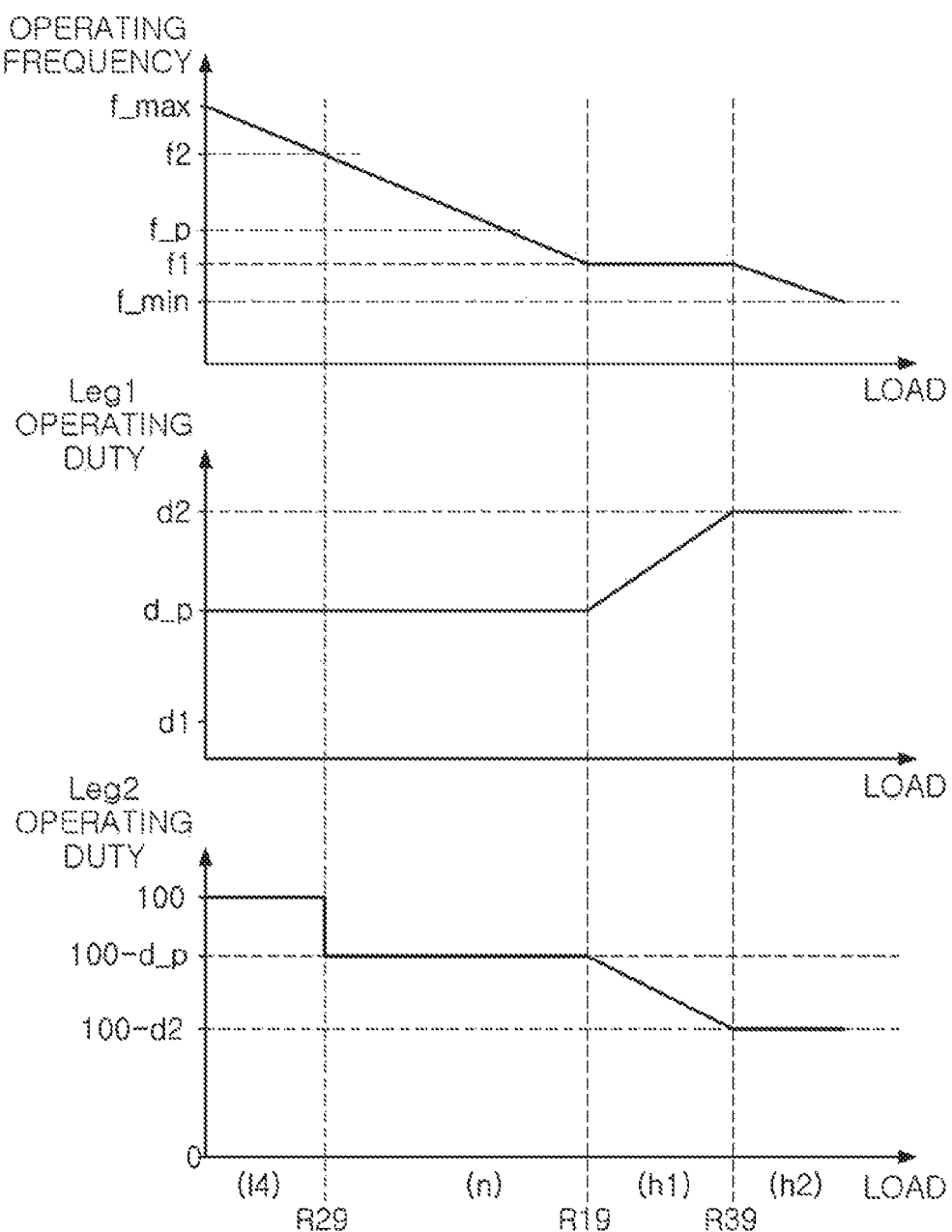

FIG. 44 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 44, the operations in the normal mode n, the first boost mode h1, and the second boost mode h2 are the same as those described in FIG. 34.

In the normal n, when the amount of power received by the wireless power receiver 2 is greater than the amount of power required by the wireless power receiver 2, even in the case in which the operating frequency f_c is increased up to the second reference frequency f2, the operation mode of the controller 200, 201, 202, 203, 204, 205, 206, 207, or 208 is changed to a fourth reduction mode l4. In the fourth reduction mode l4, the controller 200, 201, 202, 203, 204, 205, 206, 207, or 208 fixes the operating duty cycle d_c1 of the first leg (i.e., the on-duty cycle of the second control signal con24, con25, and con28 (FIGS. 11, 12, and 15)) to the ping duty cycle d_p, fixes the operating duty cycle d_c2 of the second leg (i.e., the duty cycle of the fourth control signal con44, con45, and con48 (FIGS. 11, 12, and 15)) to 100%, and adjusts the operating frequency f_c. In the fourth reduction mode l4, the operating frequency f_c is varied within the range of the second reference frequency f2 to the maximum frequency f_max.

That is, if the load amount is less than a second reference load amount R29, the controller 200, 201, 202, 203, 204, 205, 206, 207, or 208 is operated in the fourth reduction mode l4.

Figure 45:
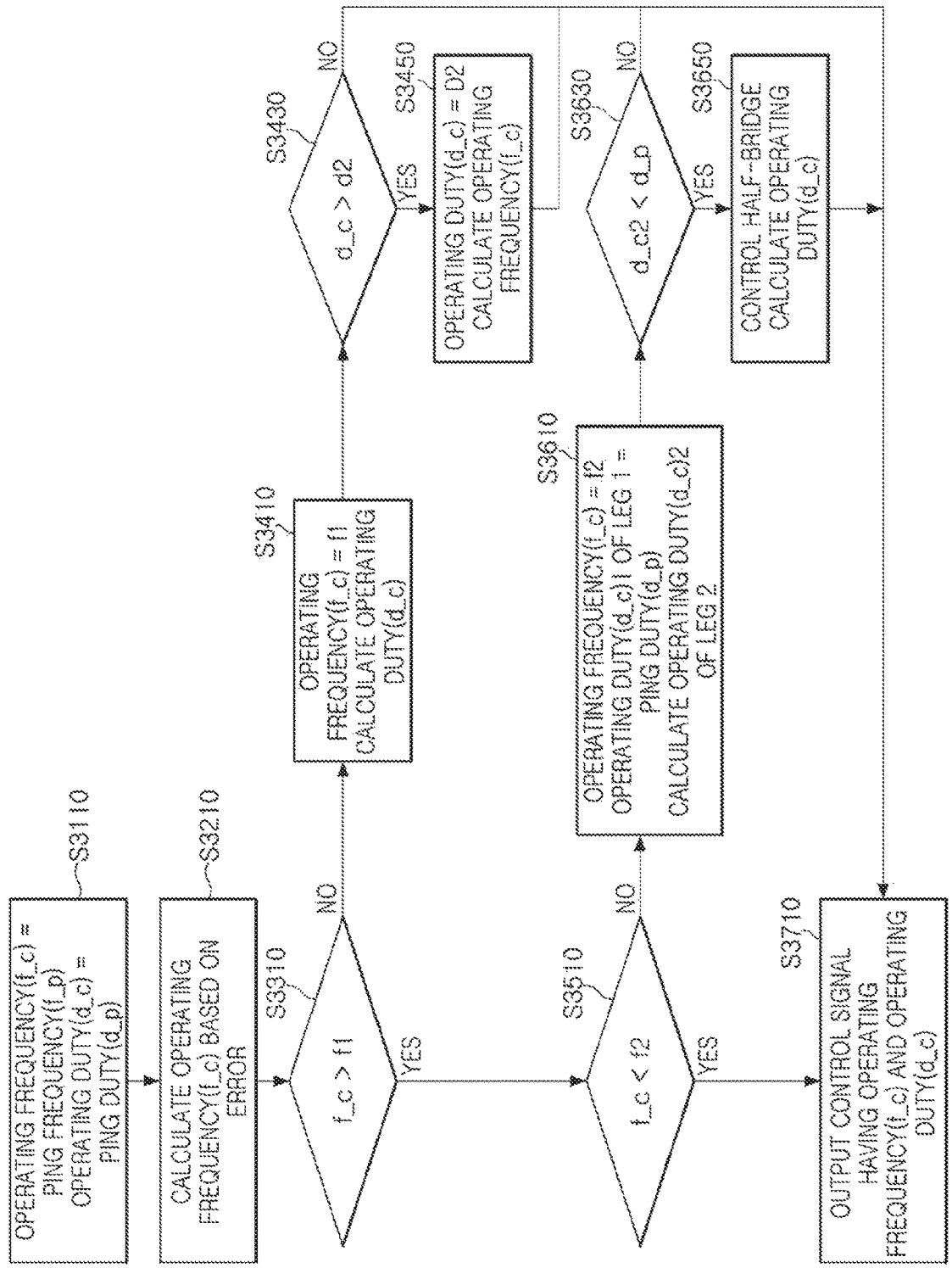

FIG. 45 is an operation flowchart illustrating an operation of the wireless power transmitter 1, 1-2, 1-3, 1-4, 1-5, 1-6, 1-7, or 1-8 and the wireless power transmission method, according to an embodiment.

In FIG. 45, operations S3110, S3210, S3310, S3410, S3430, S3450, S3510, and S3710 are the same as operations S3104, S3204, S3304, S3404, S3424, S3434, S3504, and S3704 described in FIG. 33, respectively.

Referring to FIG. 45, if it is determined in operation S3510 that the operating frequency f_c calculated in S3210 is less than the second reference frequency f2, the controller 200, 201, 202, 203, 204, 205, 206, 207, or 208 sets the operating frequency f_c to the second reference frequency f2, fixes the operating duty cycle d_c1 of the first leg (i.e., the duty cycle of the second control signal con24, con25, and con28 (FIGS. 11, 12, and 15)) to the ping duty cycle d_p, and calculates the operating duty cycle d_c2 of the second leg (i.e., the duty cycle of the fourth control signal con44, con45, and con48 (FIGS. 11, 12, and 15)) in operation S3610.

After performing operation S3610, the controller 200, 201, 202, 203, 204, 205, 206, 207, or 208 determines whether the calculated operating duty cycle d_c2 of the second leg is less than the ping duty cycle d_p in operation S3630.

If it is determined in operation S3630 that the operating duty cycle d_c2 of the second leg calculated in S3610 is greater than or equal to the ping duty cycle d_p, the controller 200, 201, 202, 203, 204, 205, 206, 207, or 208 generates the control signals using the operating frequency f_c and the operating duty cycle d_c which are calculated in operation S3610, and outputs the generated control signals in operation S3710.

Alternatively, if it is determined in operation S3630 that the operating duty cycle d_c2 of the second leg calculated in operation S3610 is less than the ping duty cycle d_p, the controller 200, 201, 202, 203, 204, 205, 206, 207, or 208 sets the operating duty cycle d_c to an operating duty cycle at which the converter 111, 112, 113, 114, 115, 116, or 117 is operated as the half-bridge, and calculates the operating frequency f_c based on the error information in operation S3650. In operation S3650, the operating duty cycle d_c1 of the first leg is fixed to the ping duty cycle d_p, and the operating duty cycle d_c2 of the second leg is fixed to 100%.

After performing operation S3650, the controller 200, 201, 202, 203, 204, 205, 206, 207, or 208 generates the control signals using the calculated operating frequency f_c and operating duty cycle d_c, and outputs the generated control signals in operation S3710.

Figure 46:
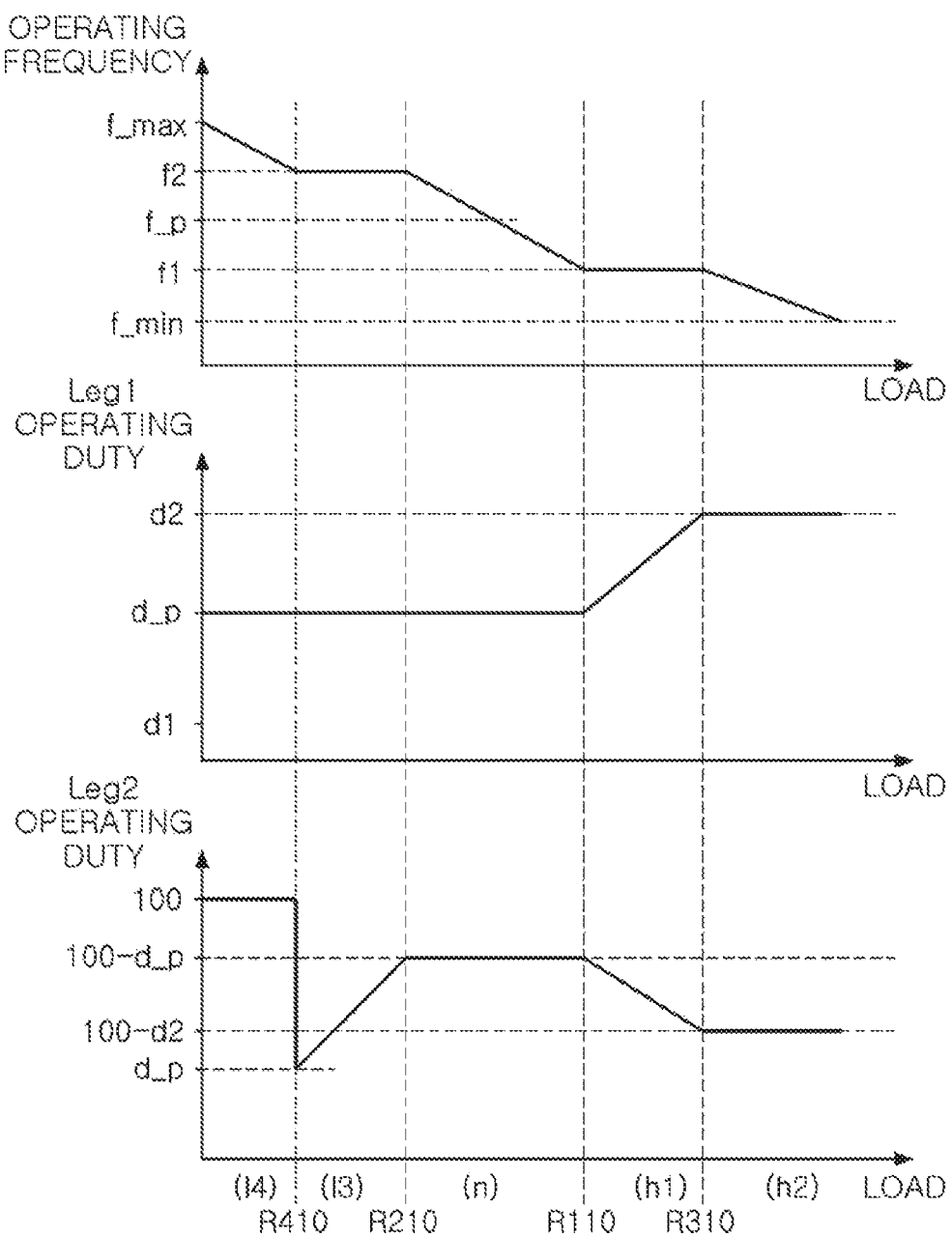

FIG. 46 is a diagram illustrating a change in the operating frequency and the operating duty cycle in the power transmission mode of the wireless power transmitter 1, 1-2, 1-3, 1-4, 1-5, 1-6, 1-7, or 1-8 and the wireless power transmission method, according to an embodiment.

In FIG. 46, the operations in the normal mode n, the first boost mode h1, and the second boost mode h2 are the same as those described in FIG. 34.

In the normal mode n, when the amount of power received by the wireless power receiver 2 is greater than the amount of power required by the wireless power receiver 2, even in the case in which the operating frequency f_c is increased up to the second reference frequency f2, the operation mode of the controller 200, 201, 202, 203, 204, 205, 206, 207, or 208 is changed to a third reduction mode l3. In the third reduction mode l3, the controller 200, 201, 202, 203, 204, 205, 206, 207, or 208 fixes the operating frequency f_c to the second reference frequency f2, fixes the operating duty cycle d_c1 of the first leg (i.e., the on-duty cycle of the second control signal con24, con25, and con28 (FIGS. 11, 12, and 15)) to the ping duty cycle d_p, and adjusts the operating duty cycle d_c2 of the second leg (i.e., the on-duty cycle of the fourth control signal con44, con45, and con48 (FIGS. 11, 12, and 15)). In the third reduction mode l3, the operating duty cycle d_c2 of the second leg is varied within the range of the ping duty cycle d_p to (100−ping duty cycle d_p).

In the third reduction mode l3, when the amount of power received by the wireless power receiver 2 is greater than the amount of power required by the wireless power receiver 2, even in the case in which the operating duty cycle d_c2 of the second leg is decreased up to the ping duty cycle d_p, the operation mode of the controller 200, 201, 202, 203, 204, 205, 206, 207, or 208 is changed to the fourth reduction mode l4. In the fourth reduction mode l4, the controller 200, 201, 202, 203, 204, 205, 206, 207, or 208 fixes the operating duty cycle d_c1 of the first leg (i.e., the duty cycle of the second control signal con24, con25, and con28 (FIGS. 11, 12, and 15)) to the ping duty cycle d_p, fixes the operating duty cycle d_c2 of the second leg (i.e., the duty cycle of the fourth control signal con44, con45, and con48 (FIGS. 11, 12, and 15)) to 100%, and adjusts the operating frequency f_c. In the fourth reduction mode l4, the operating frequency f_c is varied within the range of the second reference frequency f2 to the maximum frequency f_max.

That is, if the load amount is less than a second reference load amount R210 and is greater than a fourth reference load amount R410, the controller 200, 201, 202, 203, 204, 205, 206, 207, or 208 is operated in the third reduction mode l3. If the load amount is less than the fourth reference load amount R410, the controller 200, 201, 202, 203, 204, 205, 206, 207, or 208 is operated in the fourth reduction mode l4.

The control methods illustrated in each of FIGS. 27 through 46 may be recombined in various forms. For example, operations S3465 and S3485 of FIG. 35 or the operation of the third boost mode h3 of FIG. 36 may also be added to the control methods of each of FIGS. 27 through 46. Alternatively, the third reduction mode illustrated in FIGS. 42 and 46 and/or the fourth reduction mode illustrated in FIGS. 44 and 46 are also performed instead of the first reduction mode and/or the second reduction mode, according to another embodiment. Alternatively, in each of FIGS. 27 through 46, the operations and the operation modes are performed while some operations and some operation modes are omitted.

The control methods illustrated in FIGS. 27 through 46 are performed variously based on the request signal input from the wireless power receiver 2.

For example, the ping frequency f_c is selected as the same frequency as the first reference frequency f1. Thereafter, if it is determined, based on the signal received from the wireless power receiver 2, that the amount of power received by the wireless power receiver 2 is less than the amount of power required by the wireless power receiver 2, the operation in the first boost mode h1 according to the embodiments described above are also performed. Alternatively, if it is determined, based on the signal received from the wireless power receiver 2, if that the amount of power received by the wireless power receiver 2 is greater than the amount of power required by the wireless power receiver 2, the operation in the normal mode n according to the embodiments described above are also performed.

Thereafter, based on the signal received from the wireless power receiver 2, at least one of the operations of the first boost mode h1, the second boost mode h2, the third boost mode h3, the normal mode n, the first reduction mode l1, the second reduction mode l2, the third reduction mode l3, and the fourth reduction mode l4, according to the embodiments described above are sequentially performed.

For example, in a case in which a battery of the wireless power receiver 2 is in a state close to a discharge state, the wireless power receiver 2 first requires a large amount of power, and then gradually requires a smaller amount of power as the battery is gradually charged. In this case, after the operation in the boost mode h1, h2, or h3 is performed, the operations in the normal mode n and the reduction mode l1, l2, l3, or l4 are sequentially performed.

Alternatively, in a case in which the battery of the wireless power receiver 2 is charged to some extent, the wireless power receiver 2 requires a small amount of power from the beginning. Therefore, in this case, the operation in the reduction mode l1, l2, l3, or l4 are performed first.

Alternatively, when an alignment state between the wireless power receiver 2 and the wireless power transmitter 1, 1-2, 1-3, 1-4, 1-5, 1-6, 1-7, or 1-8 is distorted, the control is changed to a direction in which the load amount is increased in FIGS. 27 through 46. For example, when the alignment between the wireless power receiver 2 and the wireless power transmitter 1, 1-2, 1-3, 1-4, 1-5, 1-6, 1-7, or 1-8 is distorted while the operation in the normal mode n or the operation in the reduction mode l1, l2, l3, or l4 is performed, the operation in the normal mode n or the operation in the boost mode h1, h2, or h3 may also be performed. Alternatively, when the alignment between the wireless power receiver 2 and the wireless power transmitter 1, 1-2, 1-3, 1-4, 1-5, 1-6, 1-7, or 1-8 is distorted while the operation in the first boost mode h1 is performed, the operation in the second boost mode h2 may also be performed.

Alternatively, when the wireless power receiver 2 and the wireless power transmitter 1, 1-2, 1-3, 1-4, 1-5, 1-6, 1-7, or 1-8 are sufficiently aligned, the control is changed to a direction in which the load amount is decreased in FIGS. 27 through 46. For example, the operation in the reduction mode l1, l2, l3, or l4 may be performed while the operation in the normal mode n is performed.

The control methods illustrated in FIGS. 27 through 46 are also performed so that the frequency wirelessly transmitted belongs to a reference range. For example, the controller 200, 201, 202, 203, 204, 205, 206, 207, or 208 adjusts the duty cycle and the frequency of the control signal while preferentially satisfying the conditions that the frequency wirelessly transmitted is a reference value or less, is a reference value or more, and belongs to a predetermined range.

Figure 47A:
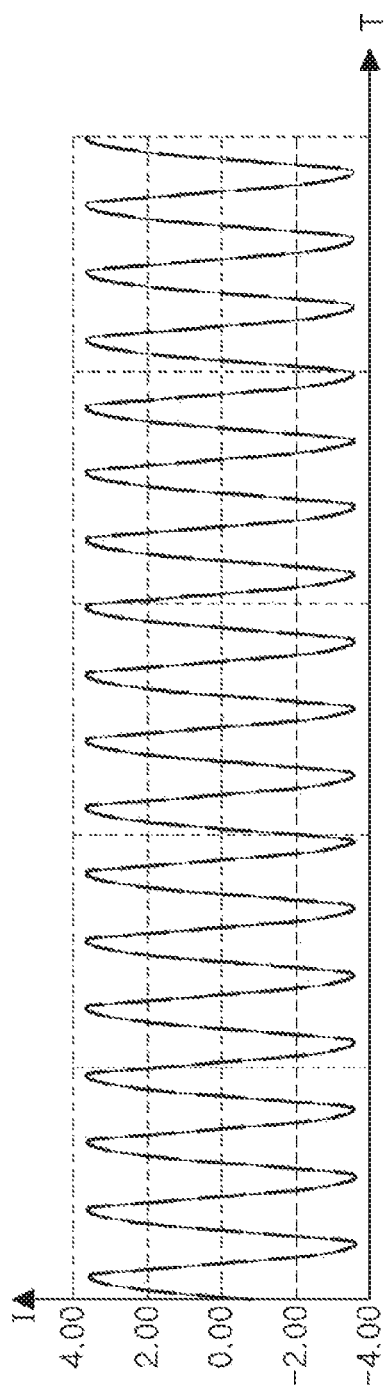
FIGS. 47A and 47B are diagrams illustrating a coil current and an output voltage of the wireless power transmitter, according to an embodiment.

FIG. 47 is a diagram illustrating a coil current and an output voltage of the wireless power transmitter 1, 1-2, 1-3, 1-4, 1-5, 1-6, 1-7, or 1-8, according to an embodiment.

The thick dotted line of a graph (a) of FIG. 47 illustrates a coil current of the resonator 120, 121, 122, 123, 124, 125, 126, 127, or 128, according to an embodiment illustrated in each of FIGS. 7 through 15, while a thin solid line of the graph (a) of FIG. 47 illustrates a coil current according to a comparative example.

Figure 47B:
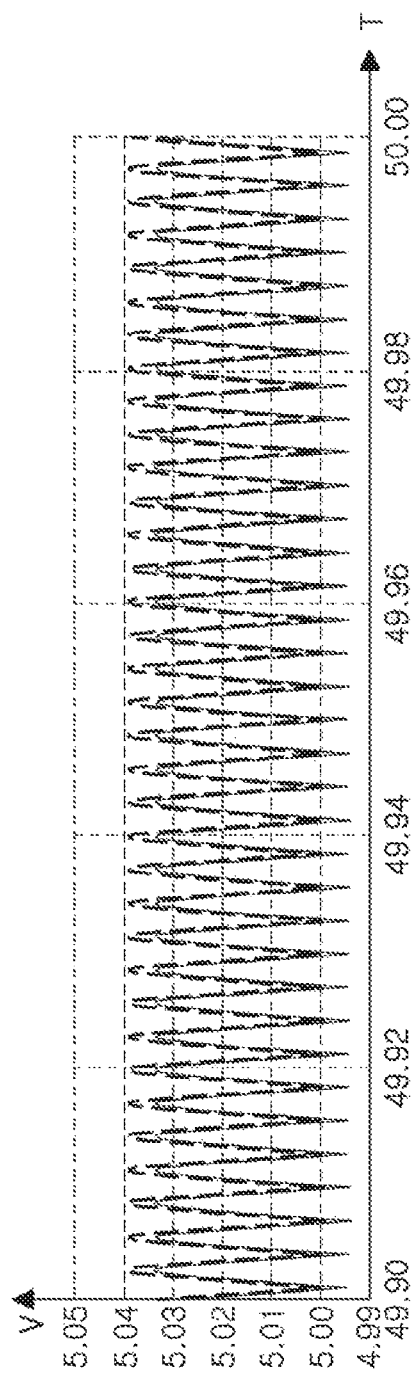

A thick dotted line of the graph depicted in FIG. 47B illustrates an output voltage, a voltage across the resonator 120, 121, 122, 123, 124, 125, 126, 127, or 128, according to an embodiment illustrated in each of FIGS. 7 through 15, and a thin solid line of the graph depicted in FIG. 47B illustrates an output voltage according to a comparative example.

The comparative example is the wireless power transmitter including the full-bridge inverter, operated by receiving the input power. In the case of the comparative example, the input power is a power provided by the boost converter implemented separately from the inverter.

As illustrated, it can be confirmed that the wireless power transmitter 1, 1-2, 1-3, 1-4, 1-5, 1-6, 1-7, or 1-8, according to an embodiment provides the coil current and the output voltage corresponding to the full-bridge inverter according to the comparative example, while using the half-bridge inverter.

Figure 48A:
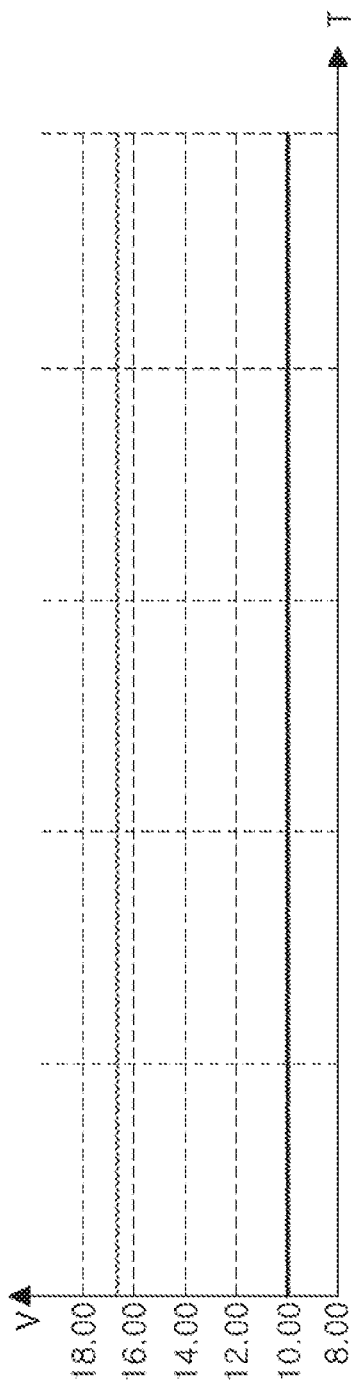
FIGS. 48A and 48B are diagrams illustrating a boost voltage and an output voltage based on a change of a duty cycle in the wireless power transmitter, according to an embodiment.
Figure 48B:
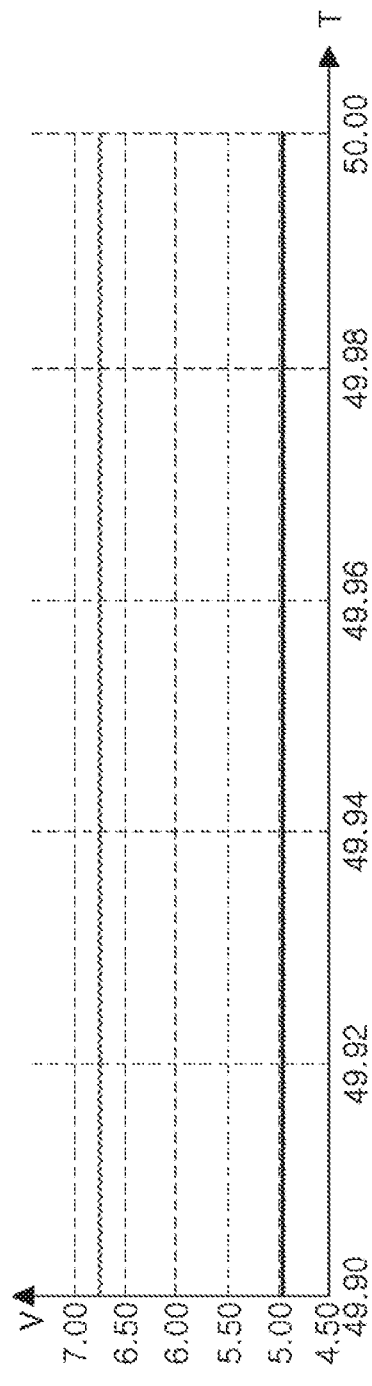

FIG. 48 is a diagram illustrating a boost voltage and an output voltage based on a change of a duty cycle in the wireless power transmitter 1, 1-2, 1-3, 1-4, 1-5, 1-6, 1-7, or 1-8, according to an embodiment.

Graph (a) of FIG. 48 illustrates a boost voltage (a voltage of the node N2 of FIGS. 8 through 15), and graph (b) thereof illustrates an output voltage of the wireless power transmitter 1, 1-2, 1-3, 1-4, 1-5, 1-6, 1-7, or 1-8.

In graph (a), a thick line illustrates the boost voltage based on a duty cycle of 50%, and a thin line illustrates the boost voltage based on a duty cycle of 70%.

As illustrated, it can be appreciated that the boost voltage based on the duty cycle of 50% is about 10V, but the output voltage of the boosting unit based on the duty cycle of 70% is slightly higher than 16V, which provides a higher boosting efficiency.

In addition, accordingly, as illustrated in graph (b), it can be appreciated that the output voltage of the wireless power transmitter 1, 1-2, 1-3, 1-4, 1-5, 1-6, 1-7, or 1-8 based on the duty cycle of 50% is about 5V, but the output voltage of the boosting unit based on the duty cycle of 70% is adjacent to 7V, which provides a higher output.

As set forth above, according to the embodiments in the disclosure herein, the wireless power transmitter 1, 1-2, 1-3, 1-4, 1-5, 1-6, 1-7, or 1-8 and the wireless power transmission method reduce the number of components required for manufacturing the wireless power transmitter, whereby a smaller-sized wireless power transmitter may be implemented and material costs thereof may be saved. Further, the wireless power transmitter 1, 1-2, 1-3, 1-4, 1-5, 1-6, 1-7, or 1-8 and the wireless power transmission method according to the embodiments herein provides more convenience to the user, such as increasing the range across which the power is wirelessly transmitted while satisfying various limitations to be satisfied in wirelessly transmitting the power, and also improve wireless power transmission efficiency. Further, the wireless power transmitter 1, 1-2, 1-3, 1-4, 1-5, 1-6, 1-7, or 1-8 and the wireless power transmission method according to the embodiments herein more precisely controls the power transmission, whereby the unnecessary power consumption is prevented and overheating of the wireless power receiver 2 or damage to an element of the wireless power receiver 2 is also prevented. Further, the wireless power transmitter 1, 1-2, 1-3, 1-4, 1-5, 1-6, 1-7, or 1-8 and the wireless power transmission method, according to the embodiments disclosed herein, reduces the inrush current and the peak current that occur at the time of generating the signal for determining whether the wireless power receiver is present, whereby the operation in the detection mode for determining whether the wireless power receiver is present is stabilized.

The controllers 200, 201, 202, 203, 204, 205, 206, 207 and 208 in FIGS. 7 through 15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3 and 16 through 48B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, an electronic device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
   a converter comprising at least one switching element, and configured to generate boosted input power;
   a resonator configured to receive the boosted input power as an alternating current (AC) power, and transmit a ping signal in a detection mode for determining whether any one or both of an external object approaching and a type of the external object; and
   a controller configured to control the switching element, and gradually increase a duty cycle of a gate signal provided to the switching element, in the detection mode.

2. The wireless power transmitter of claim 1, wherein the controller gradually increases the duty cycle of the gate signal in an amount equal to a reference duty cycle.

3. The wireless power transmitter of claim 2, wherein the controller increases the duty cycle of the gate signal from a first duty cycle of 0%, in an initial operation mode of the detection mode.

4. The wireless power transmitter of claim 3, wherein the initial operation mode corresponds to a mode for transmitting the ping signal in a stop state for a time equal to or greater than a reference time.

5. The wireless power transmitter of claim 3, wherein the controller increases the duty cycle of the gate signal to a ping duty cycle, and the boosted input power to reach a target boosted input power for generating the ping signal in the ping duty cycle.

6. The wireless power transmitter of claim 5, wherein the controller is further configured to calculate data on a voltage level of the boosted input power gradually increasing to the target boosted input power, and a duty cycle corresponding to the voltage level of the boosted input power gradually increases.

7. The wireless power transmitter of claim 6, wherein the controller is further configured to increase the duty cycle of the gate signal from a second duty cycle, in a standby operation mode of the detection mode, and the second duty cycle is determined based on the voltage level of the boosted input power.

8. The wireless power transmitter of claim 7, wherein the standby operation mode corresponds to a mode for transmitting the ping signal in a stop state for less than a reference time.

9. The wireless power transmitter of claim 7, wherein the voltage level of the boosted input power is estimated based on a period of the ping signal.

10. The wireless power transmitter of claim 7, wherein the second duty cycle is calculated based on the voltage level of the boosted input power and the data.

11. The wireless power transmitter of claim 10, wherein the second duty cycle is determined by applying a weighted index, calculated by comparing a voltage level of the target boosted input power to the voltage level of the boosted input power, to the ping duty cycle.

12. The wireless power transmitter of claim 10, wherein the data is provided in a form of a lookup-table, and the second duty cycle is determined by searching through the lookup-table for the duty cycle corresponding to the voltage level of the boosted input power.

13. A wireless power transmitter operated in a detection mode including a first mode and a second mode, and transmitting a ping signal in the detection mode, the wireless power transmitter, comprising:
   a converter comprising at least one switching element, and configured to convert input power into boosted input power based on a switching operation of the switching element, and output the boosted input power as an alternating current (AC) power;

a resonator configured to generate the ping signal from the AC power; and a controller configured to control the switching element, increase a duty cycle of a gate signal provided to the switching element from a first duty cycle in the first mode, and increase the duty cycle of the gate signal from a second duty cycle higher than the first duty cycle in the second mode.

14. The wireless power transmitter of claim 13, wherein the controller is further configured to increase the duty cycle of the gate signal to a ping duty cycle in the first mode, and the boosted input power reaches a target boosted input power for generating the ping signal in the ping duty cycle.

15. The wireless power transmitter of claim 14, wherein the second duty cycle is determined based on a weighted index, calculated by comparing a voltage level of the target boosted input power to a voltage level of the boosted input power, to the ping duty cycle.

16. The wireless power transmitter of claim 13, wherein the switching element is configured to perform a converting operation from the boosted input power to the input power and an outputting operation from the boosted input power as AC power.

* * * * *